US011360250B1

(12) United States Patent
Guo et al.

(10) Patent No.: US 11,360,250 B1
(45) Date of Patent: Jun. 14, 2022

(54) STABLE AIGS FILMS

(71) Applicant: Nanosys, Inc., Milpitas, CA (US)

(72) Inventors: Wenzhou Guo, San Jose, CA (US);
Ravisubhash Tangirala, Fremont, CA (US); Chunming Wang, Milpitas, CA (US); Charles Hotz, San Rafael, CA (US); Alain Barron, Redwood City, CA (US)

(73) Assignee: Nanosys, Inc., Milpitas, CA (US)

( * ) Notice: Subject to any disclaimer, the term of this patent is extended or adjusted under 35 U.S.C. 154(b) by 0 days.

(21) Appl. No.: 17/510,638

(22) Filed: Oct. 26, 2021

Related U.S. Application Data

(60) Provisional application No. 63/169,667, filed on Apr. 1, 2021.

(51) Int. Cl.
*G02B 5/22* (2006.01)
*C01G 15/00* (2006.01)
(Continued)

(52) U.S. Cl.
CPC ........... *G02B 5/223* (2013.01); *C01G 15/006* (2013.01); *G02B 1/04* (2013.01); *B82Y 20/00* (2013.01);
(Continued)

(58) Field of Classification Search
CPC .... G02B 5/223; G02B 1/04; G02B 2207/101; G02B 5/201; G02B 5/204; G02B 5/207;
(Continued)

(56) References Cited

U.S. PATENT DOCUMENTS 8,759,053 B2 6/2014 Phelps et al.
9,133,388 B2 9/2015 Modi et al.
(Continued)

FOREIGN PATENT DOCUMENTS

CN 101878535 B 11/2010
CN 106191986 A 12/2016
(Continued)

OTHER PUBLICATIONS

Kameyama et al., "Wavelength-Tunable Band-Edge Photoluminescence of Nonstoichiometric Ag—In—S Nanoparticles via $Ga^{3+}$ Doping", *ACS Appl. Mater. Interfaces* 10:42844-42855 (2018), American Chemical Society.
(Continued)

*Primary Examiner* — Stephone B Allen
*Assistant Examiner* — Adam W Booher
(74) *Attorney, Agent, or Firm* — Sterne, Kessler, Goldstein & Fox P.L.L.C.

(57) ABSTRACT

Disclosed are stable films comprising Ag, In, Ga, and S (AIGS) nanostructures, or more one metal alkoxides, one or more metal alkoxide hydrolysis products, one or more metal halides, one or more metal halide hydrolysis products, one or more organometallic compounds, or one or more organometallic hydrolysis products, or combinations thereof, and at least one ligand bound to the nanostructures. In some embodiments, the AIGS nanostructures have a photon conversion efficiency of greater than 32% and a peak wavelength emission of 480-545 nm. In some embodiments, the nanostructures have an emission spectrum with a FWHM of 24-38 nm. In some embodiments, the nanostructures have a photon conversion efficiency (PCE) of at least 30% after being stored for 24 hours under yellow light and air storage conditions.

27 Claims, 10 Drawing Sheets

(51) Int. Cl.
  *G02B 1/04* (2006.01)
  *B82Y 20/00* (2011.01)
(52) U.S. Cl.
  CPC ...... *C01P 2004/04* (2013.01); *C01P 2004/64* (2013.01); *C01P 2006/60* (2013.01); *G02B 2207/101* (2013.01)
(58) Field of Classification Search
  CPC . G02B 5/22; G02B 1/005; G02B 1/02; C01G 15/006; B82Y 20/00; B82Y 30/00; B82Y 40/00; C01P 2004/04; C01P 2004/64; C01P 2004/84; C01P 2006/60; C01P 2002/54; C01P 2002/72; B32B 15/09; B32B 15/043; B32B 17/06; B32B 17/061; B32B 2255/10; B32B 2255/205; B32B 2264/105; B29B 7/90; H01L 33/50; H01L 33/501; H01L 33/502; H01L 33/508; H01L 33/06; H01L 33/005; H01L 33/507; H01L 33/504; H01L 2933/0041; G02F 1/133614; C09K 11/62; C09K 11/621; C09K 11/02; Y10S 977/773; Y10S 977/813; Y10S 977/895; Y10S 977/95; Y10S 977/774; Y10S 977/892
  See application file for complete search history.

(56) References Cited

U.S. PATENT DOCUMENTS

| | | |
|---|---|---|
| 9,196,760 B2 | 11/2015 | Duty et al. |
| 9,466,743 B2 | 10/2016 | Harris et al. |
| 10,233,389 B2 | 3/2019 | Torimoto et al. |
| 10,316,250 B2 | 6/2019 | Guo et al. |
| 10,563,122 B2 | 2/2020 | Kuwahata et al. |
| 10,927,294 B2 | 2/2021 | Mamuye et al. |
| 2008/0277625 A1 | 11/2008 | Nakamura et al. |
| 2009/0159849 A1 | 6/2009 | Uehara et al. |
| 2012/0168910 A1 | 7/2012 | Jackrel et al. |
| 2013/0025680 A1 | 1/2013 | Fujdala et al. |
| 2015/0162468 A1 | 6/2015 | Newman |
| 2015/0287854 A1 | 10/2015 | Cho et al. |
| 2016/0137916 A1 | 5/2016 | Wachi |
| 2016/0380140 A1 | 12/2016 | McDaniel et al. |
| 2017/0029697 A1 | 2/2017 | Ghosh et al. |
| 2017/0243999 A1 | 8/2017 | Wi et al. |
| 2017/0267924 A1 | 9/2017 | Kuwabata et al. |
| 2018/0066183 A1 | 3/2018 | Torimoto et al. |
| 2018/0292711 A1* | 10/2018 | Yoon ................ G02F 1/133512 |
| 2019/0006607 A1 | 1/2019 | Yang et al. |
| 2019/0077954 A1 | 3/2019 | Tangirala et al. |
| 2019/0081263 A1 | 3/2019 | Park et al. |
| 2019/0329528 A1* | 10/2019 | Murata .................... B32B 7/12 |
| 2019/0391314 A1* | 12/2019 | Kim ....................... G02B 6/005 |
| 2020/0006601 A1 | 1/2020 | Torimoto et al. |
| 2020/0075876 A1* | 3/2020 | Zhu .......................... F21V 9/32 |
| 2020/0255733 A1* | 8/2020 | Zhao .................... C23C 18/122 |
| 2020/0295227 A1 | 9/2020 | Torimoto et al. |
| 2021/0363422 A1 | 11/2021 | Nikata et al. |

FOREIGN PATENT DOCUMENTS

| | | |
|---|---|---|
| KR | 20150141914 A | 12/2015 |
| KR | 2016-0061267 A | 5/2016 |
| KR | 20160065230 A | 6/2016 |
| KR | 2016-0093429 A | 8/2016 |
| KR | 101665550 B1 | 10/2016 |
| KR | 20160141258 A | 12/2016 |
| KR | 101734464 B1 | 5/2017 |
| KR | 101734465 B1 | 5/2017 |
| KR | 20170100078 A | 9/2017 |
| KR | 20180016196 A | 2/2018 |
| KR | 101859173 B1 | 5/2018 |
| KR | 20180060923 A | 6/2018 |
| KR | 101897254 B1 | 9/2018 |
| KR | 20180108012 A | 10/2018 |
| KR | 20180123197 A | 11/2018 |
| KR | 20190000274 A | 1/2019 |
| KR | 20190010608 A | 1/2019 |
| KR | 20190059632 A | 5/2019 |
| KR | 20190101430 A | 8/2019 |
| KR | 20190118412 A | 10/2019 |
| KR | 20190119457 A | 10/2019 |
| KR | 102047116 B1 | 11/2019 |
| TW | 202113038 A | 4/2021 |
| WO | WO 2009/068878 A2 | 6/2009 |
| WO | WO 2012/164283 A1 | 12/2012 |
| WO | WO 2013/146872 A1 | 10/2013 |
| WO | WO 2018/159699 A1 | 9/2018 |
| WO | WO 2020257510 A1 | 12/2020 |

OTHER PUBLICATIONS

Uematsu et al., "Narrow band-edge photoluminescence from $AgInS_2$ semiconductor nanoparticles by the formation of amorphous III-VI semiconductor shells", *NPG Asia Materials* 10:713-726 (2018), Springer Nature.

Cheng, K.-W. et al., "Influence of gallium on the growth and photoelectrochemical performances of $AgIn_5S_8$ photoelectrodes" *Thin Solid Films* 524:238-244, Elsevier, B.V., The Netherlands (2012).

Cui, Y. et al.. "Photoluminescence study of $AgGaSe_2$, $AgGa_{0.9}In_{0.1}Se_2$, and $AgGa_{0.8}In_{0.2}Se_2$ crystals grown by the horizontal Bridgman technique," *J. Appl. Phys.* 103:123514-1-123514-6, AIP Publishing, United States (2008).

Jang, J.S. et al., "Indium induced band gap tailoring in $AgGa_{1-x}In_xS_2$ chalcopyrite structure for visible light photocatalysis," *J. Chem. Phys.* 128:154717-1-154717-6, AIP Publishing, United States (2008).

Kuwabata, S. et al., "Synthesis of New Fluorescent Semiconductor Nanoparticles and Their Optical Uses," *ECS Transactions* 45:131-137, Electrochemical Society, United States (2012).

Liang, N. et al., "$AgIn_xGa_{1-x}S_2$ solid solution nanocrystals: synthesis, band gap tuning and photocatalytic activity," *CrystEngComm* 16:10123-10130, RCS Publishing, United Kingdom (2014).

Maeda, S. et al., "Long Term Optical Properties of ZnS—$AgInS_2$ and $AgInS_2$—$AgGaS_2$ Solid-Solution Semiconductor Nanoparticles Dispersed in Polymer Matrices," *Electrochemistry* 79:813-816, RCS Publishing, United Kingdom (2011).

Sun, J. et al., Hierarchical microarchitectures of $AgGa_{1-x}In_xS_2$: Long chain alcohol assisted synthesis, band gap tailoring and photocatalytic activities of hydrogen generation, *Int. J. Hydrogen Energy* 38:10731-10738, Elsevier Ltd., United Kingdom (2013).

Tseng, C.-J. et al., "Photoelectrochemical performance of gallium-doped $AgInS_2$ photoelectrodes prepared by electrodeposition process," *Solar Energy Materials & Solar Cells* 96:33-42, Elsevier B.V., The Netherlands (2012).

Song, U-Seok and Yang, Hui-Seon, "A Study on the Production of White LED Based on High Quantum Efficiency Semiconductor Quantum Dots," *Ceramist*, vol. 16, Issue 2, pp. 28-41.

Kim, J-H., et al., "Synthesis of widely emission-tunable Ag—Ga—S and its quaternary derivative quantum dots," *Chemical Engineering Journal* 347(25):791-797, Elsevier, The Netherlands (2018).

Notice of Allowance dated Oct. 15, 2021 in U.S. Appl. No. 17/166,788, Tangirala, R., et al., filed Feb. 3, 2021, 10 pages.

Sasamura, T. et al., "Preparation of novel semiconductor nanoparticles composed of low toxic elements and the application to photofunctional materials," Journal of The Society of Photographic Science and Technology of Japan 73(6):290-296, The Society of Photographic Science and Technology of Japan, Japan (2010).

Torimoto, T., et al., "Photofunctional Materials Fabricated with Chalcopyrite-Type Semiconductor Nanoparticles Composed of AgInS2 and Its Solid Solutions," J Phys Chem Lett 5(2):336-347, American Chemical Society, United States (Dec. 2013).

Uematsu, T., "Preparation of Luminescent AgInS2—AgGaS2 Solid Solution Nanoparticles and Their Optical Properties," J Phys Chem Lett 1(22):3283-3287, American Chemical Society, United States (Nov. 2010).

(56) References Cited

OTHER PUBLICATIONS

Co-pending U.S. Appl. No. 17/166,788, inventors Tangirala, R., et al., filed Feb. 3, 2021 (Not Yet Published).

\* cited by examiner

STABLE AIGS FILMS

BACKGROUND OF THE INVENTION

Field of the Invention

The invention relates to the field of nanotechnology. More particularly, the invention provides thin, heavy metal-free, stable Ag—In—Ga—S color conversion films that have high photon conversion efficiency (PCE) of greater than 30% at a peak emission wavelength of 480-545 nm, when excited using a blue light source with a wavelength of about 450 nm, and after being exposed to yellow light and air storage conditions.

Background Art

Efficient conversion of color is important for lighting and display applications. In display applications, a blue light source with a wavelength around 450 nm is most commonly used as a backlight. Most applications require materials free from heavy metals such as Cd and Pb.

Increased efficiency leads to less wasted power as well as increased emission. Color conversion thin films are characterized by photon conversion efficiency (PCE), which is defined as the number of emitted photons divided by the number of source photons. Green heavy metal free QD color conversion films used for displays typically have poor performance due to their limited absorption in blue light where they are excited. Blue absorption is often inherently limited by the material system being used, which results in a much thicker film being required to absorb sufficient 450 nm light.

The thin films formed by deposition of QD inks are typically cured by UV irradiation. In many cases, this is followed by thermal processing at 180° C. for up to 1 hour in the presence of air. Photon conversion efficiency of these films is limited by a combination of poor absorption and poor light conversion due to instability through these processing steps.

A need remains in the art for AIGS nanostructures with high band edge emission (BE), narrow full width at half maximum (FWHM), high quantum yield (QY), and reduced red-shifting, and which are useful in preparing films that have high (greater than 32% before being exposed to yellow light and air storage conditions) photon conversion efficiency (PCE) at a peak emission wavelength between 480 and 545 nm, using an excitation wavelength of about 450 nm.

BRIEF SUMMARY OF THE INVENTION

The invention provides thin, heavy metal-free, stable AIGS nanostructure color conversion films that have high photon conversion efficiency (PCE) of greater than 30% at a peak emission wavelength of 480-545 nm, when excited using a blue light source with a wavelength about of 450 nm, and intermediate exposure to air in yellow light conditions. This is accomplished by using AIGS nanostructures in an ink formulation containing one or more metal alkoxides, one or more metal alkoxide hydrolysis products, one or more metal halides, one or more metal halide hydrolysis products, one or more organometallic compounds, or one or more organometallic hydrolysis products, or combinations thereof, and one or more ligands. In some embodiments, all handling of the inks, followed by deposition, processing and measurement of films, is done in an oxygen-free environment prior to being exposed to blue or ultraviolet light. In some embodiments, the AIGS nanostructures have a FWHM of 28-38 nm. In other embodiments, the AIGS nanostructures have a FWHM of less than 32 nm. In some embodiments, the narrow FWHM is accomplished by adding at least one polyamino-ligand to AIGS nanostructures and making a film layer, with all handling of the nanostructure inks, deposition of the inks, processing and measurement of the films being done in an oxygen-free environment.

Thin films formed by deposition of QD inks are typically cured by UV irradiation. In many cases, this is followed by thermal processing at 180° C. for up to 1 hour in the presence of air. It has been discovered that photon conversion efficiency is reduced by poor absorption and poor light conversion due to instability through these processing steps.

Disclosed herein are films comprising AIGS nanostructures, in an ink formulation comprising one or more metal alkoxides, one or more metal alkoxide hydrolysis products, one or more metal halides, one or more metal halide hydrolysis products, one or more organometallic compounds, or one or more organometallic hydrolysis products, or combinations thereof; and at least one ligand, that achieve PCEs of greater than (>) 30% after being exposed for 24 hours to yellow light and air storage conditions. In some embodiments, provided is a film comprising AIGS nanostructures and at least one ligand, and exhibiting a PCE of greater than 32% at a peak emission wavelength of 480-545 nm, when excited using a blue light source with a wavelength of 450 nm. In some embodiments, the film comprising AIGS nanostructures, one or more metal alkoxides, one or more metal alkoxide hydrolysis products, one or more metal halides, one or more metal halide hydrolysis products, one or more organometallic compounds, or one or more organometallic hydrolysis products, or combinations thereof, and at least one ligand exhibit a PCE of 30-39% after being exposed in air to yellow light and air storage conditions. In some embodiments, the film comprising AIGS nanostructures, the one or more metal alkoxides, one or more metal alkoxide hydrolysis products, one or more metal halides, one or more metal halide hydrolysis products, one or more organometallic compounds, or one or more organometallic hydrolysis products, or combinations thereof; and at least on ligand, exhibits a PCE of about 30%, about 31%, about 32%, about 33%, about 34%, about 35%, about 36%, about 37%, about 38%, or about 39% after being exposed in air to yellow light conditions.

In some embodiments, the films are thin (5-15 μm) color-conversion films.

These films, as prepared, have good (>95%) blue absorption but moderate emission properties. However, when processed in the absence of oxygen and/or light and/or encapsulated before exposing the films to UV or blue light, the emissive properties of these films are improved significantly.

Provided is method of preparing the AIGS film, comprising:
  (a) providing AIGS nanostructures, one or more metal alkoxides, one or more metal alkoxide hydrolysis products, one or more metal halides, one or more metal halide hydrolysis products, one or more organometallic compounds, or one or more organometallic hydrolysis products, or combinations thereof; and at least one ligand;
  (b) admixing at least one organic resin with AIGS nanostructures of (a); and
  (c) preparing a first film comprising the admixed AIGS nanostructures, the at least one ligand, and the at least one organic resin on a first barrier layer;

(d) curing the film by UV irradiation and/or baking;
(e) encapsulating the first film between the first barrier layer and a second barrier layer; and
wherein the encapsulated film exhibits a conversion efficiency (PCE) of greater than 30% at a peak emission wavelength of 480-545 nm, when excited using a blue light source with a wavelength of about 450 nm, and after being exposed to yellow light and air storage conditions.

Also provided is a method further comprising:
(f) addition of at least one oxygen reactive material in the mixture of AIGS nanostructures and ligand of (a), addition of at least one oxygen reactive material in the admixture of (b), and/or forming a second film comprising at least one oxygen reactive material on top of the first film prepared in (c); and/or
(g) forming a sacrificial barrier layer on the first film prepared in (c) that temporarily blocks oxygen and/or water, and measuring the PCE of the film, then removing the sacrificial barrier layer.

Also provided is a method comprising:
(a) encapsulating the films before thermal processing and/or measurement;
(b) use of oxygen reactive materials as part of the formulation during thermal processing or light exposure; and/or
(c) temporary blocking of oxygen through the use of a sacrificial barrier layer.

In some embodiments, the nanostructures have an emission spectrum with a FWHM of less than 40 nm. In some embodiments, the nanostructures have an emission spectrum with a FWHM of 24-38 nm. In some embodiments, the nanostructures have an emission spectrum with a FWHM of 27-32 nm. In some embodiments, the nanostructures have an emission spectrum with a FWHM of 29-31 nm.

In some embodiments, the nanostructures have a QY of 80-99.9%. In some embodiments, the nanostructures have a QY of 85-95%. In some embodiments, the nanostructures have a QY of about 86-94%. In some embodiments, the nanostructures have an $OD_{450}$/mass $(mL \cdot mg^{-1} \cdot cm^{-1})$ greater than or equal to 0.8, where OD is optical density. In some embodiments, the nanostructures have an $OD_{450}$/mass $(mL \cdot mg^{-1} \cdot cm^{-1})$ in the inclusive range 0.8-2.5. In some embodiments, the nanostructures have an $OD_{450}$/mass $(mL \cdot mg^{-1} \cdot cm^{-1})$ in the inclusive range 0.87-1.9. In some embodiments, the average diameter of the nanostructures is less than 10 nm by transmission electron microscopy (TEM). In some embodiments, the average diameter is about 5 nm.

In some embodiments, at least about 80% of the emission is band-edge emission. In some embodiments, at least about 90% of the emission is band-edge emission. In some embodiments, 92-98% of the emission is band-edge emission. In some embodiments, 93-96% of the emission is band-edge emission.

In some embodiments, the at least one ligand is an amino ligand, polyamino ligand, a ligand comprising a mercapto group, or a ligand comprising a silane group. It was discovered unexpectedly that the use of a polyamino ligand leads to AIGS containing films with a FWHM of greater than 32 nm.

In some embodiments, the at least one polyamino-ligand is a polyamino alkane, a polyamino-cycloalkane, a polyamino heterocyclic compound, a polyamino functionalized silicone, or a polyamino substituted ethylene glycol. In some embodiments, the polyamino-ligand is a $C_{2-20}$ alkane or $C_{2-20}$ cycloalkane substituted by two or three amino groups and optionally containing one or two amino groups in place of a carbon group. In some embodiments, the polyamino-ligand is 1,3-cyclohexanebis(methylamine), 2,2-dimethyl-1,3-propanediamine, or tris(2-aminoethyl)amine.

In some embodiments, the ligand is a compound of formula I.

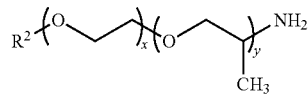

wherein:
x is 1 to 100;
y is 0 to 100; and
$R^2$ is $C_{1-20}$ alkyl.

In some embodiments, x=19, y=3, and $R^2$=—$CH_3$.

In some embodiments, the at least one ligand is (3-aminopropyl)trimethoxy-silane; (3-mercaptopropyl)triethoxysilane; DL-α-lipoic acid; 3,6-dioxa-1,8-octanedithiol; 6-mercapto-1-hexanol; methoxypolyethylene glycol amine (about m.w. 500); poly(ethyleneglycol) methyl ether thiol (about m.w. 800); diethyl phenylphosphonite; dibenzyl N,N-diisopropylphosphoramidite; di-tert-butyl N,N-diisopropylphosphoramidite; tris(2-carboxyethyl)phosphine hydrochloride; poly(ethylene glycol) methyl ether thiol (about m.w. 2000); methoxypolyethylene glycol amine (about m.w.750); acrylamide; or polyethylenimine. M.w. of the polymers is determined by mass spectrometry.

In some embodiments, the at least one ligand is a combination of amino-polyalkylene oxide (about m.w. 1000) and methoxypolyethylene glycol amine (about m.w. 500); amino-polyalkylene oxide (about m.w. 1000) and 6-mercapto-1-hexanol; amino-polyalkylene oxide (about m.w. 1000) and (3-mercaptopropyl)triethoxysilane; and 6-mercapto-1-hexanol and methoxypolyethylene glycol amine (about m.w. 500).

In some embodiments, the one or more metal alkoxide is a metal $C_{1-10}$ alkoxide. In some embodiments, the metal is titanium, zirconium, hafnium, gallium or barium.

In some embodiments, the at least one or more metal alkoxide is zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, or zirconium (IV) tetra-n-isodecyloxide.

In some embodiments, the at least one or more metal alkoxide is zirconium (IV) tetra-n-propoxide.

Also provided is a nanostructure composition comprising:
(a) AIGS nanostructures exhibiting a PCE of greater than 30% after being exposed to yellow light and air storage conditions, and
(b) at least one organic resin.

In some embodiments, the at least one organic resin is cured.

Also provided is a method of preparing the nanostructure compositions described herein, the method comprising:
(a) providing AIGS nanostructures, one or more metal alkoxides, one or more metal alkoxide hydrolysis products, one or more metal halides, one or more metal halide hydrolysis products, one or more organometallic compounds, or one or more organometallic hydrolysis products, or combinations thereof; and at least one ligand;

(b) admixing at least one organic resin with the nanostructures of (a);

(c) preparing a first film comprising the admixed AIGS nanostructures, the at least one ligand, and the at least one organic resin on a first barrier layer;

(d) curing the film by UV irradiation and/or baking; and (e) encapsulating the first film between the first barrier layer and a second barrier layer, wherein the encapsulated film exhibits a conversion efficiency (PCE) of greater than 30% at a peak emission wavelength of 480-545 nm, when excited using a blue light source with a wavelength of about 450 nm, and after being exposed in air to yellow light conditions.

In some embodiments, the method is carried out before the encapsulated film is exposed in air to measurement of the emission spectra of the AIGS nanostructures. In some embodiments, the method is carried out under an inert atmosphere.

In some embodiments, the method further comprises:

(f) addition of at least one oxygen reactive material in the mixture of AIGS nanostructures, the one or more metal alkoxides, one or more metal alkoxide hydrolysis products, one or more metal halides, one or more metal halide hydrolysis products, one or more organometallic compounds, or one or more organometallic hydrolysis products, or combinations thereof; and ligand of (a), (g) addition of at least one oxygen reactive material in the admixture of (b), and/or (h) forming a second film comprising at least one oxygen reactive material on top of the first film prepared in (c); and/or (i) forming a sacrificial barrier layer on the first film prepared in (c) that temporarily blocks oxygen and/or water, and measuring the PCE of the film, then removing the sacrificial barrier layer.

In some embodiments, the two barrier layers exclude oxygen and/or water.

In some embodiments, 92-98% of the emission is band-edge emission. In some embodiments, 93-96% of the emission is band-edge emission.

Also provided is a method of preparing a composition, comprising (a) providing a solvent comprising AIGS nanostructures, one or more metal alkoxides, one or more metal alkoxide hydrolysis products, one or more metal halides, one or more metal halide hydrolysis products, one or more organometallic compounds, or one or more organometallic hydrolysis products, or combinations thereof; and at least one ligand; and (b) admixing the composition obtained in (a) with at least one second ligand.

In some embodiments, the solvent in (a) comprises an organic resin. In some embodiments, the method further comprises ink-jet printing the composition.

In some embodiments, the method further comprises preparing a film comprising the composition obtained in (b). In some embodiments, the method further comprises curing the film. In some embodiments, the film is cured by heating. In some embodiments, the film is cured by exposing to electromagnetic radiation.

Also provided is a device comprising the films described above.

Also provided is a nanostructure molded article comprising:

(a) a first conductive layer;
(b) a second conductive layer; and
(c) a film comprising an AIGS nanostructure layer between the first conductive layer and the second conductive layer, wherein the nanostructure layer comprises AIGS nanostructures having a PCE of greater than 30% after exposure to yellow light and air storage conditions.

Also provided is a nanostructure color converter comprising a back plane;
a display panel disposed on the back plane; and
a film comprising an AIGS nanostructure layer comprising AIGS nanostructures having a PCE of greater than 30% after being exposed to yellow light and air storage conditions, the nanostructure layer disposed on the display panel.

In some embodiments, the nanostructure layer comprises a patterned nanostructure layer. In some embodiments, the back plane comprises an LED, an LCD, an OLED, or a microLED.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present embodiments and, together with the description, further serve to explain the principles of the present embodiments and to enable a person skilled in the relevant art(s) to make and use the present embodiments.

Figure 1:
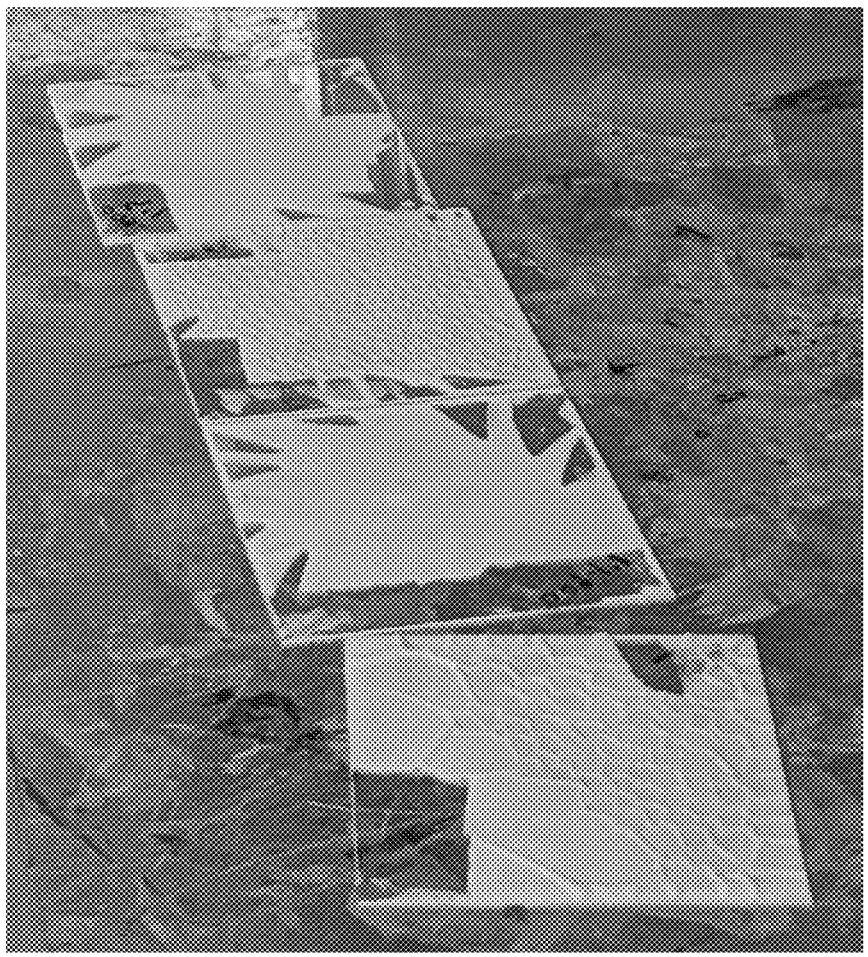
FIG. 1 is a photograph of, from left to right, first and third films that did not contain a polyamino ligand and which exhibited extension wrinkling. The second and fourth films containing the polyamino ligand showed no wrinkling.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number. Unless otherwise indicated, the drawings provided throughout the disclosure should not be interpreted as to-scale drawings.

DETAILED DESCRIPTION OF THE INVENTION

Definitions

Unless defined otherwise, all technical and scientific terms used herein have the same meaning as commonly understood by one of ordinary skill in the art to which the invention pertains. The following definitions supplement those in the art and are directed to the current application and are not to be imputed to any related or unrelated case, e.g., to any commonly owned patent or application. Although any methods and materials similar or equivalent to those described herein can be used in the practice for testing of the present invention, the preferred materials and methods are described herein. Accordingly, the terminology used herein is for the purpose of describing particular embodiments only, and is not intended to be limiting.

As used in this specification and the appended claims, the singular forms "a," "an" and "the" include plural referents unless the context clearly dictates otherwise. Thus, for example, reference to "a nanostructure" includes a plurality of such nanostructures, and the like.

The term "about" as used herein indicates the value of a given quantity varies by +/−10% of the value. For example, "about 100 nm" encompasses a range of sizes from 90 nm to 110 nm, inclusive.

A "nanostructure" is a structure having at least one region or characteristic dimension with a dimension of less than about 500 nm. In some embodiments, the nanostructure has a dimension of less than about 200 nm, less than about 100 nm, less than about 50 nm, less than about 20 nm, or less than about 10 nm. Typically, the region or characteristic dimension will be along the smallest axis of the structure. Examples of such structures include nanowires, nanorods, nanotubes, branched nanostructures, nanotetrapods, tripods, bipods, nanocrystals, nanodots, quantum dots, nanoparticles, and the like. Nanostructures can be, e.g., substantially crystalline, substantially monocrystalline, polycrystalline, amorphous, or a combination thereof. In some embodiments, each of the three dimensions of the nanostructure has a dimension of less than about 500 nm, less than about 200 nm, less than about 100 nm, less than about 50 nm, less than about 20 nm, or less than about 10 nm.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In certain embodiments, the nanostructure comprises a core of a first material and at least one shell of a second (or third etc.) material, where the different material types are distributed radially about the long axis of a nanowire, a long axis of an arm of a branched nanowire, or the center of a nanocrystal, for example. A shell can but need not completely cover the adjacent materials to be considered a shell or for the nanostructure to be considered a heterostructure; for example, a nanocrystal characterized by a core of one material covered with small islands of a second material is a heterostructure. In other embodiments, the different material types are distributed at different locations within the nanostructure; e.g., along the major (long) axis of a nanowire or along a long axis of arm of a branched nanowire. Different regions within a heterostructure can comprise entirely different materials, or the different regions can comprise a base material (e.g., silicon) having different dopants or different concentrations of the same dopant.

As used herein, the "diameter" of a nanostructure refers to the diameter of a cross-section normal to a first axis of the nanostructure, where the first axis has the greatest difference in length with respect to the second and third axes (the second and third axes are the two axes whose lengths most nearly equal each other). The first axis is not necessarily the longest axis of the nanostructure; e.g., for a disk-shaped nanostructure, the cross-section would be a substantially circular cross-section normal to the short longitudinal axis of the disk. Where the cross-section is not circular, the diameter is the average of the major and minor axes of that cross-section. For an elongated or high aspect ratio nanostructure, such as a nanowire, the diameter is measured across a cross-section perpendicular to the longest axis of the nanowire. For a spherical nanostructure, the diameter is measured from one side to the other through the center of the sphere.

The terms "crystalline" or "substantially crystalline," when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide or other coating, or can be comprised of a core and at least one shell. In such instances it will be appreciated that the oxide, shell(s), or other coating can but need not exhibit such ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). The terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one axis of the nanostructure or its core). In addition, it will be appreciated that the interface between a core and the outside of a nanostructure or between a core and an adjacent shell or between a shell and a second adjacent shell may contain non-crystalline regions and may even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

A "nanocrystal" is a nanostructure that is substantially monocrystalline. A nanocrystal thus has at least one region or characteristic dimension with a dimension of less than about 500 nm. In some embodiments, the nanocrystal has a dimension of less than about 200 nm, less than about 100 nm, less than about 50 nm, less than about 20 nm, or less than about 10 nm. The term "nanocrystal" is intended to encompass substantially monocrystalline nanostructures comprising various defects, stacking faults, atomic substitutions, and the like, as well as substantially monocrystalline nanostructures without such defects, faults, or substitutions. In the case of nanocrystal heterostructures comprising a core and one or more shells, the core of the nanocrystal is typically substantially monocrystalline, but the shell(s) need not be. In some embodiments, each of the three dimensions of the nanocrystal has a dimension of less than about 500 nm, less than about 200 nm, less than about 100 nm, less than about 50 nm, less than about 20 nm, or less than about 10 nm.

The term "quantum dot" (or "dot") refers to a nanocrystal that exhibits quantum confinement or exciton confinement. Quantum dots can be substantially homogeneous in material properties, or in certain embodiments, can be heterogeneous, e.g., including a core and at least one shell. The optical properties of quantum dots can be influenced by their particle size, chemical composition, and/or surface composition, and can be determined by suitable optical testing available in the art. The ability to tailor the nanocrystal size, e.g., in the range between about 1 nm and about 15 nm, enables photoemission coverage in the entire optical spectrum to offer great versatility in color rendering.

The term "oxygen-free ligand" refers to coordinating molecules that do not contain oxygen atoms that are able to coordinate to, or react with, metal ions used herein.

A "ligand" is a molecule capable of interacting (whether weakly or strongly) with one or more faces of a nanostructure, e.g., through covalent, ionic, van der Waals, or other molecular interactions with the surface of the nanostructure.

"Photoluminescence quantum yield" (QY) is the ratio of photons emitted to photons absorbed, e.g., by a nanostructure or population of nanostructures. As known in the art, quantum yield is typically determined by the absolute change in photon counts upon illumination of the sample inside an integrating sphere, or a comparative method using well-characterized standard samples with known quantum yield values.

"Peak emission wavelength" (PWL) is the wavelength where the radiometric emission spectrum of the light source reaches its maximum.

As used herein, the term "full width at half-maximum" (FWHM) is a measure of the size distribution of nanostructures. The emission spectra of nanostructures generally have the shape of a Gaussian curve. The width of the Gaussian curve is defined as the FWHM and gives an idea of the size distribution of the particles. A smaller FWHM corresponds to a narrower nanostructure nanocrystal size distribution. FWHM is also dependent upon the emission wavelength maximum.

Band-edge emission is centered at higher energies (lower wavelengths) with a smaller offset from the absorption onset energy as compared to the corresponding defect emission. Additionally, the band-edge emission has a narrower distribution of wavelengths compared to the defect emission. Both band-edge and defect emission follow normal (approximately Gaussian) wavelength distributions.

Optical density (OD) is a commonly used method to quantify the concentration of solutes or nanoparticles. As per Beer-Lambert's law, the absorbance (also known as "extinction") of a particular sample is proportional to the concentration of solutes that absorb a particular wavelength of light.

Optical density is the optical attenuation per centimeter of material as measured using a standard spectrometer, typically specified with a 1 cm path length. Nanostructure solutions are often measured by their optical density in place of mass or molar concentration because it is directly proportional to concentration and it is a more convenient way to express the amount of optical absorption taking place in the nanostructure solution at the wavelength of interest. A nanostructure solution that has an OD of 100 is 100 times more concentrated (has 100 times more particles per mL) than a product that has an OD of 1.

Optical density can be measured at any wavelength of interest, such as at the wavelength chosen to excite a fluorescent nanostructure. Optical density is a measure of the intensity that is lost when light passes through a nanostructure solution at a particular wavelength and is calculated using the formula:

$$OD = \log_{10}*(I_{OUT}/I_{IN})$$

where:
$I_{OUT}$=the intensity of radiation passing into the cell; and
$I_{IN}$=the intensity of radiation transmitted through the cell.

The optical density of a nanostructure solution can be measured using a UV-VIS spectrometer. Thus, through the use of a UV-VIS spectrometer it is possible to calculate the optical density to determine the amount of nanostructures that are present in a sample.

By "yellow light and air storage conditions" is intended to mean films illuminated in air using white LED lights that are covered with blue-blocking filters, wherein the illuminance and color coordinates for the yellow storage conditions are measured by a Konica-Minolta CL-200A chroma meter, as 140 lux, CIE x=0.52, CIE y=0.45.

Unless clearly indicated otherwise, ranges listed herein are inclusive.

A variety of additional terms are defined or otherwise characterized herein.

AIGS Nanostructures

Provided are nanostructures comprising Ag, In, Ga, and S, (AIGS) wherein the nanostructures have a peak emission wavelength (PWL) between 480-545 nm. In some embodiments, at least about 80% of the emission is band-edge emission. The percentage of band-edge emission is calculated by fitting the Gaussian peaks (typically 2 or more) of the nanostructures emission spectrum and comparing the area of the peak that is closer in energy to the nanostructure bandgap (which represents the band-edge emission) to the sum of all peak areas (band-edge+defect emission).

In one embodiment, the nanostructures have a FWHM emission spectrum of less than 40 nm. In another embodiment, the nanostructures have a FWHM of 36-38 nm. In some embodiments, the nanostructure have an emission spectrum with a FWHM of 27-32 nm. In some embodiments, the nanostructure have an emission spectrum with a FWHM of 29-31 nm.

In another embodiment, the nanostructures have a QY of about 80% to 99.9%. In another embodiment, the nanostructures have a QY of 85-95%. In another embodiment, the nanostructures have a QY of about 86% to about 94%. In some embodiments, at least 80% of the emission is band-edge emission. In other embodiments, at least 90% of the emission is band-edge emission. In other embodiments, at least 95% of the emission is band-edge emission. In some embodiments, 92-98% of the emission is band-edge emission. In some embodiments, 93-96% of the emission is band-edge emission.

The AIGS nanostructures provide high blue light absorption. As a predictive value for blue light absorption efficiency, the optical density at 450 nm on a per mass basis ($OD_{450}$/mass) is calculated by measuring the optical density of a nanostructure solution in a 1 cm path length cuvette and dividing by the dry mass per mL (mg/mL) of the same solution after removing all volatiles under vacuum (<200 mTorr). In one embodiment, the nanostructures provided herein have an $OD_{450}$/mass (mL·mg$^{-1}$·cm$^{-1}$) of at least 0.8. In another embodiment, the nanostructures have an $OD_{450}$/mass (mL·mg$^{-1}$·cm$^{-1}$) of 0.8-2.5. In another embodiment, the nanostructures have an $OD_{450}$/mass (mL·mg$^{-1}$·cm$^{-1}$) of 0.87-1.9.

In one embodiment, the nanostructures have been treated with gallium ions such that ion exchange of gallium for indium occurs throughout the AIGS nanostructure. In another embodiment, the nanostructures have Ag, In, Ga, and S in the core and treated by ion exchange with gallium ions and S. In another embodiment, the nanostructures have Ag, In, Ga, and S in the core and treated by ion exchange with silver ions, gallium ions and S. In some embodiments, the ion exchange treatment leads to a gradient of gallium, silver and/or sulfur throughout the nanostructures.

In one embodiment, the average diameter of the nanostructures is less than 10 nm as measured by TEM. In another embodiment, the average diameter is about 5 nm.

AIGS Nanostructures Prepared Using a $GaX_3$ (X=F, Cl, or Br) Precursor and an Oxygen-Free Ligand Reports of AIGS preparation in the literature have not attempted to exclude oxygen-containing ligands. In the coating of AIGS with gallium, oxygen-containing ligands are often used to stabilize the Ga precursor. Commonly gallium(III) acetylacetonate is used as an easily air-handled precursor, whereas Ga(III) chloride requires careful handling due to moisture sensitivity. For example, in Kameyama et al., *ACS Appl. Mater. Interfaces* 10:42844-42855 (2018), gallium (III) acetylacetonate was used as the precursor for core and core/shell structures. Since gallium has a high affinity for oxygen, oxygen-containing ligands and using a gallium precursor that was not prepared under oxygen-free conditions may produce unwanted side reactions, such as gallium oxides, when Ga and S precursors are used to produce nanostructures that contain a significant gallium content. These side reactions may lead to defects in the nanostructures and result in lower quantum yields.

In some embodiments, AIGS nanostructures are prepared using oxygen-free $GaX_3$ (X=F, Cl, or Br) as a precursor in the preparation of the AIGS core. In some embodiments, AIGS nanostructures are prepared using $GaX_3$ (X=F, Cl, or Br) as a precursor and an oxygen-free ligand in the preparation of Ga enriched AIGS nanostructures. In some embodiments, AIGS nanostructures are prepared using $GaX_3$ (X=F, Cl, or Br) as a precursor and an oxygen-free ligand in the preparation of the AIGS core. In some embodiments, AIGS nanostructures are prepared using $GaX_3$ (X=F, Cl, or Br) as a precursor and an oxygen-free ligand in the preparation of the AIGS core and in the ion exchange treatment the AIGS cores.

Provided are nanostructures comprising Ag, In, Ga, and S, wherein the nanostructures have a peak emission wavelength (PWL) between 480-545 nm, and wherein the nanostructures were prepared using a $GaX_3$ (X=F, Cl, or Br) precursor and an oxygen-free ligand.

In some embodiments, the nanostructures prepared using a $GaX_3$ (X=F, Cl, or Br) precursor and an oxygen-free ligand display a FWHM emission spectrum of 35 nm or less. In some embodiments, the nanostructures prepared using a $GaX_3$ (X=F, Cl, or Br) precursor and an oxygen-free ligand display a FWHM of 30-38 nm. In some embodiments, the nanostructures prepared using a $GaX_3$ (X=F, Cl, or Br) precursor and an oxygen-free ligand have a QY of at least 75%. In some embodiments, the nanostructures prepared using a $GaX_3$ (X=F, Cl, or Br) precursor and an oxygen-free ligand have a QY of 75-90%. In some embodiments, the nanostructures prepared using $GaX_3$ (X=F, Cl, or Br) precursor and an oxygen-free ligand have a QY of about 80%.

The AIGS nanostructures prepared herein provide high blue light absorption. In some embodiments, the nanostructures have an $OD_{450}$/mass (mL·mg$^{-1}$·cm$^{-1}$) of at least 0.8. In some embodiments, the nanostructures have an $OD_{450}$/mass (mL·mg$^{-1}$·cm$^{-1}$) of 0.8-2.5. In another embodiment, the nanostructures have an $OD_{450}$/mass (mL·mg$^{-1}$·cm$^{-1}$) of 0.87-1.9.

In some embodiments, the nanostructures are treated with gallium ions such that ion exchange of gallium for indium occurs throughout the AIGS nanostructure. In some embodiments, the nanostructures comprise Ag, In, Ga, and S in the core with a gradient of gallium between the surface and the center of the nanostructure. In some embodiments, the nanostructures are AIGS cores treated with AGS and are prepared using a $GaX_3$ (X=F, Cl, or Br) precursor and an oxygen-free ligand in the core. In some embodiments, the nanostructures are AIGS nanostructures are prepared using a $GaX_3$ (X=F, Cl, or Br) precursor and an oxygen-free ligand. In some embodiments, the AIGS nanostructures are prepared by reacting a pre-formed In—Ga reagent with $Ag_2S$ nanostructures to give AIGS nanostructures, followed by ion exchange with gallium by reacting with an oxygen-free Ga salt to form the AIGS nanostructures.

Methods of Making AIGS Nanostructures

Provided are methods of making the AIGS nanostructures, comprising:
  (a) preparing a mixture comprising AIGS cores, a sulfur source, and a ligand;
  (b) adding the mixture obtained in (a) to a mixture of a gallium carboxylate and a ligand at a temperature of 180-300° C. to give ion-exchanged nanostructures with a gradient of gallium from the surface to the center of the nanostructures; and
  (c) isolating the nanostructures.

In some embodiments, the nanostructures have a PWL of 480-545 nm, wherein at least about 60% of the emission is band-edge emission.

Also provided is method of making the AIGS nanostructures, comprising
  (a) reacting Ga(acetylacetonate)$_3$, InCl$_3$, and a ligand optionally in a solvent at a temperature sufficient to give an In—Ga reagent, and
  (b) reacting the In—Ga reagent with $Ag_2S$ nanostructures at a temperature sufficient to make AIGS nanostructures,
  (c) reacting the AIGS nanostructures with an oxygen-free Ga salt in a solvent containing a ligand at a temperature sufficient to give ion-exchanged nanostructures with a gradient of gallium from the surface to the center of the nanostructures.

In some embodiments, the nanostructures have a PWL of 480-545 nm, wherein at least about 60% of the emission is band-edge emission.

In some embodiments, the ligand is an alkyl amine. In some embodiments, the alkylamine ligand is oleylamine. In some embodiment, the ligand is used in excess and acts as a solvent and the recited solvent is absent in the reaction. In some embodiments, the solvent is present in the reaction. In some embodiment, the solvent is a high boiling solvent. In some embodiments, the solvent is octadecene, squalane, dibenzyl ether or xylene. In some embodiments, the temperature sufficient in (a) is 100 to 280° C.; the temperature sufficient in (b) is 150 to 260° C.; and the temperature sufficient in (c) is 170 to 280° C. In some embodiments, the temperature sufficient in (a) is about 210° C., the temperature sufficient in (b) is about 210° C., and the temperature sufficient in (c) is about 240° C.

In some embodiments, at least 80% of the emission is band-edge emission. In other embodiments, at least 90% of the emission is band-edge emission. In other embodiments, at least 95% of the emission is band-edge emission. In some embodiments, 92-98% of the emission is band-edge emission. In some embodiments, 93-96% of the emission is band-edge emission.

Examples of ligands are disclosed in U.S. Pat. Nos. 7,572,395, 8,143,703, 8,425,803, 8,563,133, 8,916,064, 9,005,480, 9,139,770, and 9,169,435, and in U.S. Patent Application Publication No. 2008/0118755. In one embodiment, the ligand is an alkyl amine. In some embodiments, the ligand is an alkyl amine selected from the group consisting of dodecylamine, oleylamine, hexadecylamine, dioctylamine, and octadecylamine.

In some embodiments, the sulfur source in (a) comprises trioctylphosphine sulfide, elemental sulfur, octanethiol, dodecanethiol, octadecanethiol, tributylphosphine sulfide, cyclohexyl isothiocyanate, α-toluenethiol, ethylene trithiocarbonate, allyl mercaptan, bis(trimethylsilyl) sulfide, trioctylphosphine sulfide, or combinations thereof. In some embodiments, the sulfur source in (a) is derived from $S_8$.

In one embodiment, the sulfur source is derived from $S_8$.

In one embodiment, the temperature in (a) and (b) is about 270° C.

In some embodiments, the mixture in (b) further comprises a solvent. In some embodiments, the solvent is trioctylphosphine, dibenzyl ether, or squalane.

In some embodiments, the gallium carboxylate is a gallium $C_{2-24}$ carboxylate. Examples of $C_{2-24}$ carboxylates include acetate, propionate, butanoate, pentanoate, hexanoate, heptanoate, octanoate, nonanoate, decanoate, undecanoate, tridecanoate, tetradecanoate, pentadecanoate, hexadecanoate, octadecanoate (oleate), nonadecanoate, and icosanoate. In one embodiment, the gallium carboxylate is gallium oleate.

In some embodiments, the ratio of gallium carboxylate to AIGS cores is 0.008-0.2 mmol gallium carboxylate per mg AIGS. In one embodiment, the ratio of gallium carboxylate to AIGS cores is about 0.04 mmol gallium carboxylate per mg AIGS.

In a further embodiment, the AIGS nanostructures are isolated, e.g., by precipitation. In some embodiments, the AIGS nanostructures are precipitated by addition of a non-solvent for the AIGS nanostructures. In some embodiments, the non-solvent is a toluene/ethanol mixture. The precipitated nanostructures may be further isolated by centrifugation and washing with a non-solvent for the nanostructures.

Also provided is a method of making the nanostructures, comprising:
(a) preparing a mixture comprising AIGS cores and a gallium halide in a solvent and holding the mixture for a time sufficient to give ion-exchanged nanostructures with a gradient of gallium from the surface to the center of the nanostructures; and
(b) isolating the nanostructures.

In some embodiments, the nanostructures have a PWL of 480-545 nm, and wherein at least about 60% of the emission is band-edge emission.

In some embodiments, at least 80% of the emission is band-edge emission. In other embodiments, at least 90% of the emission is band-edge emission. In other embodiments, at least 95% of the emission is band-edge emission.

In some embodiments, the gallium halide is gallium chloride, bromide or iodide. In one embodiment, the gallium halide is gallium iodide.

In some embodiments, the solvent comprises trioctylphosphine. In some embodiments, the solvent comprises toluene.

In some embodiments, the time sufficient in (a) is from 0.1-200 hours. In some embodiments, the time sufficient in (a) is about 20 hours.

In some embodiments, the mixture is held at 20 to 100° C. In one embodiment, the mixture is held at about room temperature (20° C. to 25° C.).

In some embodiments, the molar ratio of gallium halide to AIGS cores is from about 0.1 to about 30.

In a further embodiment, the AIGS nanostructures are isolated, e.g., by precipitation. In some embodiments, the AIGS nanostructures are precipitated by addition of a non-solvent for the AIGS nanostructures. In some embodiments, the non-solvent is a toluene/ethanol mixture. The precipitated nanostructures may be further isolated by centrifugation and/or washing with a non-solvent for the nanostructures.

Also provided are methods of making nanostructures, comprising:
(a) preparing a mixture comprising AIGS nanostructures, a sulfur source, and a ligand;
(b) adding the mixture obtained in (a) to a mixture of a $GaX_3$ (X=F, Cl, or Br) and an oxygen-free ligand at a temperature of 180-300° C. to give ion-exchanged nanostructures with a gradient of gallium from the surface to the center of the nanostructures; and
(d) isolating the nanostructures.

In some embodiments, the nanostructures have a PWL of 480-545 nm.

In some embodiments, the preparing in (a) is under oxygen-free conditions. In some embodiments, the preparing in (a) is in a glovebox.

In some embodiments, the adding in (b) is under oxygen-free conditions. In some embodiments, the adding in (b) is in a glovebox.

In some embodiments, at least 80% of the emission is band-edge emission. In other embodiments, at least 90% of the emission is band-edge emission. In other embodiments, at least 95% of the emission is band-edge emission.

Examples of ligands are disclosed in U.S. Pat. Nos. 7,572,395, 8,143,703, 8,425,803, 8,563,133, 8,916,064, 9,005,480, 9,139,770, and 9,169,435, and in U.S. Patent Application Publication No. 2008/0118755. In some embodiments, the ligand in (a) is an oxygen-free ligand. In some embodiments, the ligand in (b) is an oxygen-free ligand. In some embodiments, the ligand in (a) and (b) is an alkyl amine. In some embodiments, the ligand is an alkyl amine selected from the group consisting of dodecylamine, oleylamine, hexadecylamine, dioctylamine, and octadecylamine. In some embodiments, the ligand in (a) is oleylamine. In some embodiments, the ligand in (b) is oleylamine. In some embodiments, the ligand in (a) and (b) is oleylamine.

In one embodiment, the sulfur source is derived from Ss.

In one embodiment, the temperature in (a) and (b) is about 270° C.

In some embodiments, the mixture in (b) further comprises a solvent. In some embodiments, the solvent is trioctylphosphine, dibenzyl ether, or squalane.

In some embodiments, the $GaX_3$ is gallium chloride, gallium fluoride, or gallium iodide. In some embodiments, the $GaX_3$ is gallium chloride. In some embodiments, the $GaX_3$ is Ga(III) chloride.

In some embodiments, the ratio of $GaX_3$ to AIGS cores is 0.008-0.2 mmol $GaX_3$ per mg AIGS. In some embodiments, the molar ratio of $GaX_3$ to AIGS cores is from about 0.1 to about 30. In some embodiments, the ratio of $GaX_3$ to AIGS cores is about 0.04 mmol $GaX_3$ per mg AIGS.

In some embodiments, the AIGS nanostructures are isolated, e.g., by precipitation. In some embodiments, the AIGS nanostructures are precipitated by addition of a non-solvent for the AIGS nanostructures. In some embodiments, the non-solvent is a toluene/ethanol mixture. The precipitated nanostructures may be further isolated by centrifugation and/or washing with a non-solvent for the nanostructures.

In some embodiments, the mixture in (a) is held at 20° C. to 100° C. In some embodiments, the mixture in (a) is held at about room temperature (20° C. to 25° C.).

In some embodiments, the mixture in (b) is held at 200° C. to 300° C. for 0.1 hour to 200 hours. In some embodiments, the mixture in (b) is held at 200° C. to 300° C. for about 20 hours.

Doped AIGS Nanostructures

In some embodiments, the AIGS nanostructures are doped. In some embodiments, the dopant of the nanocrystal core comprises a metal, including one or more transition metals. In some embodiments, the dopant is a transition metal selected from the group consisting of Ti, Zr, Hf, V, Nb, Ta, Cr, Mo, W, Mn, Tc, Re, Fe, Ru, Os, Co, Rh, Ir, Ni, Pd, Pt, Cu, Ag, Au, and combinations thereof. In some embodiments, the dopant comprises a non-metal. In some embodiments, the dopant is ZnS, ZnSe, ZnTe, CdSe, CdS, CdTe, HgS, HgSe, HgTe, $CuInS_2$, $CuInSe_2$, AlN, AlP, AlAs, GaN, GaP, or GaAs.

In some embodiments, the core is purified by precipitation from a non-solvent. In some embodiments, the AIGS nanostructures are filtered to remove precipitate from the core solution.

Nanostructure Compositions

In some embodiments, the present disclosure provides a nanostructure composition comprising:

(a) at least one population of AIGS nanostructures; and
(b) at least one organic resin.

In some embodiments, the nanostructures have a PWL between 480-545 nm.

In some embodiments, at least 80% of the nanostructure emission is band-edge emission. In other embodiments, at least 90% of the emission is band-edge emission. In other embodiments, at least 95% of the emission is band-edge emission. In some embodiments, 92-98% of the emission is band-edge emission. In some embodiments, 93-96% of the emission is band-edge emission.

In some embodiments, the nanostructure composition further comprises at least one second population of nanostructures. The nanostructures having a PWL between 480-545 nm emit green light. Additional populations of nanostructures may be added that emit in the green, yellow, orange, and/or red regions of the spectrum. These nanostructures have a PWL greater than 545 nm. In some embodiments, the nanostructures have a PWL between 550-750 nm. The size of the nanostructures determines the emission wavelength. The at least one second population of nanostructures may comprise a Group III-V nanocrystal selected from the group consisting of BN, BP, BAs, BSb, AlN, AlP, AlAs, AlSb, GaN, GaP, GaAs, GaSb, InN, InP, InAs, and InSb. In some embodiments, the core of the second population of nanostructures is an InP nanocrystal.

Organic Resin

In some embodiments, the organic resin is a thermosetting resin or an ultraviolet (UV) curable resin. In some embodiments, the organic resin is cured by a method that facilitates roll-to-roll processing.

Thermosetting resins require curing in which they undergo an irreversible molecular cross-linking process which renders the resin infusible. In some embodiments, the thermosetting resin is an epoxy resin, a phenolic resin, a vinyl resin, a melamine resin, a urea resin, an unsaturated polyester resin, a polyurethane resin, an allyl resin, an acrylic resin, a polyamide resin, a polyamide-imide resin, a phenolamine condensation polymerization resin, a urea melamine condensation polymerization resin, or combinations thereof.

In some embodiments, the thermosetting resin is an epoxy resin. Epoxy resins are easily cured without evolution of volatiles or by-products by a wide range of chemicals. Epoxy resins are also compatible with most substrates and tend to wet surfaces easily. See Boyle, M. A., et al., "Epoxy Resins," Composites, Vol. 21, ASM Handbook, pages 78-89 (2001).

In some embodiments, the organic resin is a silicone thermosetting resin. In some embodiments, the silicone thermosetting resin is OE6630A or OE6630B (Dow Corning Corporation, Auburn, Mich.).

In some embodiments, a thermal initiator is used. In some embodiments, the thermal initiator is AIBN [2,2'-Azobis(2-methylpropionitrile)] or benzoyl peroxide.

UV curable resins are polymers that cure and quickly harden when exposed to a specific light wavelength. In some embodiments, the UV curable resin is a resin having as a functional group a radical-polymerization group such as a (meth)acryloxy group, a vinyloxy group, a styryl group, or a vinyl group; a cation-polymerizable group such as an epoxy group, a thioepoxy group, a vinyloxy group, or an oxetanyl group. In some embodiments, the UV curable resin is a polyester resin, a polyether resin, a (meth)acrylic resin, an epoxy resin, a urethane resin, an alkyd resin, a spiroacetal resin, a polybutadiene resin, or a polythiolpolyene resin.

In some embodiments, the UV curable resin is selected from the group consisting of isobornyl acrylate, isobornyl methacrylate, phenoxyethyl acrylate, phenoxyethyl methacrylate, urethane acrylate, allyloxylated cyclohexyl diacrylate, bis(acryloxy ethyl)hydroxyl isocyanurate, bis(acryloxy neopentylglycol)adipate, bisphenol A diacrylate, bisphenol A dimethacrylate, 1,4-butanediol diacrylate, 1,4-butanediol dimethacrylate, 1,3-butyleneglycol diacrylate, 1,3-butyleneglycol dimethacrylate, dicyclopentanyl diacrylate, diethyleneglycol diacrylate, diethyleneglycol dimethacrylate, dipentaerythritol hexaacrylate, dipentaerythritol monohydroxy pentaacrylate, di(trimethylolpropane) tetraacrylate, ethyleneglycol dimethacrylate, glycerol methacrylate, 1,6-hexanediol diacrylate, 1,6-hexanediol dimethacrylate, neopentylglycol dimethacrylate, neopentylglycol hydroxypivalate diacrylate, pentaerythritol triacrylate, pentaerythritol tetraacrylate, phosphoric acid dimethacrylate, polyethyleneglycol diacrylate, polypropyleneglycol diacrylate, tetraethyleneglycol diacrylate, tetrabromobisphenol A diacrylate, triethyleneglycol divinylether, triglycerol diacrylate, trimethylolpropane triacrylate, tripropyleneglycol diacrylate, tris (acryloxyethyl)isocyanurate, phosphoric acid triacrylate, phosphoric acid diacrylate, acrylic acid propargyl ester, vinyl terminated polydimethylsiloxane, vinyl terminated diphenylsiloxane-dimethylsiloxane copolymer, vinyl terminated polyphenylmethylsiloxane, vinyl terminated trifluoromethylsiloxane-dimethylsiloxane copolymer, vinyl terminated diethylsiloxane-dimethylsiloxane copolymer, vinylmethylsiloxane, monomethacryloyloxypropyl terminated polydimethyl siloxane, monovinyl terminated polydimethyl siloxane, monoallyl-mono trimethylsiloxy terminated polyethylene oxide, and combinations thereof.

In some embodiments, the UV curable resin is a mercapto-functional compound that can be cross-linked with an isocyanate, an epoxy, or an unsaturated compound under UV curing conditions. In some embodiments, the polythiol is pentaerythritol tetra(3-mercapto-propionate) (PETMP); trimethylol-propane tri(3-mercapto-propionate) (TMPMP); glycol di(3-mercapto-propionate) (GDMP); tris[25-(3-mercapto-propionyloxy)ethyl]isocyanurate (TEMPIC); di-pentaerythritol hexa(3-mercapto-propionate) (Di-PETMP); ethoxylated trimethylolpropane tri(3-mercapto-propionate) (ETTMP 1300 and ETTMP 700); polycaprolactone tetra(3-mercapto-propionate) (PCL4MP 1350); pentaerythritol tetramercaptoacetate (PETMA); trimethylol-propane trimercaptoacetate (TMPMA); or glycol dimercaptoacetate (GDMA). These compounds are sold under the trade name THIOCURE® by Bruno Bock, Marschacht, Germany.

In some embodiments, the UV curable resin is a polythiol. In some embodiments, the UV curable resin is a polythiol selected from the group consisting of ethylene glycol bis (thioglycolate), ethylene glycol bis(3-mercaptopropionate), trimethylol propane tris (thioglycolate), trimethylol propane tris (3-mercaptopropionate), pentaerythritol tetrakis (thioglycolate), pentaerythritol tetrakis(3-mercaptopropionate) (PETMP), and combinations thereof. In some embodiments, the UV curable resin is PETMP.

In some embodiments, the UV curable resin is a thiol-ene formulation comprising a polythiol and 1,3,5-Triallyl-1,3,5-triazine-2,4,6 (1H,3H,5H)-trione (TTT). In some embodiments, the UV curable resin is a thiol-ene formulation comprising PETMP and TTT.

In some embodiments, the UV curable resin further comprises a photoinitiator. A photoinitiator initiates the crosslinking and/or curing reaction of the photosensitive material during exposure to light. In some embodiments, the photoinitiator is acetophenone-based, benzoin-based, or thioxathenone-based.

In some embodiments, the photoinitiator is a vinyl acrylate-based resin. In some embodiments, the photoinitiator is MINS-311RM (Minuta Technology Co., Ltd, Korea).

In some embodiments, the photoinitiator is IRGACURE® 127, IRGACURE® 184, IRGACURE® 184D, IRGACURE® 2022, IRGACURE® 2100, IRGACURE® 250, IRGACURE® 270, IRGACURE® 2959, IRGACURE® 369, IRGACURE® 369 EG, IRGACURE® 379, IRGACURE® 500, IRGACURE® 651, IRGACURE® 754, IRGACURE® 784, IRGACURE® 819, IRGACURE® 819Dw, IRGACURE® 907, IRGACURE® 907 FF, IRGACURE® Oxe01, IRGACURE® TPO-L, IRGACURE® 1173, IRGACURE® 1173D, IRGACURE® 4265, IRGACURE® BP, or IRGACURE® MBF (BASF Corporation, Wyandotte, Mich.). In some embodiments, the photoinitiator is TPO (2,4,6-trimethylbenzoyl-diphenyl-phosphine oxide) or MBF (methyl benzoylformate).

In some embodiments, the weight percentage of the at least one organic resin in the nanostructure composition is between about 5% and about 99%, about 5% and about 95%, about 5% and about 90%, about 5% and about 80%, about 5% and about 70%, about 5% and about 60%, about 5% and about 50%, about 5% and about 40%, about 5% and about 30%, about 5% and about 20%, about 5% and about 10%, about 10% and about 99%, about 10% and about 95%, about 10% and about 90%, about 10% and about 80%, about 10% and about 70%, about 10% and about 60%, about 10% and about 50%, about 10% and about 40%, about 10% and about 30%, about 10% and about 20%, about 20% and about 99%, about 20% and about 95%, about 20% and about 90%, about 20% and about 80%, about 20% and about 70%, about 20% and about 60%, about 20% and about 50%, about 20% and about 40%, about 20% and about 30%, about 30% and about 99%, about 30% and about 95%, about 30% and about 90%, about 30% and about 80%, about 30% and about 70%, about 30% and about 60%, about 30% and about 50%, about 30% and about 40%, about 40% and about 99%, about 40% and about 95%, about 40% and about 90%, about 40% and about 80%, about 40% and about 70%, about 40% and about 60%, about 40% and about 50%, about 50% and about 99%, about 50% and about 95%, about 50% and about 90%, about 50% and about 80%, about 50% and about 70%, about 50% and about 60%, about 60% and about 99%, about 6000 and about 9500, about 600% and about 9000, about 600% and about 800%, about 600% and about 70%, about 70% and about 99%, about 70% and about 95%, about 70% and about 90%, about 70% and about 80%, about 80% and about 99%, about 80% and about 95%, about 80% and about 90%, about 90% and about 99%, about 90% and about 95%, or about 95% and about 99%.

Method of Preparing AIGS Nanostructure Composition

The present disclosure provides a method of preparing a nanostructure composition, the method comprising:
(a) providing at least one population of AIGS nanostructures; and
(b) admixing at least one organic resin with the composition of (a).

In some embodiments, the nanostructures have a PWL of between 480-545 nm, and at least about 80% of the emission is band-edge emission. In some embodiments, at least 80% of the emission is band-edge emission. In other embodiments, at least 90% of the emission is band-edge emission. In other embodiments, at least 95% of the emission is band-edge emission. In some embodiments, 92-98% of the emission is band-edge emission. In some embodiments, 93-96% of the emission is band-edge emission.

The present disclosure also provides a method of preparing a nanostructure composition, the method comprising:
(a) providing at least one population of AIGS nanostructures and one or more metal alkoxides, one or more metal alkoxide hydrolysis products, one or more metal halides, one or more metal halide hydrolysis products, one or more organometallic compounds, or one or more organometallic hydrolysis products, or combinations thereof, and wherein the nanostructures were prepared using a $GaX_3$ (X=F, Cl, or Br) precursor and an oxygen-free ligand; and
(b) admixing at least one organic resin with the composition of (a).

In some embodiments, the nanostructures have a PWL of between 480-545 nm, and at least about 60% of the emission is band-edge emission.

The present disclosure also provides a method of preparing a nanostructure composition, the method comprising:

(a) providing at least one population of AIGS nanostructures, wherein the nanostructures have a PWL of between 480-545 nm, wherein at least about 80% of the emission is band-edge emission, and wherein the nanostructures exhibit a QY of 80-99%; and (b) admixing at least one organic resin with the composition of (a).

In some embodiments, the at least one population of nanostructures is admixed with at least one organic resin at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm.

In some embodiments, the at least one population of nanostructures is admixed with at least one organic resin for a time of between about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, the at least one population of nanostructures is admixed with at least one organic resin at a temperature between about −5° C. and about 100° C., about −5° C. and about 75° C., about −5° C. and about 50° C., about −5° C. and about 23° C., about 23° C. and about 100° C., about 23° C. and about 75° C., about 23° C. and about 50° C., about 50° C. and about 100° C., about 50° C. and about 75° C., or about 75° C. and about 100° C. In some embodiments, the at least one organic resin is admixed with the at least one population of nanostructures at a temperature between about 23° C. and about 50° C.

In some embodiments, if more than one organic resin is used, the organic resins are added together and mixed. In some embodiments, a first organic resin is mixed with a second organic resin at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm.

In some embodiments, a first organic resin is mixed with a second organic resin for a time of between about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

Properties of AIGS Nanostructures

In some embodiments, the AIGS nanostructures display a high photoluminescence quantum yield. In some embodiments, the nanostructures display a photoluminescence quantum yield of between about 50% and about 99%, about 50% and about 95%, about 50% and about 90%, about 50% and about 85%, about 50% and about 80%, about 50% and about 70%, about 50% and about 60%, 60% and about 99%, about 60% and about 95%, about 60% and about 90%, about 60% and about 85%, about 60% and about 80%, about 60% and about 70%, about 70% and about 99%, about 70% and about 95%, about 70% and about 90%, about 70% and about 85%, about 70% and about 80%, about 80% and about 99%, about 80% and about 95%, about 80% and about 90%, about 80% and about 85%, about 85% and about 99%, about 85% and about 95%, about 80% and about 85%, about 85% and about 99%, about 85% and about 90%, about 90% and about 99%, about 90% and about 95%, or about 95% and about 99%. In some embodiments, the nanostructures display a photoluminescence quantum yield of between about 82% and about 96%, between about 85% and about 96%, and between about 93% and about 94%.

The photoluminescence spectrum of the nanostructures can cover a wide desired portion of the spectrum. In some embodiments, the photoluminescence spectrum for the nanostructures have an emission maximum between 300 nm and 750 nm, 300 nm and 650 nm, 300 nm and 550 nm, 300 nm and 450 nm, 450 nm and 750 nm, 450 nm and 650 nm, 450 nm and 550 nm, 450 nm and 750 nm, 450 nm and 650 nm, 450 nm and 550 nm, 550 nm and 750 nm, 550 nm and 650 nm, or 650 nm and 750 nm. In some embodiments, the photoluminescence spectrum for the nanostructures has an emission maximum of between 450 nm and 550 nm.

The size distribution of the nanostructures can be relatively narrow. In some embodiments, the photoluminescence spectrum of the population of nanostructures can have a full width at half maximum of between 10 nm and 60 nm, 10 nm and 40 nm, 10 nm and 30 nm, 10 nm and 20 nm, 20 nm and 60 nm, 20 nm and 40 nm, 20 nm and 30 nm, 25 nm and 60 nm, 25 nm and 40 nm, 25 nm and 30 nm, 30 nm and 60 nm, 30 nm and 40 nm, or 40 nm and 60 nm. In some embodiments, the photoluminescence spectrum of the population of nanostructures can have a full width at half maximum of between 24 nm and 50 nm.

In some embodiments, the nanostructures emit light having a peak emission wavelength (PWL) between about 400 nm and about 650 nm, about 400 nm and about 600 nm, about 400 nm and about 550 nm, about 400 nm and about 500 nm, about 400 nm and about 450 nm, about 450 nm and about 650 nm, about 450 nm and about 600 nm, about 450 nm and about 550 nm, about 450 nm and about 500 nm, about 500 nm and about 650 nm, about 500 nm and about 600 nm, about 500 nm and about 550 nm, about 550 nm and about 650 nm, about 550 nm and about 600 nm, or about 600 nm and about 650 nm. In some embodiments, the nanostructures emit light having a PWL between about 500 nm and about 550 nm.

As a predictive value for blue light absorption efficiency, the optical density at 450 nm on a per mass basis ($OD_{450}$/mass) can be calculated by measuring the optical density of a nanostructure solution in a 1 cm path length cuvette and dividing by the dry mass per mL of the same solution after removing all volatiles under vacuum (<200 mTorr) In some embodiments, the nanostructures have an optical density at 450 nm on a per mass basis ($OD_{450}$/mass) of between about 0.28/mg and about 0.5/mg, about 0.28/mg and about 0.4/mg, about 0.28/mg and about 0.35/mg, about 0.28/mg and about 0.32/mg, about 0.32/mg and about 0.5/mg, about 0.32/mg and about 0.4/mg, about 0.32/mg and about 0.35/mg, about 0.35/mg and about 0.5/mg, about 0.35/mg and about 0.4/mg, or about 0.4/mg and about 0.5/mg.

Films

The nanostructures of the present invention can be embedded in a polymeric matrix using any suitable method. As used herein, the term "embedded" is used to indicate that the nanostructures are enclosed or encased with the polymer that makes up the majority of the component of the matrix. In some embodiments, the at least one nanostructure population is suitably uniformly distributed throughout the matrix. In some embodiments, the at least one nanostructure population is distributed according to an application-specific distribution. In some embodiments, the nanostructures are mixed in a polymer and applied to the surface of a substrate.

In some embodiments, the present disclosure provides a nanostructure film layer comprising:
  (a) a composition comprising at least one population of AIGS nanostructures, one or more metal alkoxides, one or more metal alkoxide hydrolysis products, one or more metal halides, one or more metal halide hydrolysis products, one or more organometallic compounds, or one or more organometallic hydrolysis products, or combinations thereof, and at least one ligand bound to the nanostructures; and
  (b) at least one organic resin.

In some embodiments, a fraction of the ligands is bound to the nanostructures. In other embodiments, the nanostructure surfaces are saturated with the ligands.

In some embodiments, the nanostructures have a PWL between 480 and 545 nm.

The present disclosure also provides a method of preparing a nanostructure film layer comprising:
  (a) providing at least one population of AIGS nanostructures and one or more metal alkoxides, one or more metal alkoxide hydrolysis products, one or more metal halides, one or more metal halide hydrolysis products, one or more organometallic compounds, or one or more organometallic hydrolysis products, or combinations thereof, and
  (b) admixing at least one organic resin with the composition of (a).

In some embodiments, the nanostructures have a PWL of between 480-545 nm.

In some embodiments, at least 80% of the emission is band-edge emission. In other embodiments, at least 90% of the emission is band-edge emission. In other embodiments, at least 95% of the emission is band-edge emission. In some embodiments, 92-98% of the emission is band-edge emission. In some embodiments, 93-96% of the emission is band-edge emission.

In some embodiments, the nanostructure composition further comprises an amino ligand having Formula I:

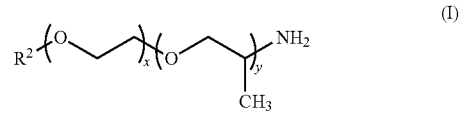

(I)

wherein:
  x is 1 to 100;
  y is 0 to 100; and
  $R^2$ is $C_{1-20}$ alkyl.

In some embodiments, x is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, x is 10 to 50. In some embodiments, x is 10 to 20. In some embodiments, x is 1. In some embodiments, x is 19. In some embodiments, x is 6. In some embodiments, x is 10.

In some embodiments, $R^2$ is $C_{1-20}$ alkyl. In some embodiments, $R^2$ is $C_{1-10}$ alkyl. In some embodiments, $R^2$ is $C_{1-5}$ alkyl. In some embodiments, $R^2$ is —$CH_2CH_3$.

In some embodiments, the compound of Formula I is a commercially available amine-terminated polymer from Huntsman Petrochemical Corporation. In some embodiments, the amine-terminated polymer of formula (VI) has x=1, y=9, and $R^2$=—$CH_3$ and is JEFFAMINE M-600 (Huntsman Petrochemical Corporation, Texas). JEFFAMINE M-600 has a molecular weight of approximately 600. In some embodiments, the amine-terminated polymer of formula (III) has x=19, y=3, and $R^2$=—$CH_3$ and is JEFFAMINE M-1000 (Huntsman Petrochemical Corporation, Texas). JEFFAMINE M-1000 has a molecular weight of approximately 1,000. In some embodiments, the amine-terminated polymer of formula (III) has x=6, y=29, and $R^2$=—$CH_3$ and is JEFFAMINE M-2005 (Huntsman Petrochemical Corporation, Texas). JEFFAMINE M-2005 has a molecular weight of approximately 2,000. In some embodiments, the amine-terminated polymer of formula (III) has x=31, y=10, and $R^2$=—$CH_3$ and is JEFFAMINE M-2070 (Huntsman Petrochemical Corporation, Texas). JEFFAMINE M-2070 has a molecular weight of approximately 2,000. In another embodiment, the ligand is a polyethylene glycol amine available from CreativePEGWorks such as PEG550-amine and PEG350-amine.

In some embodiments, the nanostructure film layer is a color conversion layer.

The nanostructure composition can be deposited by any suitable method known in the art, including but not limited to painting, spray coating, solvent spraying, wet coating, adhesive coating, spin coating, tape-coating, roll coating, flow coating, inkjet vapor jetting, drop casting, blade coating, mist deposition, or a combination thereof. In some embodiments, the nanostructure composition is cured after deposition. Suitable curing methods include photo-curing, such as UV curing, and thermal curing. Traditional laminate film processing methods, tape-coating methods, and/or roll-to-roll fabrication methods can be employed in forming the nanostructure films of the present invention. The nanostructure composition can be coated directly onto the desired layer of a substrate. Alternatively, the nanostructure composition can be formed into a solid layer as an independent element and subsequently applied to the substrate. In some embodiments, the nanostructure composition can be deposited on one or more barrier layers.

Metal Alkoxides

Metal alkoxides have the general formula $M(OR)_x$, wherein R is straight chain, branched chain, or cyclic alkyl, typically containing 1 to 10 carbon atoms, and x is the valency of the metal. In some embodiments, the metal alkoxides include metal methoxide, metal ethoxide, metal n-propoxide, metal isopropoxide, metal n-butoxide, metal isobutoxide, metal n-pentoxide, metal isopentoxide, metal n-hexoxide, metal isohexoxide, metal n-heptoxide, metal isoheptoxide, metal n-octoxide, metal n-isooctoxide, metal n-nonoxide, metal n-isononoxide, metal n-decyloxide, and metal n-isodecyloxide.

In some embodiments, the metals of the metal alkoxides include one or more of lithium, sodium, potassium, rubidium, cesium, beryllium, magnesium, calcium, strontium, barium, scandium, yttrium, lutetium, lanthanum, cerium, praseodymium, neodymium, samarium, europium, gadolinium, terbium, dysprosium, holmium, erbium, thulium, ytterbium, titanium, zirconium, hafnium, vanadium, niobium, tantalum, chromium, molybdenum, tungsten, manganese, rhenium, iron, ruthenium, osmium, cobalt, nickel, platinum, copper, zinc, cadmium, boron, aluminum, gallium, indium, thallium, silicon, germanium, tin, lead, arsenic, antimony, and bismuth. In some embodiments, the metals include one or more of aluminum, antimony, arsenic, barium, bismuth, boron, cerium, gadolinium, gallium, germanium, hafnium, indium, iron, lanthanum, lithium, magnesium, molybdenum, neodymium, phosphorus, silicon, sodium, strontium, tantalum, thallium, tin, titanium, tungsten, vanadium, yttrium, zinc, and zirconium.

In some embodiments, the metal alkoxide comprises one or more of the group 4 metals including titanium, zirconium, and hafnium.

In some embodiments, the metal alkoxide is at least one zirconium alkoxide including zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, and zirconium (IV) tetra-n-isodecyloxide.

In some embodiments, the metal alkoxide is capable of forming a sol-gel around the AIGS nanostructures, thus forming an oxygen barrier and providing for stabilization of the AIGS nanostructures. See Brinker and Scherer, (1990) Sol-Gel Science: The Physics and Chemistry of Sol-Gel Processing. Academic Press.

In some embodiments, the metal alkoxide is present in at least 0.005 wt % (50 ppm) in the AIGS film composition. In some embodiments, the metal oxide is present in an amount of about 0.03 to about 3 wt % in the AIGS film composition. In some embodiments, the metal oxide is present in an amount of about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.6, about 2.7, about 2.8, about 2.9 or about 3 wt % in the film composition.

Metal Alkoxide Hydrolysis Products

Metal alkoxide hydrolysis products have the general formula $M(OH)_x(OR)_y$, wherein R is straight chain, branched chain, or cyclic alkyl, typically containing 1 to 10 carbon atoms, and x+y equals the valency of the metal. Metal alkoxide hydrolysis products include zirconium (IV) monohydroxide trimethoxide, zirconium (IV) dihydroxide dimethoxide, zirconium (IV) trihydroxide monomethoxide, zirconium (IV) tetrahydroxide, zirconium (IV) monohydroxide triethoxide, zirconium (IV) dihydroxide diethoxide, zirconium (IV) trihydroxide monoethoxide, zirconium (IV) monohydroxide tri-n-propoxide, zirconium (IV) dihydroxide di-n-propoxide, zirconium (IV) trihydroxide mono-n-propoxide, zirconium (IV) monohydroxide triisopropoxide, zirconium (IV) dihydroxide diisopropoxide, zirconium (IV) trihydroxide monoisopropoxide, zirconium (IV) monohydroxide tri-n-butoxide, zirconium (IV) dihydroxide di-n-butoxide, zirconium (IV) trihydroxide mono-n-butoxide, zirconium (IV) monohydroxide triisobutoxide, zirconium (IV) dihydroxide diisobutoxide, zirconium (IV) trihydroxide monoisobutoxide, zirconium (IV) monohydroxide tri-n-pentoxide, zirconium (IV) dihydroxide di-n-pentoxide, zirconium (IV) trihydroxide mono-n-pentoxide, zirconium (IV) monohydroxide triisopentoxide, zirconium (IV) dihydroxide diisopentoxide, zirconium (IV) trihydroxide monoisopentoxide, zirconium (IV) monohydroxide tri-n-hexoxide, zirconium (IV) dihydroxide di-n-hexoxide, zirconium (IV) trihydroxide mono-n-hexoxide, zirconium (IV) monohydroxide triisohexoxide, zirconium (IV) dihydroxide diisohexoxide, zirconium (IV) trihydroxide monoisohexoxide, zirconium (IV) monohydroxide tri-n-heptoxide, zirconium (IV) dihydroxide di-n-heptoxide, zirconium (IV) trihydroxide mono-n-heptoxide, zirconium (IV) monohydroxide triisoheptoxide, zirconium (IV) dihydroxide diisoheptoxide, zirconium (IV) trihydroxide monoisoheptoxide, zirconium (IV) monohydroxide tri-n-octoxide, zirconium (IV) dihydroxide di-n-octoxide, zirconium (IV) trihydroxide mono-n-octoxide, zirconium (IV) monohydroxide tri-n-isooctoxide, zirconium (IV) dihydroxide di-n-isooctoxide, zirconium (IV) trihydroxide mono-n-isooctoxide, zirconium (IV) monohydroxide tri-n-nonoxide, zirconium (IV) dihydroxide di-n-nonoxide, zirconium (IV) trihydroxide mono-n-nonoxide, zirconium (IV) monohydroxide tri-n-isononoxide, zirconium (IV) dihydroxide di-n-isononoxide, zirconium (IV) trihydroxide mono-n-isononoxide, zirconium (IV) monohydroxide tri-n-decyloxide, zirconium (IV) dihydroxide di-n-decyloxide, zirconium (IV) trihydroxide mono-n-decyloxide, zirconium (IV) monohydroxide tri-n-isodecyloxide, zirconium (IV) dihydroxide di-n-isodecyloxide, zirconium (IV) trihydroxide mono-n-isodecyloxide, titanium (IV) monohydroxide trimethoxide, titanium (IV) dihydroxide dimethoxide, titanium (IV) trihydroxide monomethoxide, titanium (IV) tetrahydroxide, titanium (IV) monohydroxide triethoxide, titanium (IV) dihydroxide diethoxide, titanium (IV) trihydroxide monoethoxide, titanium (IV) monohydroxide tri-n-propoxide, titanium (IV) dihydroxide di-n-propoxide, titanium (IV) trihydroxide mono-n-propoxide, titanium (IV) monohydroxide triisopropoxide, titanium (IV) dihydroxide diisopropoxide, titanium (IV) trihydroxide monoisopropoxide, titanium (IV) monohydroxide tri-n-butoxide, titanium (IV) dihydroxide di-n-butoxide, titanium (IV) trihydroxide mono-n-butoxide, titanium (IV) monohydroxide triisobutoxide, titanium (IV) dihydroxide diisobutoxide, titanium (IV) trihydroxide monoisobutoxide, titanium (IV) monohydroxide tri-n-pentoxide, titanium (IV) dihydroxide di-n-pentoxide, titanium (IV) trihydroxide mono-n-pentoxide, titanium (IV) monohydroxide triisopentoxide, titanium (IV) dihydroxide diisopentoxide, titanium (IV) trihydroxide monoisopentoxide, titanium (IV) monohydroxide tri-n-hexoxide, titanium (IV) dihydroxide di-n-hexoxide, titanium (IV) trihydroxide mono-n-hexoxide, titanium (IV) monohydroxide triisohexoxide, titanium (IV) dihydroxide diisohexoxide, titanium (IV) trihydroxide monoisohexoxide, titanium (IV) monohydroxide tri-n-heptoxide, titanium (IV) dihydroxide di-n-heptoxide, titanium (IV) trihydroxide mono-n-heptoxide, titanium (IV) monohydroxide triisoheptoxide, titanium (IV) dihydroxide diisoheptoxide, titanium (IV) trihydroxide monoisoheptoxide, titanium (IV) monohydroxide tri-n-octoxide, titanium (IV) dihydroxide di-n-octoxide, titanium (IV) trihydroxide mono-n-octoxide, titanium (IV) monohydroxide tri-n-isooctoxide, titanium (IV) dihydroxide di-n-isooctoxide, titanium (IV) trihydroxide mono-n-isooctoxide, titanium (IV) monohydroxide tri-n-nonoxide, titanium (IV) dihydroxide di-n-nonoxide, titanium (IV) trihydroxide mono-n-nonoxide, titanium (IV) monohydroxide tri-n-isononoxide, titanium (IV) dihydroxide di-n-isononoxide, titanium (IV) trihydroxide mono-n-isononoxide, titanium (IV) monohydroxide tri-n-decyloxide, titanium (IV) dihydroxide di-n-decyloxide, titanium (IV) trihydroxide mono-n-decyloxide, titanium (IV) monohydroxide tri-n-isodecyloxide, titanium (IV) dihydroxide di-n-isodecyloxide, titanium (IV) trihydroxide mono-n-isodecyloxide, hafnium (IV) monohydroxide trimethoxide, hafnium (IV) dihydroxide dimethoxide, hafnium (IV) trihydroxide monomethoxide, hafnium (IV) tetrahydroxide, hafnium (IV) monohydroxide triethoxide, hafnium (IV) dihydroxide diethoxide, hafnium (IV) trihydroxide monoethoxide, hafnium (IV) monohydroxide tri-n-propoxide, hafnium (IV) dihydroxide di-n-propoxide, hafnium (IV) trihydroxide mono-n-propoxide, hafnium (IV) monohydroxide triisopropoxide, hafnium (IV) dihydroxide diisopropoxide, hafnium (IV) trihydroxide monoisopropoxide, hafnium (IV) monohydroxide tri-n-butoxide, hafnium (IV) dihydroxide di-n-butoxide, hafnium (IV) trihydroxide mono-n-butoxide, hafnium (IV) monohydroxide triisobutoxide, hafnium (IV) dihydroxide diisobutoxide, hafnium (IV) trihydroxide monoisobutoxide, hafnium (IV) monohydroxide tri-n-pentoxide, hafnium (IV) dihydroxide di-n-pentoxide, hafnium (IV) trihydroxide mono-n-pentoxide, hafnium (IV) monohydroxide triisopentoxide, hafnium (IV) dihydroxide diisopentoxide, hafnium (IV) trihydroxide monoisopentoxide, hafnium (IV) monohydroxide tri-n-hexoxide, hafnium (IV) dihydroxide di-n-hexoxide, hafnium (IV) trihydroxide mono-n-hexoxide, hafnium (IV) monohydroxide triisohexoxide, hafnium (IV) dihydroxide diisohexoxide, hafnium (IV) trihydroxide monoisohexoxide, hafnium (IV) monohydroxide tri-n-heptoxide, hafnium (IV) dihydroxide di-n-heptoxide, hafnium (IV) trihydroxide mono-n-heptoxide, hafnium (IV) monohydroxide triisoheptoxide, hafnium (IV) dihydroxide diisoheptoxide, hafnium (IV) trihydroxide monoisoheptoxide, hafnium (IV) monohydroxide tri-n-octoxide, hafnium (IV) dihydroxide di-n-octoxide, hafnium (IV) trihydroxide mono-n-octoxide, hafnium (IV) monohydroxide tri-n-isooctoxide, hafnium (IV) dihydroxide di-n-isooctoxide, hafnium (IV) trihydroxide mono-n-isooctoxide, hafnium (IV) monohydroxide tri-n-nonoxide, hafnium (IV) dihydroxide di-n-nonoxide, hafnium (IV) trihydroxide mono-n-nonoxide, hafnium (IV) monohydroxide tri-n-isononoxide, hafnium (IV) dihydroxide di-n-isononoxide, hafnium (IV) trihydroxide mono-n-isononoxide, hafnium (IV) monohydroxide tri-n-decyloxide, hafnium (IV) dihydroxide di-n-decyloxide, hafnium (IV) trihydroxide mono-n-decyloxide, hafnium (IV) monohydroxide tri-n-isodecyloxide, hafnium (IV) dihydroxide di-n-isodecyloxide, and hafnium (IV) trihydroxide mono-n-isodecyloxide.

In some embodiments, the metal alkoxide hydrolysis product is present in at least 0.005 wt % (50 ppm) in the AIGS film composition. In some embodiments, the metal oxide hydrolysis product is present in an amount of about 0.03 to about 3 wt % in the AIGS film composition. In some embodiments, the metal oxide hydrolysis product is present in an amount of about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.6, about 2.7, about 2.8, about 2.9 or about 3 wt % in the film composition.

Metal Halides

Metal halides have the general formula $MX_y$, wherein y is the valency of the metal. Metal halides include zirconium (IV) tetrafluoride, zirconium (IV) tetrachloride, zirconium (IV) tetrabromide, zirconium (IV) tetraiodide, titanium (IV) tetrafluoride, titanium (IV) tetrachloride, titanium (IV) tetrabromide, titanium (IV) tetraiodide, hafnium (IV) tetrafluoride, hafnium (IV) tetrachloride, hafnium (IV) tetrabromide, hafnium (IV) tetraiodide, gallium (III) trifluoride, gallium (III) trichloride, gallium (III) tribromide, and gallium (III) triiodide.

In some embodiments, the metal halide is present in at least 0.005 wt % (50 ppm) in the AIGS film composition. In some embodiments, the metal halide is present in an amount of about 0.03 to about 3 wt % in the AIGS film composition. In some embodiments, the metal halide is present in an amount of about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.6, about 2.7, about 2.8, about 2.9 or about 3 wt % in the film composition.

Metal Halide Hydrolysis Products

Metal halide hydrolysis products have the general formula $MX_y(OH)_x$, wherein x+y equals the valency of the metal. Metal halide hydrolysis products include zirconium (IV) monohydroxide trichloride, zirconium (IV) dihydroxide difluoride, zirconium (IV) trihydroxide monofluoride, zirconium (IV) tetrahydroxide, titanium (IV) monohydroxide trifluoride, titanium (IV) dihydroxide difluoride, titanium (IV) trihydroxide monofluoride, titanium (IV) tetrahydroxide, titanium (IV) monohydroxide trifluoride, titanium (IV) dihydroxide difluoride, titanium (IV) trihydroxide monofluoride, titanium (IV) tetrahydroxide, hafnium (IV) monohydroxide trifluoride, hafnium (IV) dihydroxide difluoride, hafnium (IV) trihydroxide monofluoride, hafnium (IV) tetrahydroxide, zirconium (IV) monohydroxide trichloride, zirconium (IV) dihydroxide dichloride, zirconium (IV) trihydroxide monochloride, zirconium (IV) tetrahydroxide, titanium (IV) monohydroxide trichloride, titanium (IV) dihydroxide dichloride, titanium (IV) trihydroxide monochloride, titanium (IV) tetrahydroxide, titanium (IV) monohydroxide trichloride, titanium (IV) dihydroxide dichloride, titanium (IV) trihydroxide monochloride, titanium (IV) tetrahydroxide, hafnium (IV) monohydroxide trichloride, hafnium (IV) dihydroxide dichloride, hafnium (IV) trihydroxide monochloride, hafnium (IV) tetrahydroxide, zirconium (IV) monohydroxide tribromide, zirconium (IV) dihydroxide dibromide, zirconium (IV) trihydroxide monobromide, zirconium (IV) tetrahydroxide, titanium (IV) monohydroxide tribromide, titanium (IV) dihydroxide dibromide, titanium (IV) trihydroxide monobromide, titanium (IV) tetrahydroxide, titanium (IV) monohydroxide tribromide, titanium (IV) dihydroxide dibromide, titanium (IV) trihydroxide monobromide, titanium (IV) tetrahydroxide, hafnium (IV) monohydroxide tribromide, hafnium (IV) dihydroxide dibromide, hafnium (IV) trihydroxide monobromide, hafnium (IV) tetrahydroxide, zirconium (IV) monohydroxide triiodide, zirconium (IV) dihydroxide diiodide, zirconium (IV) trihydroxide monoiodide, zirconium (IV) tetrahydroxide, titanium (IV) monohydroxide triiodide, titanium (IV) dihydroxide diiodide, titanium (IV) trihydroxide monoiodide, titanium (IV) tetrahydroxide, titanium (IV) monohydroxide triiodide, titanium (IV) dihydroxide diiodide, titanium (IV) trihydroxide monoiodide, titanium (IV) tetrahydroxide, hafnium (IV) monohydroxide triiodide, hafnium (IV) dihydroxide diiodide, hafnium (IV) trihydroxide monoiodide, and hafnium (IV) tetrahydroxide.

In some embodiments, the metal halide hydrolysis product is present in at least 0.005 wt % (50 ppm) in the AIGS film composition. In some embodiments, the metal oxide is present in an amount of about 0.03 to about 3 wt % in the AIGS film composition. In some embodiments, the metal halide hydrolysis product is present in an amount of about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.6, about 2.7, about 2.8, about 2.9 or about 3 wt % in the film composition.

Organometallic Compounds

Organometallic compounds contain metal-carbon bonds and may have the formula $R_xM$, wherein R is straight chain, branched chain, or cyclic alkyl, typically containing 1 to 10 carbon atoms, and x is the valency of the metal. Organometallic compounds include tetramethylzirconium, tetraethylzirconium, tetra-n-propylzirconium, tetraisopropylzirconium, tetra-n-butylzirconium, tetraisobutylzirconium, tetra-n-pentylzirconium, tetra isopentylzirconium, tetra-n-hexylzirconium, tetraisohexylzirconium, tetra-n-heptylzirconium, tetraisoheptylzirconium, tetra-n-octylzirconium, tetra-n-isooctylzirconium, tetra-n-nonylzirconium, tetra-n-isononylzirconium, tetra-n-decylzirconium, tetra-n-isodecylzirconium, tetramethyltitanium, tetraethyltitanium, tetra-n-propyltitanium, tetraisopropyltitanium, tetra-n-butyltitanium, tetraisobutyltitanium, tetra-n-pentyltitanium, tetra isopentyltitanium, tetra-n-hexyltitanium, tetraisohexyltitanium, tetra-n-heptyltitanium, tetraisoheptyltitanium, tetra-n-octyltitanium, tetra-n-isooctyltitanium, tetra-n-nonyltitanium, tetra-n-isononyltitanium, tetra-n-decyltitanium, tetra-n-isodecyltitanium, tetramethylhafnium, tetraethylhafnium, tetra-n-propylhafnium, tetraisopropylhafnium, tetra-n-butylhafnium, tetraisobutylhafnium, tetra-n-pentylhafnium, tetraisopentylhafnium, tetra-n-hexylhafnium, tetraisohexylhafnium, tetra-n-heptylhafnium, tetraisoheptylhafnium, tetra-n-octylhafnium, tetra-n-isooctylhafnium, tetra-n-nonylhafnium, tetra-n-isononylhafnium, tetra-n-decylhafnium, and tetra-n-isodecylhafnium.

In some embodiments, the organometallic compound is present in at least 0.005 wt % (50 ppm) in the AIGS film composition. In some embodiments, the organometallic compound is present in an amount of about 0.03 to about 3 wt % in the AIGS film composition. In some embodiments, the organometallic compound is present in an amount of about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.6, about 2.7, about 2.8, about 2.9 or about 3 wt % in the film composition.

Organometallic Hydrolysis Compounds

Organometallic hydrolysis products may have the formula $R_xM(OH)_y$, wherein R is straight chain, branched chain, or cyclic alkyl, typically containing 1 to 10 carbon atoms, and x+y equals the valency of the metal. Organometallic hydrolysis products include trimethylzirconium monohydroxide, triethylzirconium monohydroxide, tri-n-propylzirconium monohydroxide, triisopropylzirconium monohydroxide, tri-n-butylzirconium monohydroxide, triisobutylzirconium monohydroxide, tri-n-pentylzirconium monohydroxide, tri isopentylzirconium monohydroxide, tri-n-hexylzirconium monohydroxide, triisohexylzirconium monohydroxide, tri-n-heptylzirconium monohydroxide, triisoheptylzirconium monohydroxide, tri-n-octylzirconium monohydroxide, tri-n-isooctylzirconium monohydroxide, tri-n-nonylzirconium monohydroxide, tri-n-isononylzirconium monohydroxide, tri-n-decylzirconium monohydroxide, tri-n-isodecylzirconium monohydroxide, trimethyltitanium monohydroxide, triethyltitanium monohydroxide, tri-n-propyltitanium monohydroxide, triisopropyltitanium monohydroxide, tri-n-butyltitanium monohydroxide, triisobutyltitanium monohydroxide, tri-n-pentyltitanium monohydroxide, tri isopentyltitanium monohydroxide, tri-n-hexyltitanium monohydroxide, triisohexyltitanium monohydroxide, tri-n-heptyltitanium monohydroxide, triisoheptyltitanium monohydroxide, tri-n-octyltitanium monohydroxide, tri-n-isooctyltitanium monohydroxide, tri-n-nonyltitanium monohydroxide, tri-n-isononyltitanium monohydroxide, tri-n-decyltitanium monohydroxide, tri-n-isodecyltitanium monohydroxide, trimethylhafnium monohydroxide, triethylhafnium monohydroxide, tri-n-propylhafnium monohydroxide, triisopropylhafnium monohydroxide, tri-n-butylhafnium monohydroxide, triisobutylhafnium monohydroxide, tri-n-pentylhafnium monohydroxide, triisopentylhafnium monohydroxide, tri-n-hexylhafnium monohydroxide, triisohexylhafnium monohydroxide, tri-n-heptylhafnium monohydroxide, triisoheptylhafnium monohydroxide, tri-n-octylhafnium monohydroxide, tri-n-isooctylhafnium monohydroxide, tri-n-nonylhafnium monohydroxide, tri-n-isononylhafnium monohydroxide, tri-n-decylhafnium monohydroxide, tri-n-isodecylhafnium monohydroxide, dimethylzirconium dihydroxide, diethylzirconium dihydroxide, di-n-propylzirconium dihydroxide, diisopropylzirconium dihydroxide, di-n-butylzirconium dihydroxide, diisobutylzirconium dihydroxide, di-n-pentylzirconium dihydroxide, di isopentylzirconium dihydroxide, di-n-hexylzirconium dihydroxide, diisohexylzirconium dihydroxide, di-n-heptylzirconium dihydroxide, diisoheptylzirconium dihydroxide, di-n-octylzirconium dihydroxide, di-n-isooctylzirconium dihydroxide, di-n-nonylzirconium dihydroxide, di-n-isononylzirconium dihydroxide, di-n-decylzirconium dihydroxide, di-n-isodecylzirconium dihydroxide, dimethyltitanium dihydroxide, diethyltitanium dihydroxide, di-n-propyltitanium dihydroxide, diisopropyltitanium dihydroxide, di-n-butyltitanium dihydroxide, diisobutyltitanium dihydroxide, di-n-pentyltitanium dihydroxide, di isopentyltitanium dihydroxide, di-n-hexyltitanium dihydroxide, diisohexyltitanium dihydroxide, di-n-heptyltitanium dihydroxide, diisoheptyltitanium dihydroxide, di-n-octyltitanium dihydroxide, di-n-isooctyltitanium dihydroxide, di-n-nonyltitanium dihydroxide, di-n-isononyltitanium dihydroxide, di-n-decyltitanium dihydroxide, di-n-isodecyltitanium dihydroxide, dimethylhafnium dihydroxide, diethylhafnium dihydroxide, di-n-propylhafnium dihydroxide, diisopropylhafnium dihydroxide, di-n-butylhafnium dihydroxide, diisobutylhafnium dihydroxide, di-n-pentylhafnium dihydroxide, diisopentylhafnium dihydroxide, di-n-hexylhafnium dihydroxide, diisohexylhafnium dihydroxide, di-n-heptylhafnium dihydroxide, diisoheptylhafnium dihydroxide, di-n-octylhafnium dihydroxide, di-n-isooctylhafnium dihydroxide, di-n-nonylhafnium dihydroxide, di-n-isononylhafnium dihydroxide, di-n-decylhafnium dihydroxide, di-n-isodecylhafnium dihydroxide, monomethylzirconium trihydroxide, monoethylzirconium trihydroxide, mono-n-propylzirconium trihydroxide, monoisopropylzirconium trihydroxide, mono-n-butylzirconium trihydroxide, monoisobutylzirconium trihydroxide, mono-n-pentylzirconium trihydroxide, mono isopentylzirconium trihydroxide, mono-n-hexylzirconium trihydroxide, monoisohexylzirconium trihydroxide, mono-n-heptylzirconium trihydroxide, monoisoheptylzirconium trihydroxide, mono-n-octylzirconium trihydroxide, mono-n-isooctylzirconium trihydroxide, mono-n-nonylzirconium trihydroxide, mono-n-isononylzirconium trihydroxide, mono-n-decylzirconium trihydroxide, mono-n-isodecylzirconium trihydroxide, monomethyltitanium trihydroxide, monoethyltitanium trihydroxide, mono-n-propyltitanium trihydroxide, monoisopropyltitanium trihydroxide, mono-n-butyltitanium trihydroxide, monoisobutyltitanium trihydroxide, mono-n-pentyltitanium trihydroxide, mono isopentyltitanium trihydroxide, mono-n-hexyltitanium trihydroxide, monoisohexyltitanium trihydroxide, mono-n-heptyltitanium trihydroxide, monoisoheptyltitanium trihydroxide, mono-n-octyltitanium trihydroxide, mono-n-isooctyltitanium trihydroxide, mono-n-nonyltitanium trihydroxide, mono-n-isononyltitanium trihydroxide, mono-n-decyltitanium trihydroxide, mono-n-isodecyltitanium trihydroxide, monomethylhafnium trihydroxide, monoethylhafnium trihydroxide, mono-n-propylhafnium trihydroxide, monoisopropylhafnium trihydroxide, mono-n-butylhafnium trihydroxide, monoisobutylhafnium trihydroxide, mono-n-pentylhafnium trihydroxide, monoisopentylhafnium trihydroxide, mono-n-hexylhafnium trihydroxide, monoisohexylhafnium trihydroxide, mono-n-heptylhafnium trihydroxide, monoisoheptylhafnium trihydroxide, mono-n-octylhafnium trihydroxide, mono-n-isooctylhafnium trihydroxide, mono-n-nonylhafnium trihydroxide, mono-n-isononylhafnium trihydroxide, mono-n-decylhafnium trihydroxide, mono-n-isodecylhafnium trihydroxide, zirconium tetrahydroxide, titantium tetrahydroxide, and hafnium tetrahyroxide.

In some embodiments, the organometallic hydrolysis compound is present in at least 0.005 wt % (50 ppm) in the AIGS film composition. In some embodiments, the organometallic hydrolysis compound is present in an amount of about 0.03 to about 3 wt % in the AIGS film composition. In some embodiments, the organometallic hydrolysis compound is present in an amount of about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.6, about 2.7, about 2.8, about 2.9 or about 3 wt % in the film composition.

Methods of Making Hydrolysis Compounds

Methods of making hydrolysis compounds may be made by contact of the compound with moisture, an acidic solution or a basic solution. In one embodiment, 10 µl 1 N aqueous NaOH solution is added to 1 g zirconium propoxide in 4 ml ethanol. After the reaction mixture is stirred 30 min at room temperature, 10 µl 1 N aqueous HCl is added to neutralize the reaction mixture. The resulting viscous liquid is used as hydrolysis product after removing volatiles by vacuum.

Spin Coating

In some embodiments, the nanostructure composition is deposited onto a substrate using spin coating. In spin coating a small amount of material is typically deposited onto the center of a substrate loaded a machine called the spinner which is secured by a vacuum. A high speed of rotation is applied on the substrate through the spinner which causes centripetal force to spread the material from the center to the edge of the substrate. While most of the material would be spun off, a certain amount remains on the substrate, forming a thin film of material on the surface as the rotation continues. The final thickness of the film is determined by the nature of the deposited material and the substrate in addition to the parameters chosen for the spin process such as spin speed, acceleration, and spin time. For typical films, a spin speed of 1500 to 6000 rpm is used with a spin time of 10-60 seconds. In some embodiments, films are deposited at very low speeds, e.g., less than 1000 rpm. In some embodiments, the films are cast at about 300, about 400, about 500, about 600, about 700, about 800 or about 900 rpm.

Mist Deposition

In some embodiments, the nanostructure composition is deposited onto a substrate using mist deposition. Mist deposition takes place at room temperature and atmospheric pressure and allows precise control over film thickness by changing the process conditions. During mist deposition, a liquid source material is turned into a very fine mist and carried to the deposition chamber by nitrogen gas. The mist is then drawn to the wafer surface by a high voltage potential between the field screen and the wafer holder. Once the droplets coalesce on the wafer surface, the wafer is removed from the chamber and thermally cured to allow the solvent to evaporate. The liquid precursor is a mixture of solvent and material to be deposited. It is carried to the atomizer by pressurized nitrogen gas. Price, S. C., et al., "Formation of Ultra-Thin Quantum Dot Films by Mist Deposition," ESC Transactions 11:89-94 (2007).

Spray Coating

In some embodiments, the nanostructure composition is deposited onto a substrate using spray coating. The typical equipment for spray coating comprises a spray nozzle, an atomizer, a precursor solution, and a carrier gas. In the spray deposition process, a precursor solution is pulverized into micro sized drops by means of a carrier gas or by atomization (e.g., ultrasonic, air blast, or electrostatic). The droplets that come out of the atomizer are accelerated by the substrate surface through the nozzle by help of the carrier gas which is controlled and regulated as desired. Relative motion between the spray nozzle and the substrate is defined by design for the purpose of full coverage on the substrate.

In some embodiments, application of the nanostructure composition further comprises a solvent. In some embodiments, the solvent for application of the nanostructure composition is water, organic solvents, inorganic solvents, halogenated organic solvents, or mixtures thereof. Illustrative solvents include, but are not limited to, water, $D_2O$, acetone, ethanol, dioxane, ethyl acetate, methyl ethyl ketone, isopropanol, anisole, γ-butyrolactone, dimethylformamide, N-methylpyrroldinone, dimethylacetamide, hexamethylphosphoramide, toluene, dimethylsulfoxide, cyclopentanone, tetramethylene sulfoxide, xylene, ε-caprolactone, tetrahydrofuran, tetrachloroethylene, chloroform, chlorobenzene, dichloromethane, 1,2-dichloroethane, 1,1,2,2-tetrachloroethane, or mixtures thereof.

Ink-Jet Printing

Solvents suitable for inkjet printing of nanostructures are known to those of skill in the art. In some embodiments, the organic solvent is a substituted aromatic or heteroaromatic solvent described in U.S. Patent Appl. Publication No. 2018/0230321, which is incorporated herein by reference in its entirety.

In some embodiments, the organic solvent used in a nanostructure composition used as an inkjet printing formulation is defined by its boiling point, viscosity, and surface tension. Properties of organic solvents suitable for inkjet printing formulations are shown in TABLE 1.

TABLE 1

Properties of organic solvents for inkjet printing formulations

| Solvent | Boiling Point (° C.) | Viscosity (mPa · S) | Surface tension (dyne/cm) |
|---|---|---|---|
| 1-Methylnaphthalene | 240 | 3.3 | 38 |
| 1-Methoxynaphthalene | 270 | 7.2 | 43 |
| 3-Phenoxytoluene | 271 | 4.8 | 37 |
| Dibenzyl ether | 298 | 8.7 | 39 |
| Benzyl benzoate | 324 | 10.0 | 44 |
| Butyl benzoate | 249 | 2.7 | 34 |
| Hexyl benzoate | 272 | — | — |
| Octylbenzene | 265 | 2.6 | 31 |
| Cyclohexylbenzene | 240 | 2.0 | 34 |
| Hexadecane | 287 | 3.4 | 28 |
| 4-Methylanisole | 179 | — | 29 |

In some embodiments, the organic solvent has a boiling point at 1 atmosphere of between about 150° C. and about 350° C. In some embodiments the organic solvent has a boiling point at 1 atmosphere of between about 150° C. and about 350° C., about 150° C. and about 300° C., about 150° C. and about 250° C., about 150° C. and about 200° C., about 200° C. and about 350° C., about 200° C. and about 300° C., about 200° C. and about 250° C., about 250° C. and about 350° C., about 250° C. and about 300° C., or about 300° C. and about 350° C.

In some embodiments, the organic solvent has a viscosity between about 1 mPa·s and about 15 mPa·s. In some embodiments, the organic solvent has a viscosity between about 1 mPa·s and about 15 mPa·s, about 1 mPa·s and about 10 mPa·s, about 1 mPa·s and about 8 mPa·s, about 1 mPa·s and about 6 mPa·s, about 1 mPa·s and about 4 mPa·s, about 1 mPa·s and about 2 mPa·s, about 2 mPa·s and about 15 mPa·s, about 2 mPa·s and about 10 mPa·s, about 2 mPa·s and about 8 mPa·s, about 2 mPa·s and about 6 mPa·s, about 2 mPa·s and about 4 mPa·s, about 4 mPa·s and about 15 mPa·s, about 4 mPa·s and about 10 mPa·s, about 4 mPa·s and about 8 mPa·s, about 4 mPa·s and about 6 mPa·s, about 6 mPa·s and about 15 mPa·s, about 6 mPa·s and about 10 mPa·s, about 6 mPa·s and about 8 mPa·s, about 8 mPa·s and about 15 mPa·s, about 8 mPa·s and about 10 mPa·s, or about 10 mPa·s and about 15 mPa·s.

In some embodiments, the organic solvent has a surface tension of between about 20 dyne/cm and about 50 dyne/cm. In some embodiments, the organic solvent has a surface tension of between about 20 dyne/cm and about 50 dyne/cm, about 20 dyne/cm and about 40 dyne/cm, about 20 dyne/cm and about 35 dyne/cm, about 20 dyne/cm and about 30 dyne/cm, about 20 dyne/cm and about 25 dyne/cm, about 25 dyne/cm and about 50 dyne/cm, about 25 dyne/cm and about 40 dyne/cm, about 25 dyne/cm and about 35 dyne/cm, about 25 dyne/cm and about 30 dyne/cm, about 30 dyne/cm and about 50 dyne/cm, about 30 dyne/cm and about 40 dyne/cm, about 30 dyne/cm and about 35 dyne/cm, about 35 dyne/cm and about 50 dyne/cm, about 35 dyne/cm and about 40 dyne/cm, or about 40 dyne/cm and about 50 dyne/cm.

In some embodiments, the organic solvent used in the nanostructure composition is an alkylnaphthalene, an alkoxynaphthalene, an alkylbenzene, an aryl, an alkyl-substituted benzene, a cycloalkylbenzene, a $C_9$-$C_{20}$ alkane, a diarylether, an alkyl benzoate, an aryl benzoate, or an alkoxy-substituted benzene.

In some embodiments, the organic solvent used in a nanostructure composition is 1-tetralone, 3-phenoxytoluene, acetophenone, 1-methoxynaphthalene, n-octylbenzene, n-nonylbenzene, 4-methylanisole, n-decylbenzene, p-diisopropylbenzene, pentylbenzene, tetralin, cyclohexylbenzene, chloronaphthalene, 1,4-dimethylnaphthalene, 3-isopropylbiphenyl, p-methylcumene, dipentylbenzene, o-diethylbenzene, m-diethylbenzene, p-diethylbenzene, 1,2,3,4-tetramethylbenzene, 1,2,3,5-tetramethylbenzene, 1,2,4,5-tetrametylbenzene, butylbenzene, dodecylbenzene, 1-methylnaphthalene, 1,2,4-trichlorobenzene, diphenyl ether, diphenylmethane, 4-isopropylbiphenyl, benzyl benzoate, 1,2-bi(3,4-dimethylphenyl)ethane, 2-isopropylnaphthalene, dibenzyl ether, or a combination thereof. In some embodiments, the organic solvent used in a nanostructure composition is 1-methylnaphthalene, n-octylbenzene, 1-methoxynapththalene, 3-phenoxytoluene, cyclohexylbenzene, 4-methylanisole, n-decylbenzene, or a combination thereof.

In some embodiments, the organic solvent is an anhydrous organic solvent. In some embodiments, the organic solvent is a substantially anhydrous organic solvent.

In some embodiments, the organic solvent is a non-volatile monomer or combination of monomers chosen from the list presented above.

In some embodiments, the weight percentage of organic solvent in the nanostructure composition is between about 70% and about 99%. In some embodiments, the weight percentage of organic solvent in the nanostructure composition is between about 70% and about 99%, about 70% and about 98%, about 70% and about 95%, about 70% and about 90%, about 70% and about 85%, about 70% and about 80%, about 70% and about 75%, about 75% and about 99%, about 75% and about 98%, about 75% and about 95%, about 75% and about 90%, about 75% and about 85%, about 75% and about 80%, about 80% and about 99%, about 80% and about 98%, about 80% and about 95%, about 80% and about 90%, about 80% and about 85%, about 85% and about 99%, about 85% and about 98%, about 85% and about 95%, about 85% and about 90%, about 90% and about 99%, about 90% and about 98%, about 90% and about 95%, about 95% and about 99%, about 95% and about 98%, or about 98% and about 99%. In some embodiments, the weight percentage of organic solvent in the nanostructure composition is between about 95% and about 99%.

Film Curing

In some embodiments, the compositions are thermally cured to form the nanostructure layer. In some embodiments, the compositions are cured using UV light. In some embodiments, the nanostructure composition is coated directly onto a barrier layer of a nanostructure film, and an additional barrier layer is subsequently deposited upon the nanostructure layer to create the nanostructure film. A support substrate can be employed beneath the barrier film for added strength, stability, and coating uniformity, and to prevent material inconsistency, air bubble formation, and wrinkling or folding of the barrier layer material or other materials. Additionally, one or more barrier layers are may be deposited over a nanostructure layer to seal the material between the top and bottom barrier layers. Suitably, the barrier layers can be deposited as a laminate film and optionally sealed or further processed, followed by incorporation of the nanostructure film into the particular lighting device. The nanostructure composition deposition process can include additional or varied components, as will be understood by persons of ordinary skill in the art. Such embodiments will allow for in-line process adjustments of the nanostructure emission characteristics, such as brightness and color (e.g., to adjust the quantum film white point), as well as the nanostructure film thickness and other characteristics. Additionally, these embodiments will allow for periodic testing of the nanostructure film characteristics during production, as well as any necessary toggling to achieve precise nanostructure film characteristics. Such testing and adjustments can also be accomplished without changing the mechanical configuration of the processing line, as a computer program can be employed to electronically change the respective amounts of mixtures to be used in forming a nanostructure film.

It has been discovered that nanostructure films with high PCE can be obtained when the film is processed without exposure of the AIGS nanocrystals to blue or UV light prior to providing an oxygen-free environment for the nanostructures. The oxygen-free environment can be provided by:
  (a) encapsulating the films with an oxygen barrier before thermal processing and/or exposure to blue light for PCE measurement;
  (b) use of oxygen reactive materials as part of the formulation during thermal processing or light exposure; and/or
  (c) temporary blocking of oxygen through the use of a sacrificial barrier layer.

In some embodiments, improvement in PCE can be achieved by any method that can form an oxygen barrier on the AIGS layer. In mass production of devices containing these AIGS-CC layers, the encapsulation may be carried out using vapor deposition processes. A typical process flow in this case comprises inkjet printing of the AIGS layer, followed by curing with UV irradiation, baking at 180° C. to remove volatiles, deposition of an organic planarization layer, then deposition of an inorganic barrier layer. Techniques used for deposition of the inorganic layer may include atomic layer deposition (ALD), molecular layer deposition (MLD), chemical vapor deposition (CVD) (with or without plasma enhancement), pulsed vapor deposition (PVD), sputtering, or metal evaporation. Other potential encapsulation methods include solution processed or printed organic layers, UV or thermally curable adhesives, lamination using barrier films, etc.

In some embodiments, the films are encapsulated in an inert atmosphere. In some embodiments, the films are encapsulated in a nitrogen or argon atmosphere.

Oxygen reactive materials include any materials that are more reactive to oxygen than are AIGS nanostructures. Examples of oxygen reactive materials include, without limitation phosphines, phosphites, metal-organic precursors, titanium nitride, and tantalum nitride. In some embodiments, the phosphines may be any one of the $C_{1-20}$ trialkylphosphines. In one embodiment, the phosphine is trioctylphosphine. In some embodiments, the phosphites may be trialkylphosphites, alkylarylphosphites or triarylphosphites. In some embodiments, the metal-organic precursors may be trialkylaluminum, trialkylgallium, trialkylindium, dialkylzinc, etc.

Examples of sacrificial barrier layers include polymer layers that can be dissolved in and washed away in a solvent. Examples of such polymers include, but are not limited to polyvinyl alcohol, polyvinyl acetate, and polyethylene glycols. Other examples of sacrificial barrier layers include inorganic compounds or salts such as lithium silicate, lithium fluoride, etc. Examples of solvents that can be used to wash away the sacrificial layer include water, and organic solvents such as alcohols (e.g., ethanol, methanol), halocarbons (e.g., methylene chloride and ethylene chloride), aromatic hydrocarbons (e.g, toluene, xylene), aliphatic hydrocarbons (e.g, hexane, octane, octadecene) tetrahydrofuran, $C_{4-20}$ eithers such as diethyl ether, and $C_{2-20}$ esters such as ethyl acetate.

Nanostructure Film Features and Embodiments

In some embodiments, the nanostructure films of the present invention are used to form display devices. As used herein, a display device refers to any system with a lighting display. Such devices include, but are not limited to, devices encompassing a liquid crystal display (LCD), televisions, computers, mobile phones, smart phones, personal digital assistants (PDAs), gaming devices, electronic reading devices, digital cameras, augmented reality/virtual reality (AR/VR) glasses, light projection systems, head-up displays, and the like.

In some embodiments, the nanostructure films are part of a nanostructure color conversion layer.

In some embodiments, the display device comprises a nanostructure color converter. In some embodiments, the display device comprises a back plane; a display panel disposed on the back plane; and a nanostructure layer. In some embodiments, the nanostructure layer is disposed on the display panel. In some embodiments, the nanostructure layer comprises a patterned nanostructure layer.

In some embodiments, the backplane comprises a blue LED, an LCD, an OLED, or a microLED.

In some embodiments, the nanostructure layer is disposed on the light source element. In some embodiments, the nanostructure layer comprises a patterned nanostructure layer. The patterned nanostructure layer may be prepared by any known method in the art. In one embodiment, the patterned nanostructure layer is prepared by ink-jet printing of a solution of the nanostructures. Suitable solvents for the solution include, without limitation, dipropylene glycol monomethyl ether acetate (DPMA), polyglycidyl methacrylate (PGMA), diethylene glycol monoethyl ether acetate (EDGAC), and propylene glycol methyl ether acetate (PGMEA). Volatile solvents may also be used in inkjet printing because they allow for rapid drying. Volatile solvents include ethanol, methanol, 1-propanol, 2-propanol, acetone, methyl ethyl ketone, methyl isobutyl ketone, ethyl acetate, and tetrahydrofuran. Alternatively, a "solvent-free" ink, in which the AIGS nanostructures are dispersed in the ink monomers, may be used for inkjet printing.

In some embodiments, the nanostructure layer has a thickness between about 1 μm and about 25 μm. In some embodiments, the nanostructure layer has a thickness between about 5 μm and about 25 μm. In some embodiments, the nanostructure layer has a thickness between about 10 μm and about 12 μm.

In some embodiments, the nanostructure display device exhibits a PCE of at least 32%. In some embodiments, the nanostructure molded article exhibits a PCE of 32-40%. In some embodiments, the nanostructure molded article exhibits a PCE of 33-40%, 34-40%, 35-40%, 36-40%, 37-40%, 38-40%, 39-40%, 33-39%, 34-39%, 35-39%, 36-39%, 37-39%, 38-39%, 33-38%, 34-38%, 35-38%, 36-38%, 37-38%, 33-37%, 34-37%, 35-37%, 36-37%, 33-36%, 34-36%, 35-36%, 33-35%, or 34-35%.

In some embodiments, the optical films comprising a nanostructure layer are substantially free of cadmium. As used herein, the term "substantially free of cadmium" is intended that the nanostructure compositions contain less than 100 ppm by weight of cadmium. The RoHS compliance definition requires that there should be no more than 0.01% (100 ppm) by weight of cadmium in the raw homogeneous precursor materials. The cadmium concentration can be measured by inductively coupled plasma mass spectroscopy (ICP-MS) analysis, and are on the parts per billion (ppb) level. In some embodiments, optical films that are "substantially free of cadmium" contain 10 to 90 ppm cadmium. In other embodiment, optical films that are substantially free of cadmium contain less than about 50 ppm, less than about 20 ppm, less than about 10 ppm, or less than about 1 ppm of cadmium.

Nanostructure Molded Article

In some embodiments, the present disclosure provides a nanostructure molded article comprising:
(a) a first barrier layer;
(b) a second barrier layer; and
(c) a nanostructure layer between the first barrier layer and the second barrier layer, wherein the nanostructure layer comprises a population of nanostructures comprising AIGS nanostructures and one or more metal alkoxides, one or more metal alkoxide hydrolysis products, one or more metal halides, one or more metal halide hydrolysis products, one or more organometallic compounds, or one or more organometallic hydrolysis products, or combinations thereof; and at least one organic resin.

In some embodiments, the nanostructures have a PWL between 480-545 nm.

In some embodiments, at least 80% of the emission is band-edge emission. In other embodiments, at least 90% of the emission is band-edge emission. In other embodiments, at least 95% of the emission is band-edge emission. In some embodiments, 92-98% of the emission is band-edge emission. In some embodiments, 93-96% of the emission is band-edge emission. In some embodiments, the nanostructure molded article exhibits a PCE of at least 32%. In some embodiments, the nanostructure molded article exhibits a PCE of 32-40%. In some embodiments, the nanostructure molded article exhibits a PCE of 33-40%, 34-40%, 35-40%, 36-40%, 37-40%, 38-40%, 39-40%, 33-39%, 34-39%, 35-39%, 36-39%, 37-39%, 38-39%, 33-38%, 34-38%, 35-38%, 36-38%, 37-38%, 33-37%, 34-37%. 35-37%, 36-37%, 33-36%, 34-36%, 35-36%, 33-35%, or 34-35%.

Barrier Layers

In some embodiments, the nanostructure molded article comprises one or more barrier layers disposed on either one or both sides of the nanostructure layer. Suitable barrier layers protect the nanostructure layer and the nanostructure molded article from environmental conditions such as high temperatures, oxygen, and moisture. Suitable barrier materials include non-yellowing, transparent optical materials which are hydrophobic, chemically and mechanically compatible with the nanostructure molded article, exhibit photo- and chemical-stability, and can withstand high temperatures. In some embodiments, the one or more barrier layers are index-matched to the nanostructure molded article. In some embodiments, the matrix material of the nanostructure molded article and the one or more adjacent barrier layers are index-matched to have similar refractive indices, such that most of the light transmitting through the barrier layer toward the nanostructure molded article is transmitted from the barrier layer into the nanostructure layer. This index-matching reduces optical losses at the interface between the barrier and matrix materials.

The barrier layers are suitably solid materials, and can be a cured liquid, gel, or polymer. The barrier layers can comprise flexible or non-flexible materials, depending on the particular application. Barrier layers are generally planar layers, and can include any suitable shape and surface area configuration, depending on the particular lighting application. In some embodiments, the one or more barrier layers will be compatible with laminate film processing techniques, whereby the nanostructure layer is disposed on at least a first barrier layer, and at least a second barrier layer is disposed on the nanostructure layer on a side opposite the nanostructure layer to form the nanostructure molded article according to one embodiment of the present invention. Suitable barrier materials include any suitable barrier materials known in the art. For example, suitable barrier materials include glasses, polymers, and oxides. Suitable barrier layer materials include, but are not limited to, polymers such as polyethylene terephthalate (PET); oxides such as silicon oxide, titanium oxide, or aluminum oxide (e.g., $SiO_2$, $Si_2O_3$, $TiO_2$, or $Al_2O_3$); and suitable combinations thereof. In some embodiments, each barrier layer of the nanostructure molded article comprises at least 2 layers comprising different materials or compositions, such that the multi-layered barrier eliminates or reduces pinhole defect alignment in the barrier layer, providing an effective barrier to oxygen and moisture penetration into the nanostructure layer. The nanostructure layer can include any suitable material or combination of materials and any suitable number of barrier layers on either or both sides of the nanostructure layer. The materials, thickness, and number of barrier layers will depend on the particular application, and will suitably be chosen to maximize barrier protection and brightness of the nanostructure layer while minimizing thickness of the nanostructure molded article. In some embodiments, each barrier layer comprises a laminate film, in some embodiments, a dual laminate film, wherein the thickness of each barrier layer is sufficiently thick to eliminate wrinkling in roll-to-roll or laminate manufacturing processes. The number or thickness of the barriers may further depend on legal toxicity guidelines in embodiments where the nanostructure s comprise heavy metals or other toxic materials, which guidelines may require more or thicker barrier layers. Additional considerations for the barriers include cost, availability, and mechanical strength.

In some embodiments, the nanostructure film comprises two or more barrier layers adjacent each side of the nanostructure layer, for example, two or three layers on each side or two barrier layers on each side of the nanostructure layer. In some embodiments, each barrier layer comprises a thin glass sheet, e.g., glass sheets having a thickness of about 100 µm, 100 µm or less, or 50 µm or less.

Each barrier layer of the nanostructure film of the present invention can have any suitable thickness, which will depend on the particular requirements and characteristics of the lighting device and application, as well as the individual film components such as the barrier layers and the nanostructure layer, as will be understood by persons of ordinary skill in the art. In some embodiments, each barrier layer can have a thickness of 50 µm or less, 40 µm or less, 30 µm or less, 25 µm or less, 20 µm or less, or 15 µm or less. In certain embodiments, the barrier layer comprises an oxide coating, which can comprise materials such as silicon oxide, titanium oxide, and aluminum oxide (e.g., $SiO_2$, $Si_2O_3$, $TiO_2$, or $Al_2O_3$). The oxide coating can have a thickness of about 10 μm or less, 5 μm or less, 1 μm or less, or 100 nm or less. In certain embodiments, the barrier comprises a thin oxide coating with a thickness of about 100 nm or less, 10 nm or less, 5 nm or less, or 3 nm or less. The top and/or bottom barrier can consist of the thin oxide coating, or may comprise the thin oxide coating and one or more additional material layers.

Display Device with Nanostructure Color Conversion Layer

In some embodiments, the present invention provides a display device comprising:
(a) a display panel to emit a first light;
(b) a backlight unit configured to provide the first light to the display panel; and
(c) a color filter comprising at least one pixel region comprising a color conversion layer.

In some embodiments, the color filter comprises at least 1, 2, 3, 4, 5, 6, 7, 8, 9, or 10 pixel regions. In some embodiments, when blue light is incident on the color filter, red light, white light, green light, and/or blue light may be respectively emitted through the pixel regions. In some embodiments, the color filter is described in U.S. Pat. No. 9,971,076, which is incorporated herein by reference in its entirety.

In some embodiments, each pixel region includes a color conversion layer. In some embodiments, a color conversion layer comprises nanostructures described herein configured to convert incident light into light of a first color. In some embodiments, the color conversion layer comprises nanostructures described herein configured to convert incident light into blue light.

In some embodiments, the display device comprises 1, 2, 3, 4, 5, 6, 7, 8, 9, or 10 color conversion layers. In some embodiments, the display device comprises 1 color conversion layer comprising the nanostructures described herein. In some embodiments, the display device comprises 2 color conversion layers comprising the nanostructures described herein. In some embodiments, the display device comprises 3 color conversion layers comprising the nanostructures described herein. In some embodiments, the display device comprises 4 color conversion layers comprising the nanostructures described herein. In some embodiments, the display device comprises at least one red color conversion layer, at least one green color conversion layer, and at least one blue color conversion layer.

In some embodiments, the color conversion layer has a thickness between about 3 m and about 10 μm, about 3 μm and about 8 μm, about 3 μm and about 6 μm, about 6 μm and about 10 μm, about 6 μm and about 8 μm, or about 8 μm and about 10 μm. In some embodiments, the color conversion layer has a thickness between about 3 μm and about 10 μm.

The nanostructure color conversion layer can be deposited by any suitable method known in the art, including but not limited to painting, spray coating, solvent spraying, wet coating, adhesive coating, spin coating, tape-coating, roll coating, flow coating, inkjet printing, photoresist patterning, drop casting, blade coating, mist deposition, or a combination thereof. In some embodiments, the nanostructure color conversion layer is deposited by photoresist patterning. In some embodiments, nanostructure color conversion layer is deposited by inkjet printing.

Compositions Comprising AIGS Nanostructures and Ligands

In some embodiments, the AIGS nanostructure composition further comprises one or more ligands. The ligands include amino-ligands, poly amino-ligands, mercapto-ligands, phosphino-ligands, silane ligands, as well as polymeric or oligomeric chains such as polyethylene glycol with amine and silane groups.

In some embodiments, the amino-ligands have Formula I:

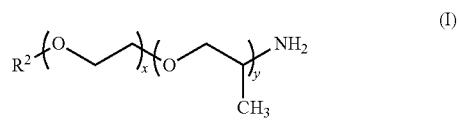

wherein:
x is 1 to 100;
y is 0 to 100; and
$R^2$ is $C_{1-20}$ alkyl.

In some embodiments, the polyamino-ligand is a polyamino alkane, a polyamine-cycloalkane, a polyamino heterocyclic compound, a polyamino functionalized silicone, or polyamino substituted ethylene glycol. In some embodiments, the polyamino-ligand is a $C_{2-20}$ alkane or $C_{2-20}$ cycloalkane substituted by two or three amino groups and optionally containing one or two amino groups in place of a carbon group. In some embodiments, the polyamino-ligand is ethylenediamine, 1,2-diaminopropane, 1,2-diamino-2-methylpropane, N-methyl-ethylenediamine, N-ethyl-ethylenediamine, N-isopropyl-ethylenediamine, N-cyclohexyl-ethylenediamine, N-cyclohexyl-ethylenediamine, N-octyl-ethylenediamine, N-decyl-ethylenediamine, N-dodecyl-ethylenediamine, N,N-dimethyl-ethylenediamine, N,N-diethyl-ethylenediamine, N,N'-diethyl-ethylenediamine, N,N'-diisopropyl ethylenediamine, N,N,N'-trimethyl-ethylenediamine, diethylenetriamine, N-isopropyl-diethylenetriamine, N-(2-aminoethyl)-1,3-propanediamine, triethylenetetramine, N,N'-bis(3-aminopropyl)ethylenediamine, N,N'-bis(2-aminoethyl)-1,3-propanediamine, tris(2-aminoethyl)amine, tetraethylenepentamine, pentaethylene hexamine, 2-(2-amino-ethylamino)ethanol, N,N-bis(hydroxyethyl)ethylenediamine, N-(hydroxyethyl) diethylenetriamine, N-(hydroxyethyl)triethylenetetramine, piperazine, 1-(2-aminoethyl)piperazine, 4-(2-aminoethyl) morpholine, polyethyleneimine, 1,3-diaminopropane, 1,4-diaminobutane, 1,3-diaminopentane, 1,5-diminopemane, 2,2-dimethyl-1,3-propanediamine, hexamethylenediamine, 2-methyl-1,5-diaminopropane, 1,7-diaminoheptane, 1,8-diaminooctane, 2,2,4-trimethyl-1,6-hexanediamine, 2,4,4-trimethyl-1,6-hexanediamine, 1,9-diaminononane, 1,10-diaminodecane, 1,12-diaminododecane, N-methyl-1,3-propanediamine, N-ethyl-1,3-propanediamine, N-isopropyl-1,3-propanediamine,N,N-dimethyl-1,3-propanediamine, N,N'-dimethyl-1,3-propanediamine, N,N'-diethyl-1,3-propanediamine, N,N'-diisopropyl-1,3-propanediamine, N,N, N'-trimethyl-1,3-propanediamine, 2-butyl-2-ethyl-1,5-pentanediamine, N,N'-dimethyl-1,6-hexanediamine, 3,3'-diamino-N-methyl-dipropylamine, N-(3-aminopropyl)-1,3-propanediamine, spermidine, bis(hexamethylene)triamine, N,N',N"-trimethyl-bis(hexamethylene)triamine, 4-amino-1, 8-octanediamine, N,N'-bis(3-aminopropyl)-1,3-propiediamine, spermine, 4,4'-methylenebis(cyclohexylamine), 1,2-diaminocyclohexane,1,4-diaminocyclohexane, 1,3-cyclohexane bis(methylamine), 1,4-cyclohexanebis (methylamine), 1,2-bis(aminoethoxy)ethane, 4,9-dioxa-1, 12-dodecanediamine, 4,7,10-trioxa-1,13-tridecanediamine, 1,3-diamino-hydroxy-propane, 4,4-methylene dipiperidine, 4-(aminomethyl)piperidine, 3-(4-aminobutyl)piperidine, or polyallylamine. In some embodiments, the polyamino-ligand is 1,3-cyclohexanebis(methylamine), 2,2-dimethyl-1,3-proparnediamine, or tris(2-aminoethyl)amine.

In some embodiments, the polyamino-ligand is a polyamino heterocyclic compound. In some embodiments, the polyamino heterocyclic compound is 2,4-diamino-6-phenyl-1,3,5-triazine, 6-methyl-1,3,5-triazine-2,4-diamine, 2,4-diamino-6-diethylamino-1,3,5-triazine, 2-N,4-N,6-N-Tripropyl-1,3,5-triazine-2,4,6-triamine, 2,4-diaminopyrimidine, 2,4,6-triaminopyrimidine, 2,5-diaminopyridine, 2,4,5,6-tetraaminopyrimidine, pyridine-2,4,5-triamine, 1-(3-aminopropyl)imidazole, 4-phenyl-1H-imidazole-1,2-diamine, 1H-imidazole-2,5-diamine, 4-phenyl-N(1)-[(E)-phenylmethylidene]-1H-imidazole-1,2-diamine, 2-phenyl-1H-imidazole-4,5-diamine, 1H-imidazole-2,4,5-triamine, 1H-pyrrole-2,5-diamine, 1,2,4,5-tetrazine-3,6-diamine, N,N'-dicyclohexyl-1,2,4,5-tetrazine-3,6-diamine, N3-propyl-1H-1,2,4-triazole-3,5-diamine, or N,N'-bis(2-methoxybenzyl)-1H-1,2,4-triazole-3,5-diamine.

In some embodiments, the polyamino-ligand is a polyamino functionalized silicone. In some embodiments, the polyamino functionalized silicone is one of:

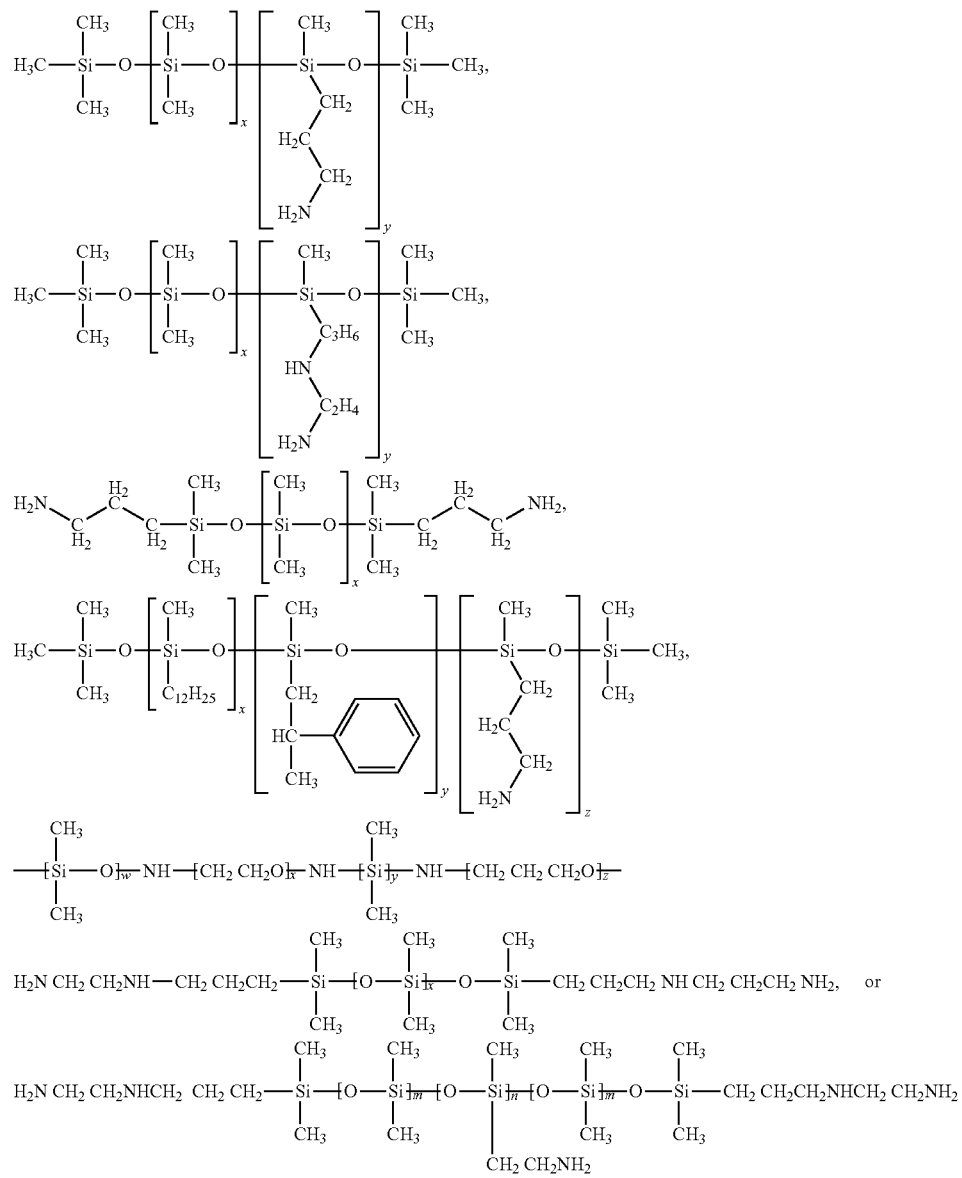

In some embodiments, the polyamino-ligand is a polyamino-substituted ethylene glycol. In some embodiments, the polyamino substituted ethylene glycol is 2-[3-amino-4-[2-[2-amino-4-(2-hydroxyethyl)phenoxy]ethoxy]phenyl]ethanol, 1,5-diamino-3-oxapentane, 1,8-diamino-3,6-dioxaoctane, bis[5-chloro-1H-indol-2-YL-carbonyl-aminoethyl]-ethylene glycol, amino-PEG8-t-Boc-hydrazide, or 2-(2-(2-ethoxyethoxy)ethoxy)ethanamine.

In some embodiments, the mercapto-ligands are (3-mercaptopropyl)triethoxysilane, 3,6-dioxa-1,8-octanedithiol; 6-mercapto-1-hexanol; mercapto succinic acid, mercapto undecanoic acid, mercapto hexanoic acid, mercapto propioninic acid, mercapto acetic acid, cysteine, methionine, and mercapto poly(ethylene glycol).

In some embodiments, the silane-ligand is an aminoalkyltrialkoxysilane or thioalkyltrialkoxysilane. In some embodiments, the aminoalkyltrialkoxysilane is 3-aminopropyl)triethoxysilane or 3-mercapopropyl)triethoxysilane.

In some embodiments, the ligands include, but are not limited to amino-polyalkylene oxide (e.g., about m.w. 1000); (3-aminopropyl)trimethoxysilane); (3-mercaptopropyl)triethoxysilane; DL-α-lipoic acid; 3,6-dioxa-1,8-octanedithiol; 6-mercapto-1-hexanol; methoxypolyethylene glycol amine (about m.w. 500); poly(ethyleneglycol) methyl ether thiol (about m.w. 800); diethyl phenylphosphonite; dibenzyl N,N-diisopropylphosphoramidite; di-tert-butyl N,N-diisopropylphosphoramidite; tris(2-carboxyethyl)phosphine hydrochloride; poly(ethylene glycol) methyl ether thiol (about m.w. 2000); methoxypolyethylene glycol amine (about m.w. 750); acrylamide; and polyethylenimine.

Particular combinations of ligands include amino-polyalkylene oxide (about m.w. 1000) and methoxypolyethylene glycol amine (about m.w. 500); amino-polyalkylene oxide (about m.w. 1000) and 6-mercapto-1-hexanol; amino-polyalkylene oxide (about m.w. 1000) and (3-mercaptopropyl)triethoxysilane; and 6-mercapto-1-hexanol and methoxypolyethylene glycol amine (about m.w. 500); which provided excellent dispersibility and thermal stability. See Example 9.

Films comprising the AIGS nanostructures and a polyamino ligand exhibit higher film photo conversion efficiency (PCE), exhibit less wrinkling, and less delamination of the films compared to AIGS-containing films without a polyamino-ligand and compared to a mono-amino-ligand. Thus, compositions comprising AIGS-polyamino-ligands are uniquely suitable for use in nanostructure color conversion layers.

Scattering Media

The AIGS films may further comprise scattering media. Examples of scattering media that can be used include, without limitation, metal or metal oxide particles, air bubbles, and glass and polymeric beads (solid or hollow). In some embodiments, the scattering media has a spherical shape. In some embodiments, the scattering media include, but are not limited to, $TiO_2$, $SiO_2$, $BaTiO_3$, $BaSO_4$, and ZnO particles.

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

EXAMPLES

Example 1: AIGS Core Synthesis

Sample ID 1 was prepared using the following typical synthesis of AIGS cores: 4 mL of 0.06 M $CH_3CO_2Ag$ in oleylamine, 1 mL of 0.2 M $InCl_3$ in ethanol, 1 mL of 0.95 M sulfur in oleylamine, and 0.5 mL dodecanethiol were injected into a flask that contained 5 mL of degassed octadecene, 300 mg of trioctylphosphine oxide, and 170 mg of gallium acetylacetonate. The mixture was heated to 40° C. for 5 minutes, then the temperature was raised to 210° C. and held for 100 minutes. After cooling to 180° C., 5 mL trioctylphosphine was added. The reaction mixture was transferred to a glovebox and diluted with 5 mL toluene. The final AIGS product was precipitated by adding 75 mL ethanol, centrifuged, and redispersed in toluene. Sample IDs 2 and 3 were also prepared using this method. The optical properties of AIGS cores were measured and summarized in TABLE 1. AIGS core sizes and morphology were characterized by transmission electron microscopy (TEM).

TABLE 1

| Sample ID | QY (%) | PWL (nm) | FWHM (nm) | Ag/(Ag + In + Ga) by ICP | In/(In + Ga) by ICP | Note |
| --- | --- | --- | --- | --- | --- | --- |
| 1 | 44 | 519.5 | 47 | 0.39 | 0.44 | 50 mL flask scale |
| 2 | 30 | 514 | 50 | 0.37 | 0.41 | 10× scale up of Sample ID 1 |
| 3 | 40 | 518 | 52 | 0.38 | 0.45 | 10× scale up of Sample ID 1 |

Example 2: AIGS Nanostructures with Ion Exchange Treatment

Sample ID 4 was prepared using the following typical ion exchange treatment: 2 mL of a 0.3 M gallium oleate solution in octadecene and 12 mL oleylamine were introduced to a flask and degassed. The mixture was heated to 270° C. A pre-mixed solution of 1 mL of a 0.95 M sulfur solution in oleylamine and 1 mL of isolated AIGS cores (15 mg/mL) were co-injected. The reaction was stopped after 30 minutes. The final product was transferred to a glovebox, washed with toluene/ethanol, centrifuged, and redispersed in toluene. Sample IDs 4-8 were also prepared using this method. The optical properties of the thus-produced AIGS nanostructures are summarized in TABLE 2. Ion exchange with gallium ions resulted in nearly complete band-edge emission. An increase of the average particle size was observed by TEM.

TABLE 2

| Sample ID | PWL (nm) | FWHM (nm) | QY (%) | $OD_{450}$/mass (mL · $mg^{-1}$ · $cm^{-1}$) |
| --- | --- | --- | --- | --- |
| 4 | 516 | 38 | 61 | — |
| 5 | 517 | 36 | 58 | 0.87 |
| 6 | 520 | 37 | 53 | 1.04 |
| 7 | 514 | 38 | 64 | 0.72 |
| 8 | 514 | 38 | 65 | 1.15 |

Example 3: Gallium Halide and Trioctylphosphine Ion Exchange Treatment

A room temperature ion exchange reaction with AIGS nanostructures was conducted by the addition of a $GaI_3$ solution in trioctylphosphine (0.01-0.25 M) to AIGS QDs and holding at room temperature for 20 hours. This treatment led to a significant enhancement of the band-edge emission summarized in TABLE 3, while maintaining substantially the peak wavelength (PWL).

Compositional changes before and after $GaI_3$ addition were monitored by inductively coupled plasma atomic emission spectroscopy (ICP-AES) and energy-dispersive X-ray spectroscopy (EDS) as summarized in TABLE 3. Composite images of In and Ga elemental distributions before and after $GaI_3$/TOP treatment showed a radial distribution of In to Ga, thus indicating that the ion exchange treatment led to a gradient of a larger amount of gallium near the surface and a lesser amount of gallium in the center of the nanostructures.

TABLE 3

| ID | PWL (nm) | FWHM (nm) | QY (%) | Band-edge contribution | Ag/(Ag + In + Ga) by ICP | In/(In + Ga) by ICP | Ag/(Ag + In + Ga) by EDS | In/(In + Ga) by EDS |
|---|---|---|---|---|---|---|---|---|
| 9 | 542 | 38 | 11 | <45% | 0.41 | 0.11 | 0.45 | 0.16 |
| 10 | 543 | 37 | 24 | >80% | 0.38 | 0.09 | 0.44 | 0.14 |

Example 4: AIGS Ion Exchange Treatment Using Oxygen-Free Ga Sources

Sample ID 14 and 15 was prepared using the following typical treatment of AIGS nanoparticles using an oxygen-free Ga source: to 8 mL degassed oleylamine, 400 mg of $GaCl_3$ dissolved in 400 µL toluene was added, followed by 40 mg of AIGS core and then 1.7 mL of 0.95 M sulfur in oleylamine. After heating to 240° C., the reaction was held for 2 hours and then cooled. The final product was transferred to a glovebox, washed with toluene/ethanol, centrifuged, and dispersed in toluene. Sample IDs 15 and 16 were also prepared using this method. Sample IDs 11-13 were prepared using the method of Example 2. The optical properties of treated AIGS materials are shown in TABLE 4.

TABLE 4

| Sample ID | PWL (nm) | FWHM (nm) | QY (%) | BE % | gallium source |
|---|---|---|---|---|---|
| 11 | 525 | 43 | 25 | not determined | Ga(III) acetylacetonate) |
| 12 | 516 | 34 | 73 | 90 | gallium oleate |
| 13 | 522 | 35 | 72 | 87 | gallium oleate |
| 14 | 521 | 35 | 85 | 86 | Ga(III) chloride |
| 15 | 521 | 35 | 80 | 89 | Ga(III) chloride |
| 16 | not determined | not determined | not determined | not determined | Ga(III) iodide |

As shown in TABLE 4, the quantum yield of treated AIGS nanostructures can be improved by using Ga(III) chloride rather than Ga(III) acetylacetonate or gallium oleate when oleylamine is used as a solvent. The final materials subjected to ion exchange using Ga(III) chloride gave similar size and similar band-edge to trap emission properties as the starting nanostructures. Therefore, the increase in quantum yield (QY) is not simply due to increasing the trap emission component. And, unexpectedly, it was found that when using Ga(III) iodide was used in place of Ga(III) chloride, the AIGS nanostructures appeared to dissolve in the reaction mixture and ion exchange did not occur.

High-resolution TEM with energy-dispersive X-ray spectroscopy (EDS) of Sample 14 showed that the nanostructures likely comprise a slight gradient to lower In from the AIGS nanostructure centers to the surface which indicates that treatment under these conditions results from a process in which In exchanges out of the AIGS structure and is replaced with Ga, while Ag is present across the entire structure rather than growing a distinct layer of GS. This may also contribute to the improved quantum yield of the nanostructure due to less strain.

Example 5: AIGS Core from Hot Injection of Pre-Formed Ag₂S Nanostructures Mixed with Pre-Formed In—Ga Reagent To make the $Ag_2S$ nanostructures, under a $N_2$ atmosphere, 0.5 g of AgI and 2 mL of oleylamine are added to 20 mL vial and stirred at 58° C. until clear a solution is obtained. In a separate 20 mL vial, 5 mL DDT and 9 mL of 0.95 M sulfur in oleylamine were mixed. The DDT+S-OYA mixture is added to AgI solution and stirred for 10 min at 58° C. The obtained $Ag_2S$ nanoparticles were used without wash.

To make the In—Ga reagent mixture, 1.2 g Ga(acetylacetonate)₃, 0.35 g $InCl_3$, 2.5 mL oleylamine and 2.5 mL ODE charged to 100 mL flask. Under $N_2$ atm heated to 210° C. and held for 10 min. Orange color and viscous product obtained.

To form AIGS nanoparticles, under $N_2$, 1.75 g of TOPO, 23 mL of oleylamine and 25 mL ODE added to 250 mL flask. After degassing under vacuum, this solvent mixture is heated to 210° C. over 40 min. In a 40 mL vial, the $Ag_2S$ and the In—Ga reagent mixture from above are mixed at 58° C. and transferred to syringe. The Ag—In—Ga mixture is then injected to the solvent mixture at 210° C. and held 3 hr. After cooling to 180° C., 5 mL trioctylphosphine was added. The reaction mixture was transferred to glovebox and diluted with 50 mL toluene. The final product was precipitated by adding 150 mL ethanol, centrifuged, and redispersed in toluene. The AIGS nanostructures were then ion exchanged by the method described in Example 4. The optical properties of the material made by this method at scales up to 24× that described above, are shown in TABLE 5.

TABLE 5

| Sample ID | PWL (nm) | FWHM (nm) | BE % | QY (%) | $OD_{450}$/Mass $(mL \cdot mg^{-1} \cdot cm^{-1})$ |
|---|---|---|---|---|---|
| 17 | 510 | 34 | 96 | 86 | — |
| 18 | 524 | 38 | 93 | 94 | 1.1 |
| 19 | 520 | 38 | 93 | 88 | 1.3 |
| 20 | 517 | 38 | 94 | 86 | 1.3 |
| 21 | 518 | 38 | 94 | 89 | 1.4 |
| 22 | 528 | 37 | 93 | 93 | 1.9 |

Example 7 Repeated Gallium Ion Exchange Improves Photoluminescence Stability of AIGS Nanostructures 7.1 First Ion Exchange Process Oleylamine (OYA, 2.5 L) is degassed under vacuum at 40° C. for 40 min AIGS nanostructures (25.4 g in toluene) are added followed by $GaCl_3$ (127 g in minimal toluene) and sulfur dissolved in OYA (0.95M, 570 mL). The mixture is heated to 240° C. over 40 min and held 4 hours. After cooling, the mixture is diluted with 1 volume of toluene. After centrifugation to remove some by-product, the material is washed with 2 volumes ethanol, collected by centrifugation, and redissolved in toluene. After a second wash, the nanostructure is dissolved in heptane for storage.

7.2 Second Ion Exchange Process

Oleylamine (OYA, 960 mL) is degassed under vacuum at 40° C. for 20 min. AIGS ion exchanged nanostructure, such as from Example 7.1 (12 g in heptane) is added to the OYA, follow by $GaCl_3$ (22.5 g in a minimal volume of toluene), then sulfur dissolved in OYA (0.95M, 100 mL). The mixture is heated to 240° C. over 40 min and held 3 hr. After cooling, the mixture is diluted with 1 vol toluene then washed (precipitated with 1.6 vol ethanol, centrifuged) and redispersed in toluene or heptane as required. When performing ligand exchange for ink formulation, a further ethanol wash is applied and the QDs are redispersed in heptane.

7.3 Alternate Second Ion Exchange Process

Oleylamine (15 mL) is degassed under vacuum at 60° C. for 20 min. $GaCl_3$ (360 mg in a minimal volume of toluene) is added to the OYA followed by AIGS, such as from Example 7.1 (200 mg in heptane), then sulfur dissolved in OYA (0.95M, 1.6 mL) is added. The mixture is heated to 240° C. over 40 min and held 3 hr. After cooling the mixture is washed was described in Example 7.1.

7.4 Alternate Second Ion Exchange Process

This example was carried out as described for Example 7.3, but at a 3× scale.

7.5 Alternate Second Ion Exchange Process

Oleylamine (10 mL) and oleic acid (5 mL) are degassed under vacuum at 90° C. for 20 min. $(Ga(NMe_3)_3)_2$ (206 mg) and $GaCl_3$ (180 mg in a minimal volume of toluene) are added followed by AIGS, such as from Example 7.1 (200 mg in heptane). After heating to 130° C., $TMS_2S$ (0.65 mL of 50% solution in ODE) is added over 20 min, and the mixture is held 2.5 hr. After cooling the mixture is washed was described in Example 7.1.

7.6 Results

AIGS nanostructures were subjected to an ion exchange process where In is exchanged for Ga. The higher temperature used for this process compared to core growth (240° C. v. 210° C.) leads to ripening so the average size is larger than the untreated nanostructures. The nanostructures do not have a well differentiated shell structure. This can be observed in the cross-sectional TEM elemental mapping. The lack of a higher band gap shell is expected to limit retention of the photoluminescence of these materials during film processing.

Figure 2B:
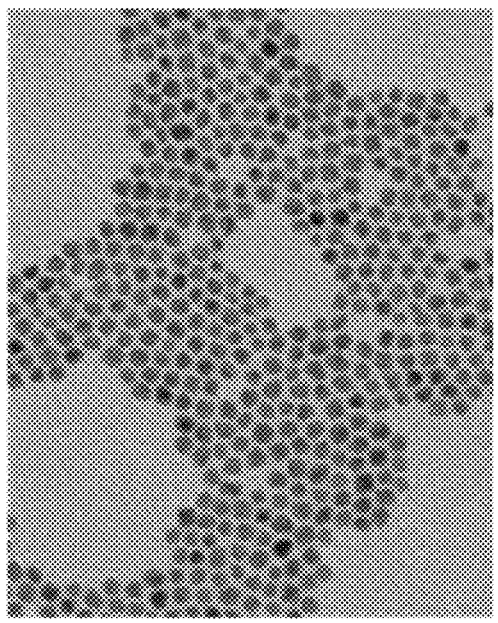
FIGS. 2A-2C are TEM images showing AIGS nanostructures before ion exchange treatment (FIG. 2A), after a single ion exchange treatment (FIG. 2B) and after two ion exchange treatments (FIG. 2C).
Figure 2C:
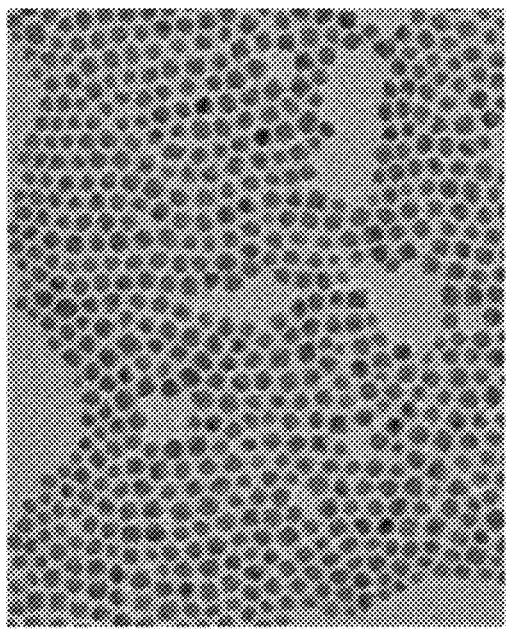
Figure 2A:
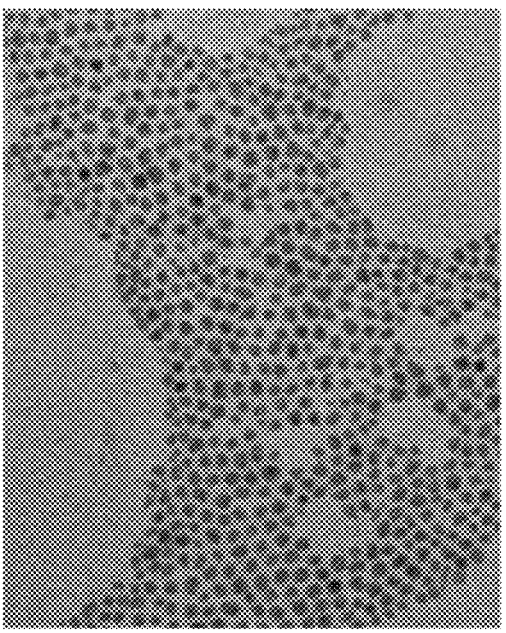

After a second ion exchange process, the average TEM size did not increase (FIG. 2A-2C), but the TEM elemental mapping demonstrated a more distinct gradient to a Ga-rich (higher band gap) region had developed in the QD.

The elemental composition for the single and multiple ion exchange processes are shown in TABLE 6. Values are an average of 10-20 samples from Examples 7.1 and 7.2.

TABLE 6

| Sample type | PWL (nm) | FWHM (nm) | Ag/(Ag + In + Ga) | In/(In + Ga) |
|---|---|---|---|---|
| Single Ion Exchange treatment | 523 | 34.5 | 0.39 | 0.27 |
| Double ion Exchange Treatment | 523 | 34.1 | 0.40 | 0.24 |

The properties of the ion exchanged AIGS nanostructures and shown in TABLE 7. Metal ratios are mole ratios determined by ICP.

TABLE 7

| sample ID | PWL, nm | FWHM, nm | BE, % | QY, % | Ag/(Ag + In + Ga) | In/(In + Ga) |
|---|---|---|---|---|---|---|
| Example 7.1 | 524.2 | 34.8 | 90 | 83 | 0.41 | 0.27 |
| Example 7.2 | 523.6 | 34.4 | 90 | 89 | 0.40 | 0.24 |
| Example 7.3 | 525.1 | 34.4 | 90 | 87 | 0.42 | 0.23 |
| Example 7.4 | 525.9 | 34.3 | 90 | 88 | 0.42 | 0.24 |
| Example 7.5 | 524.4 | 33.5 | 90 | 62 | 0.28 | 0.12 |
| Example 7.6 | 521.0 | 24.5 | 92 | 89 | 0.41 | 0.18 |

The film PCE retained after UV cure and 180° C. bake is significantly improved by the second ion exchange process, as demonstrated in TABLE 8. This is believed to be due to the process of increasing the Ga concentration in the outer layer of the nanostructures leading to a gradient to a higher band gap region being introduced by ion exchange.

TABLE 8

| sample ID | Blue abs (%) | Post UV Green PCE % | Post bake Green PCE % | Retained QY % |
|---|---|---|---|---|
| Example 7.1 | 91.5 | 25.6 | 9.7 | 37.9 |
| Example 7.2 | 91.9 | 25.8 | 16.3 | 63.3 |
| Example 7.3 | 88.1 | 23.1 | 14.7 | 63.8 |
| Example 7.4 | 88.5 | 23.7 | 14.9 | 62.8 |
| Example 7.5 | 95.0 | 26.4 | 17.3 | 64.7 |
| Example 7.6 | 91.0 | 31.4 | 19.7 | 62.8 |

Example 8—Compositions Comprising AIGS Nanostructures and a Polyamino-Ligand

Abbreviations
Jeffamine—Jeffamine M-1000
HDDA—1-6 Hexanediol Diacrylate
Bismethylamine—1,3 cyclohexane bismethylamine
PCE—Photon Conversion Efficiency Crude AIGS QD growth solution was purified by washing with ethanol and redispersing in heptane (Solution 1). To Solution 1 was added 6-mercapto-1-hexanol, heated at 50° C. for 30 minutes, washed with ethanol and redispersed in heptane (Solution 2). 2 µL of 6-Mercapto-1-hexanol was added per 100 mg of QD inorganic solids. To solution 2 was added Jeffamine and HDDA for the ligand exchanged stage, heated at 80° C. for 1 hour, precipitated with heptane, and redispersed into HDDA (Solution 3). 83 mg of Jeffamine was added per 100 mg of QD inorganic solids. 0.42 g of HDDA was added per 100 mg of QD inorganic solids. To an ink-jet ink composition comprising 10 wt % $TiO_2$ and 90 wt % of monomer was added Solution 3 and HDDA. The ink jet formulation had a composition of 10 wt % QD inorganic mass, 4 wt % $TiO_2$, and the remaining 86 wt % being a combination of ligands (bound and unbound), HDDA, monomer, photoinitiator, and other miscellaneous organics leftover from the QD solution. This ink formulation was Solution 4.

To Solution 4 was added the polyamino ligand bismethylamine (50 mg of bismethylamine per 100 mg of QD inorganic solids) and the composition was then cast as a film.

Film Casting

Solution 4 was spincoated on a 2"×2" glass substrate. The film was cured with a UV LED cure lamp. The film photo conversion efficiency (PCE), a measure of brightness, was then tested. The film was then baked with a hotplate set at 180° C. for 30 minutes slightly elevated above hotplate. Alternatively, the film was baked with a hotplate set at 180° C. for 10 minutes in direct contact with hot place surface.

Figure 3A:
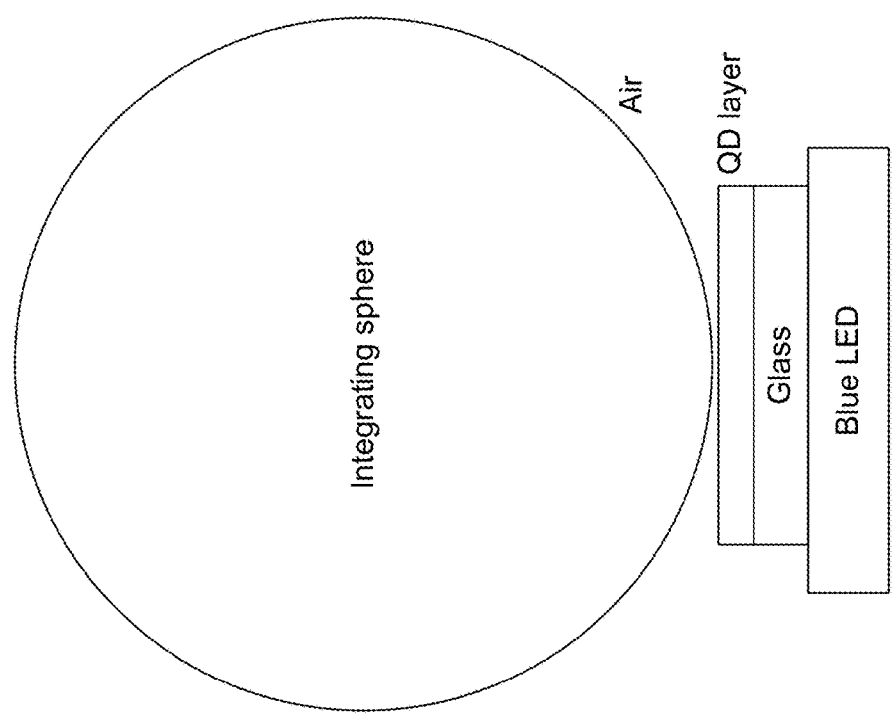
FIGS. 3A and 3B are schematics for unencapsulated (FIG. 3A) and encapsulated (FIG. 3B) films.
Figure 3B:
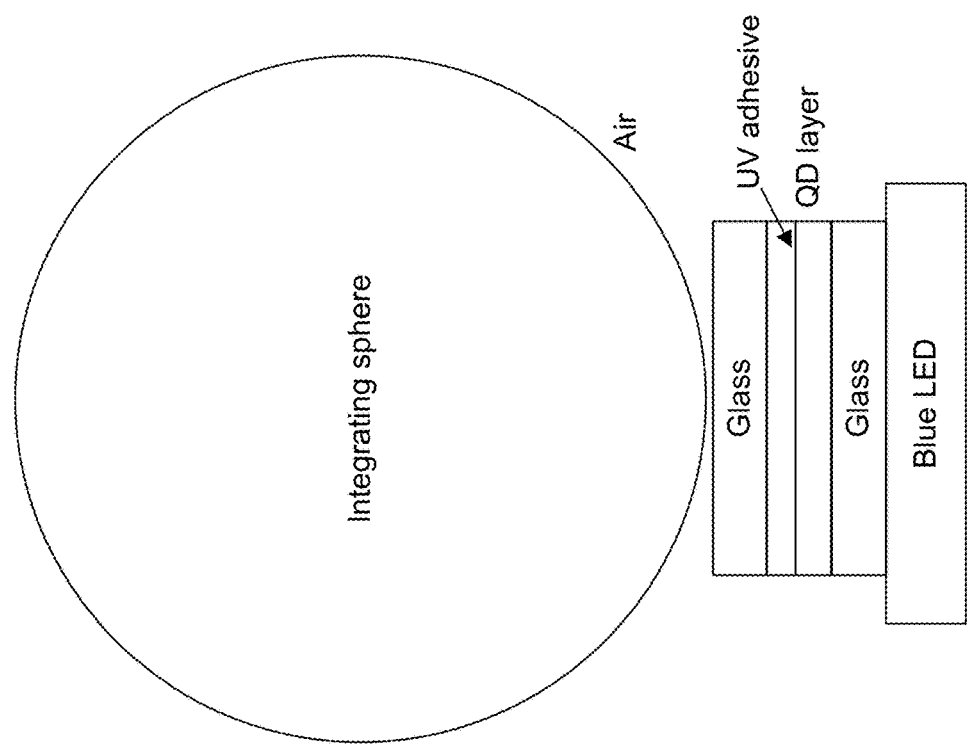

The film PCE was then tested. A 1"×1" masked array of blue 448 nm LEDs provided the excitation source for the film. An integration sphere was placed on top of the film and connected to a fluorometer. See FIGS. 3A and 3B. The collected spectra were analyzed to obtain the PCE.

PCE is a ratio of the number of green photons of forward emission to the number of blue photons generated by the test platform. The PCE, LRR and film morphology and reported are in TABLE 9. Unexpectedly, the presence of the ligands 1,3-cyclohexanebis(methylamine), tris (2-aminoethyl)amine and 2,2-dimethyl-1,3-propanediamine resulted in high retention of PCE after the 180° C. bake, high LRR and no wrinkles compared to the film without the ligand.

TABLE 9

| Additive | Post UV Cure PCE | Post 180 C. Bake PCE | LRR | Film Morphology |
|---|---|---|---|---|
| No Additive | 28.4% | 14.1% | 49.7% | Wrinkles |
| 1,3-Cyclohexanebis(methylamine) | 21.0% | 20.4% | 96.8% | No wrinkles |
| Tris (2-aminoethyl) amine | 12.0% | 12.1% | 100.7% | No wrinkles |
| 2,2-dimethyl-1,3-propanediamine | 21.2% | 21.1% | 99.2% | No wrinkles |

FIG. 1 shows the effect of diamine addition on film morphology. The films in FIG. 1 from left to right contained: No additive (Wrinkling); 2,2-dimethyl-1,3-propanediamine (a diamine, no wrinkling); cyclohexanemethylamine (a monoamine, wrinkling); and tris (2-aminoethyl) amine (a triamine, no wrinkling). From left to right, the first and third films not containing the diamine exhibited extensive wrinkling. In contrast, the second and fourth films exhibited no wrinkling. Unexpectedly, the use of a diamino ligand in the AIGS films resulted in a major reduction of film wrinkling.

Example 9—Testing of Additional Ligands for AIGS Nanostructures

In this experiment, additional ligands for AIGS nanoparticles were tested for enhanced QY, high compatibility and good thermal stability. Additionally, these ligands were evaluated for protecting AIGS nanostructures from deterioration and oxidation. Also tested were a combination of ligands that may be formulated into an AIGS ink composition.

Ligand exchange with these ligands were performed in organic solvents such as ethyl acetate, PGMEA, acetone, xylene, 1,2-dichlorobenzene (ODCB), butyl acetate, and diethylene glycol monoethyl ether (DGMEE).

AIGS nanostructures were ligand exchanged with ligands that contain polymeric or oligomeric chains such as polyethylene glycol with amine and silane groups, and soft bases such as phosphino-, mercapto- and combinations thereof for co-passivation.

Figure 4:
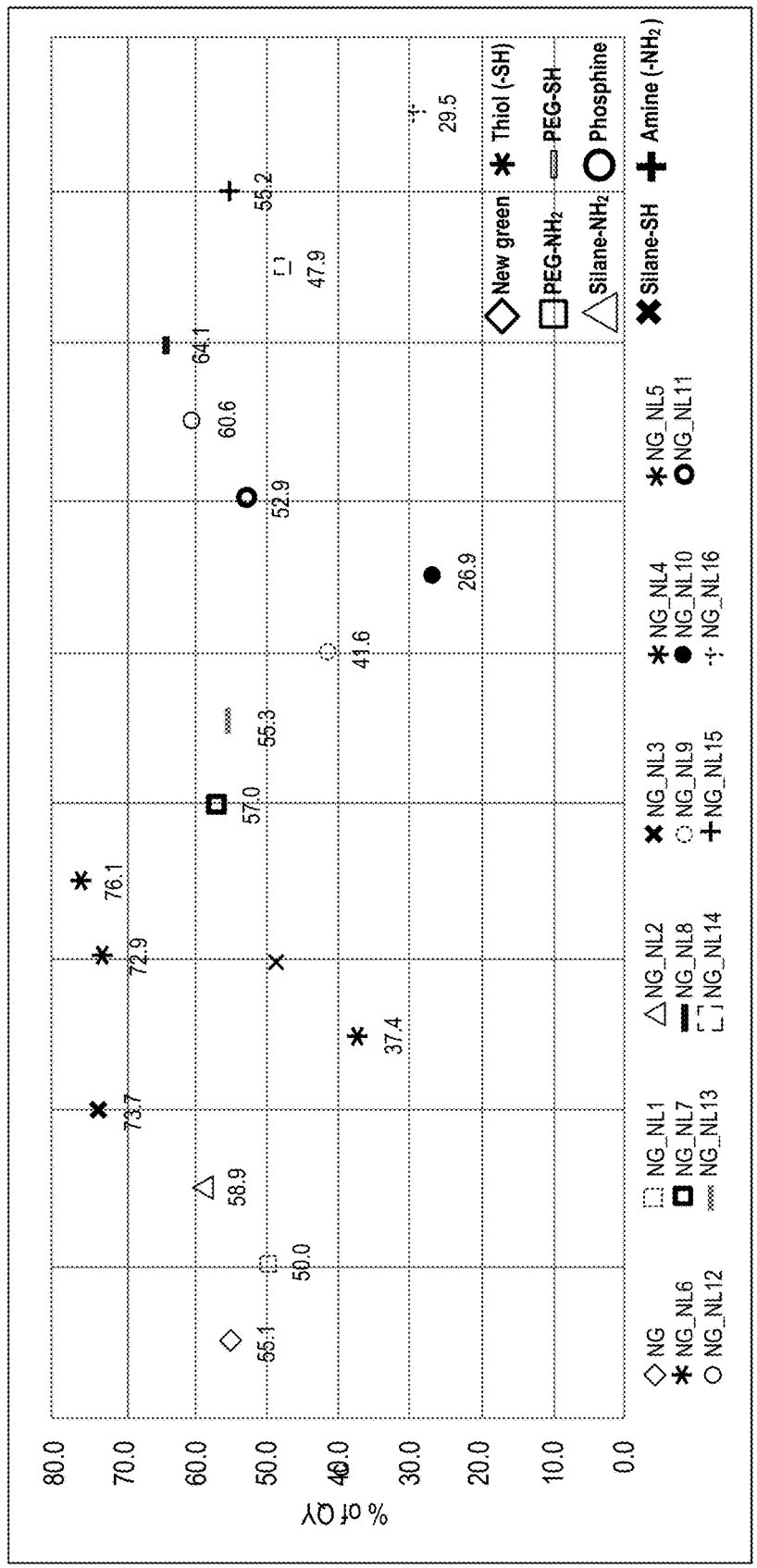
FIG. 4 is a scatter graph showing the QY % exhibited by mixtures of various ligands.

FIG. 4 depicts the quantum yield values of a number of individual ligands and AIGS nanostructures subjected to a single ion exchange treatment as described herein. In this graph, NG: native AIGS; NG-NL1: amino-polyalkylene oxide about m.w. 1000; NG-NL2: (3-aminopropyl) trimethoxysilane); NG-NL3: (3-mercaptopropyl)triethoxysilane; NG-NL4: DL-α-lipoic acid; NG-NL5: 3,6-dioxa-1, 8-octanedithiol; NG-NL6: 6-mercapto-1-hexanol; NG-NL7: methoxypolyethylene glycol amine 500; NG-NL8: poly (ethyleneglycol) methyl ether thiol Mn 800; NG-NL9: diethyl phenylphosphonite; NG-NL10: dibenzyl N,N-diisopropylphosphoramidite; NG-NL11: di-tert-butyl N,N-diisopropylphosphoramidite; NG-NL12: tris(2-carboxyethyl) phosphine hydrochloride; NG-NL13: poly(ethylene glycol) methyl ether thiol Mn 2000; NG-NL14: methoxypolyethylene glycol amine 750; NG-NL15: acrylamide; and NG-NL16: Polyethylenimine).

As can be seen in FIG. 4, treatment of AIGS nanostructures with 3-mercaptopropyl)triethoxysilane (NL3), 3,6-dioxa-1,8-octanedithiol (NL5), and 6-mercapto-1-hexanol (NL6) resulted in high QY's (73.7%, 72.9% and 76.1%, respectively). Thus, the invention provides AIGS nanostructure compositions comprising at least one mercapto-substituted ligand that provides improved QYs. It is believed that the mercapto-substituted ligands provide high QY by passivating the surface of the AIGS nanostructures and reducing defect emissions. Amino-substituted ligands also improved QY.

In this single ligand test, polyethylene glycol amine-substituted ligands (L1, L7, L8 and L13), thiol-substituted ligands (L3, L5 and L6), and silane ligand (L2) showed good QY compared to native AIGS nanostructures. And, ligands L1, L7 and L8 provided better compatibility with monomer, when dispersed in HDDA.

Figure 5:
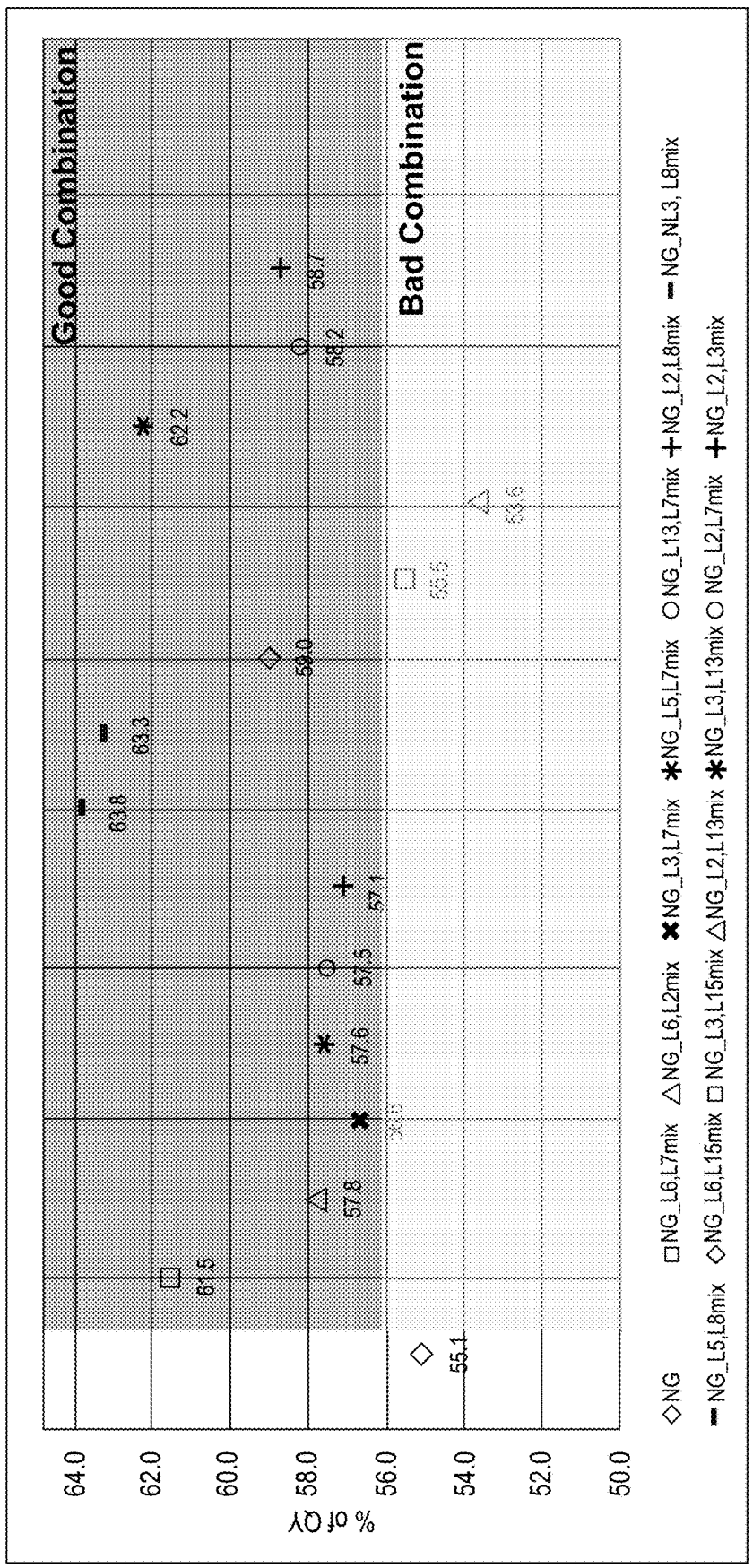
FIG. 5 is a scatter graph showing ligand combinations that provide improved QY % (good combination) and combinations that provide reduced QY % (bad combination).

FIG. 5 is a graph showing the QY % of various 2-ligand combinations that gave improved QY % (good combination) and reduced QY % (bad combination). Surface defects can be reduced by adding a thiol ligand. The combination of L6 and L7 gave better stability than others. But for ink compositions that are relatively hydrophilic, better ligands are relatively hydrophilic ligands such as methoxypolyethylene glycol amine and poly (ethylene glycol) methyl ether thiol. This thiol also improves the QY by passivating surface defects.

Suitable temperatures for ligand exchange are from room temperature to 120° C. The total amount of ligands in the composition can be 60% to 150% of the AIGS mass.

Figure 6:
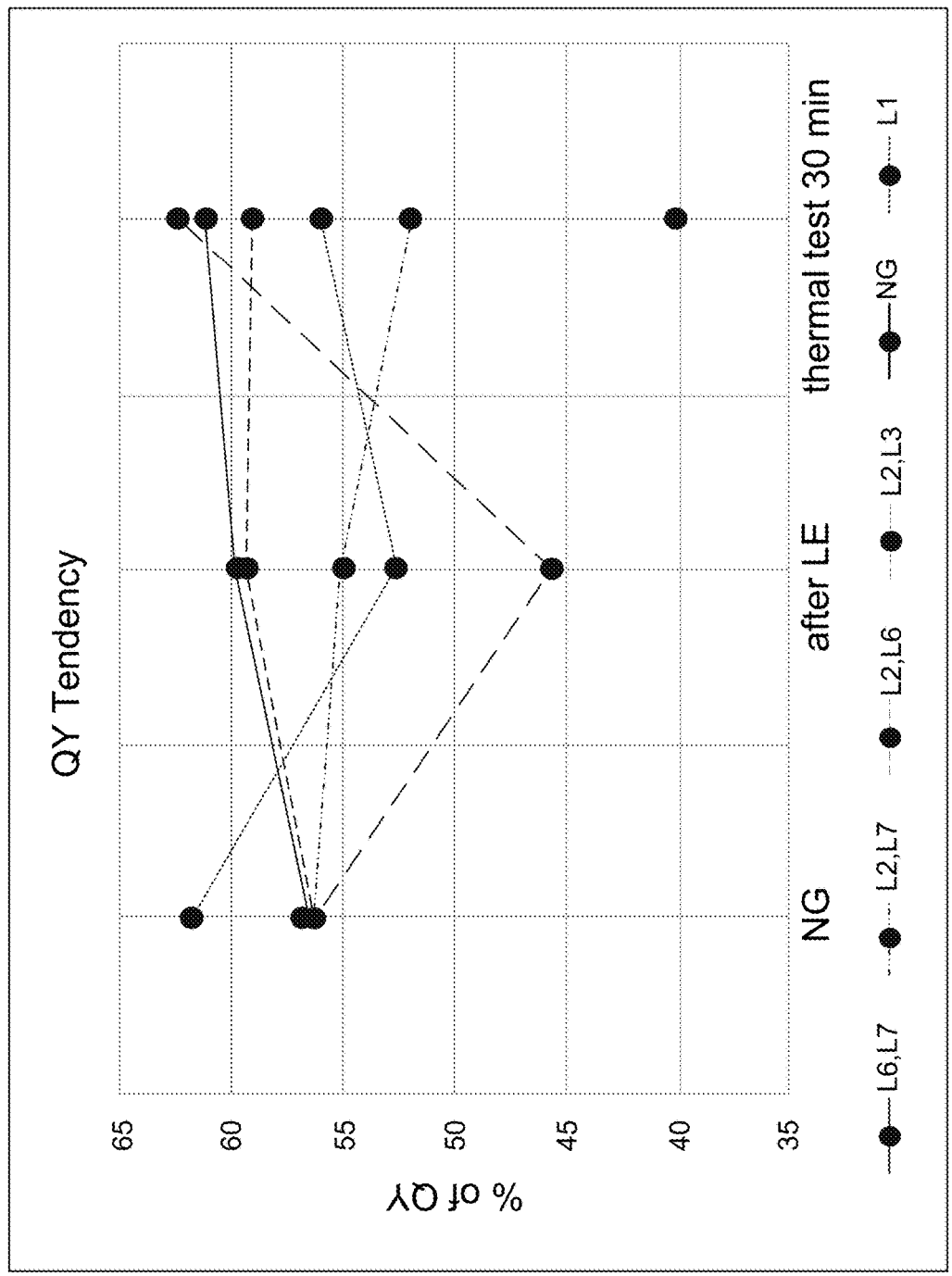
FIG. 6 is a graph showing QY % of various ligand combinations before ligand exchange (NG), after ligand exchange (LE), and after a thermal test for 30 min.

TABLE 10 shows the relative change of QY, PWL, and FWHM before and after ligand exchange with multiple ligands. TABLE 10 shows that L6 & L7 were the most effective ligand combinations for ink formulations, especially when combined with an acrylate monomer. The combinations L2 &L7, L2 & L6, and L2 & L3, L6 and L7 provided excellent dispersibility and thermal stability. See FIG. 6.

TABLE 10

| | Before LE QY (%) | After LE QY (%) | Before PWL (nm) | After PWL (nm) | Before FWHM (nm) | After FWHM (nm) | QY change (%) | PWL change (nm) | FWHM change (nm) |
|---|---|---|---|---|---|---|---|---|---|
| L6, 7 | 55.3 | 61.5 | 531.1 | 531.6 | 36.3 | 36.2 | +11.2 | −0.1 | +0.3 |
| L6, 2 | 55.3 | 57.8 | 531.1 | 531.3 | 36.3 | 36.3 | +4.5 | −0.1 | 0.0 |
| L3, 7 | 55.0 | 56.6 | 531.3 | 531.1 | 36.2 | 36.1 | +3.0 | 0.0 | +0.1 |

TABLE 10-continued

| | Before LE QY (%) | After LE QY (%) | Before PWL (nm) | After PWL (nm) | Before FWHM (nm) | After FWHM (nm) | QY change (%) | PWL change (nm) | FWHM change (nm) |
|---|---|---|---|---|---|---|---|---|---|
| L5, 7 | 55.0 | 57.6 | 531.3 | 530.8 | 36.2 | 36.1 | +4.7 | +0.1 | +0.3 |
| L13, 7 | 55.0 | 57.5 | 531.3 | 531.2 | 36.2 | 36.1 | +4.6 | 0.0 | +0.2 |
| L2, 8 | 55.0 | 57.1 | 531.3 | 531.9 | 36.4 | 36.4 | +3.8 | −0.1 | −0.5 |
| L3, 8 | 55.0 | 63.8 | 531.3 | 530.8 | 36.2 | 36.2 | +16.0 | +0.1 | −0.1 |
| L5, 8 | 55.0 | 63.3 | 531.3 | 531.8 | 36.2 | 36.6 | +15.0 | −0.1 | −1.0 |
| L2, 15 | 55.3 | 59.0 | 531.1 | 532.1 | 36.3 | 36.6 | +6.6 | −0.2 | −0.7 |
| L3, 15 | 55.3 | 55.5 | 531.1 | 532.4 | 36.3 | 37.5 | +0.4 | −0.3 | −3.3 |
| L2, 13 | 55.3 | 53.6 | 531.1 | 532.5 | 36.3 | 36.6 | −3.1 | −0.3 | −0.7 |
| L3, 13 | 55.3 | 62.2 | 531.1 | 530.0 | 36.3 | 38.5 | +12.4 | +0.2 | −5.6 |
| L2, 7 | 56.6 | 58.2 | 530.7 | 532.0 | 36.5 | 36.1 | +2.8 | −0.3 | +0.9 |
| L2, 3 | 54.6 | 58.7 | 530.6 | 531.3 | 36.2 | 36.8 | +7.5 | −0.1 | −1.7 |

Further studied were ligand combinations providing good thermal stability when heated to 180° C. for 30 min in a glove box. Ligand combinations L6 & L7, L2 & L6, and L2 & L3 provided better stability than the single ligand L1. See, FIG. 6.

Figure 7:
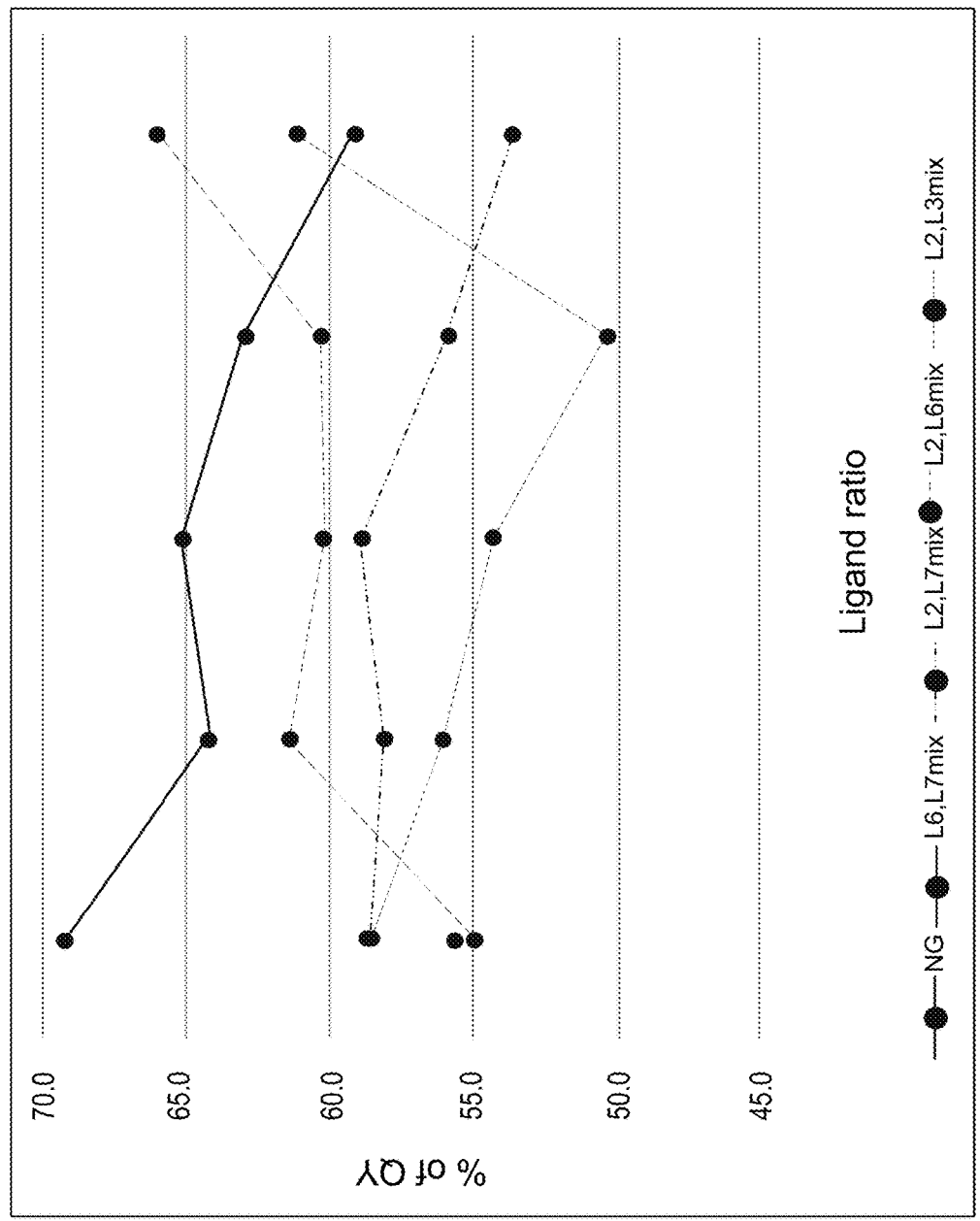
FIG. 7 is a graph showing QY % of various ligand combinations at various ligand ratios.
Figure 8:
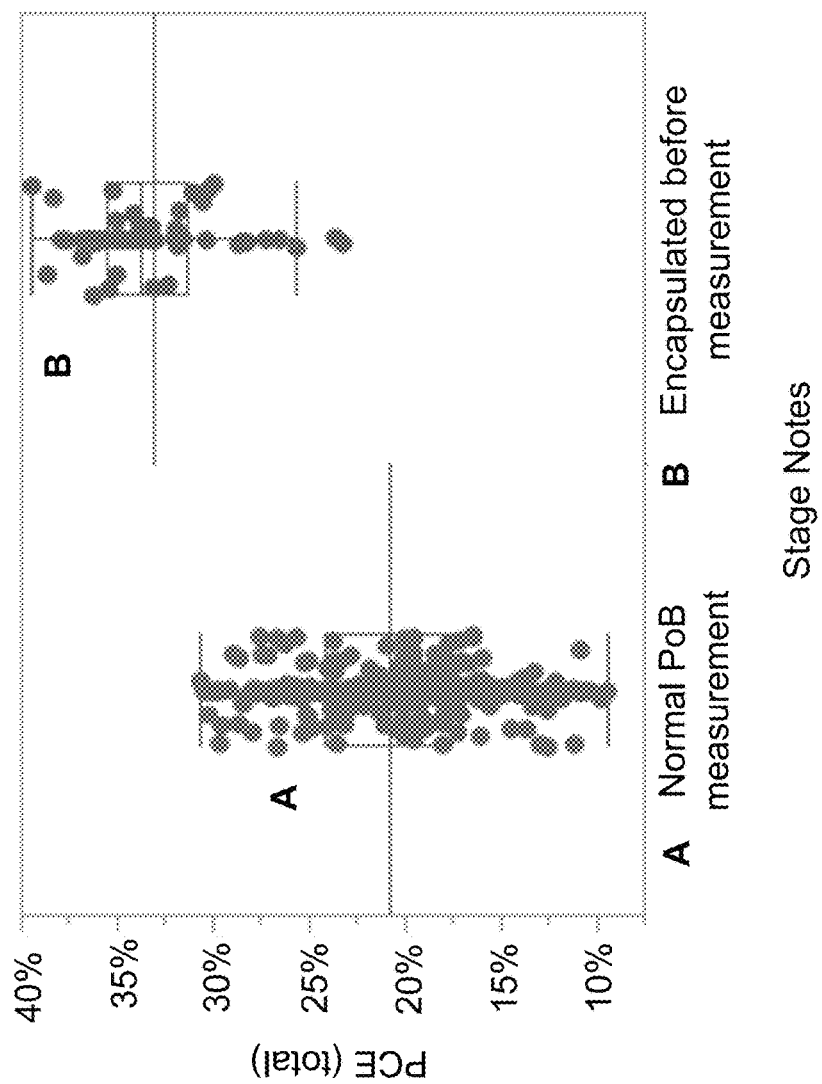
FIG. 8 is two scatter graphs showing the PCE of AIGS films after normal PCE measurement and PCE measurement after encapsulation.

Also studied was the effect of different ratios of ligand combinations on QY. The weight ratios of ligands were varied while the total amount of ligand was fixed. The best QY was achieved with a ratio of 7:3 of L6 to L7. See FIG. 7. All combinations with L6 and L7 showed enhanced QY compared to native AIGS nanostructures except the ratio of 9:1. Even though that mixture exhibited high QY, it was hard to purify as precipitation does not occur. Mixtures of L6 & L2, L3 & L7, and L5 & L7 are good ligand mixtures for AIGS nanostructures. These ligand combinations can be used in combination with various monomers such as tetrahydrofurfuryl acrylate, tri(propylene glycol) diacrylate, 1,4-bis(acryloyloxy)butane, diethylene glycol ethyl ether arylated, isobornyl acrylate, hydroxypropyl acrylate, 2-(acryloyloxy)ethyl hydrogen succinate, and 1,6-hexanediol diacrylate.

Example 10—Improvement of PCE in AIGS Films

In a $N_2$-filled glovebox, AIGS QDs coated with appropriate ligands were mixed into inks containing one or more monomers, $TiO_2$ scattering particles and a photoinitiator. Films were cast by spin-coating these inks, then cured using UV irradiation. The films were then baked at 180° C. for 30 minutes on a hotplate to remove any leftover volatile components. All of these processes were carried out in an inert atmosphere—in a $N_2$-filled glovebox.

Normally at this stage, the films are measured in air by placing on a blue LED light source, with the film side facing up. An integrating sphere connected to a spectrophotometer is placed on top of the QD film (see FIGS. 3A and 3B), and the emission spectrum of the film is captured. The measurement is repeated with a blank glass substrate (no QDs). The blue light absorption and photon conversion efficiency (PCE) of the QD film are measured by using the following formulas:

Blue absorption=# of blue photons transmitted through QD film/# of incident blue photons PCE=# of green photons of forward emission/# of incident blue photons For studying the effect of air and moisture during measurement, the baked QD films were encapsulated before they were brought out of the $N_2$-glovebox. This was done by applying a few drops of a UV-curable transparent adhesive on the QD layer, then placing a glass cover slip, and curing the adhesive by UV irradiation. The QD films, thus sealed using glass and adhesive, were measured in air using the above method.

The results show that encapsulating the QD film before measuring in air is critical to achieving a high photon conversion efficiency (PCE). The TABLE 11 shows results from one set of films that were measured with and without encapsulation. For comparison, the PCE values from typical QDCC films containing InP QDs are also shown. When encapsulated and measured, films comprising AIGS nanostructures had higher post-bake PCE values than InP, at a much lower QD loading. A further improvement in PCE was achieved by irradiating the films by placing on a blue light source (~6 mW/cm$^2$) for a period of 1 hour. Additionally, the QDCC films made with AIGS QDs exhibit a much narrower emission (FWHM ~30 nm) compared to films made with InP QDs (FWHM 36 nm). This is a result of the lower FWHM for AIGS QDs in solution (34 nm vs 39 nm), combined with the use of mono- and polyamino ligands that enable good dispersion in the ink resin.

TABLE 11

| QD type | QD loading in ink | Encapsulation | Post-encapsulation treatment | Blue absorption in 10 μm film | Post-180° C. bake PCE | PWL | FWHM |
|---|---|---|---|---|---|---|---|
| AIGS | 12.5% | No encapsulation | None | >95% | 28% | 535 | 30 |
| | | Glass encapsulation | None | >95% | 35% | 535 | 30 |
| | | Glass encapsulation | 1 hr irradiation with blue light | >95% | 38% | 535 | 30 |
| InP | 30% | No encapsulation | None | 85% | 32% | 540 | 36 |

Figure 9:
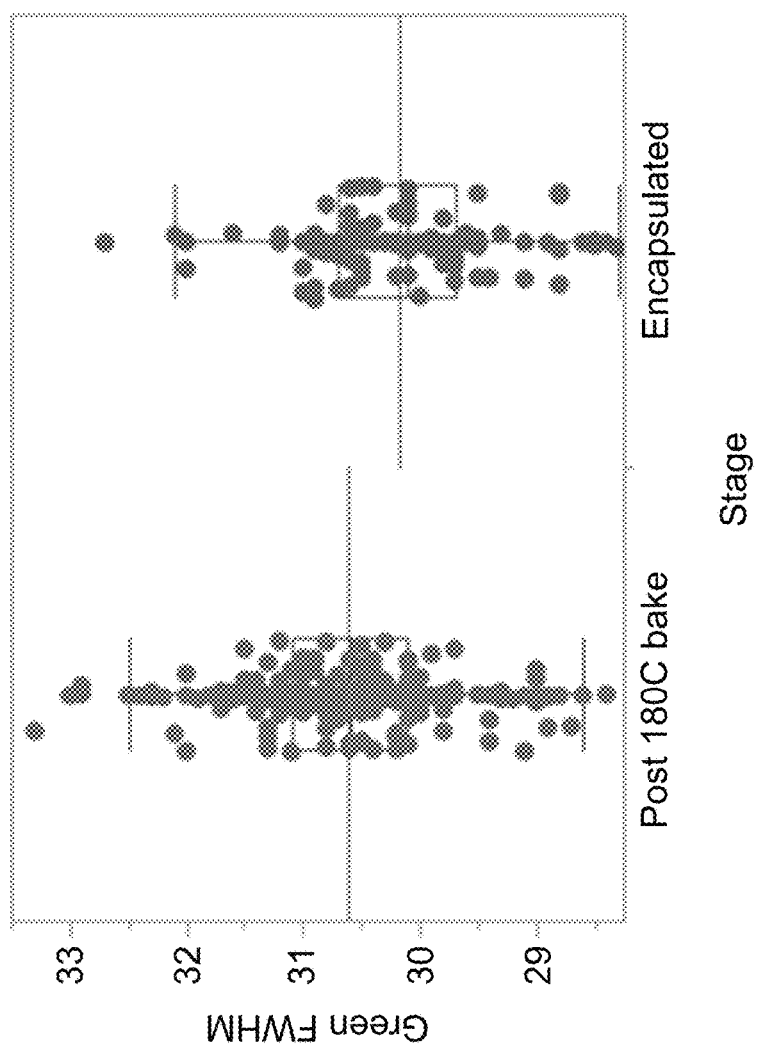
FIG. 9 is two scatter graphs showing the PCE of AIGS films baked at 180° C., without (left graph) and with encapsulation before PCE measurement (right graph).

FIG. 9 shows the impact of encapsulation and blue light treatment over a much wider range of samples. Unexpectedly, PCE values achieved through encapsulation were significantly higher (greater than 32%) than without encapsulation.

The median FWHM for films baked at 180° C. is 30.5 nm, which narrows further upon encapsulation to 30.1 nm. This narrowing may be may be a result of the film brightening upon encapsulation.

While the samples in this study were encapsulated using glass and an adhesive, this improvement in PCE can be achieved by any method that can form an oxygen barrier on the QD layer. In mass production of devices containing these QDCC layers, the encapsulation is likely to be carried out using vapor deposition processes. A typical process flow in this case would include inkjet printing of the QD layer, followed by curing with UV irradiation, baking at 180° C. to remove volatiles, deposition of an organic planarization layer, then deposition of an inorganic barrier layer. Techniques used for deposition of the inorganic layer could include atomic layer deposition (ALD), molecular layer deposition (MLD), chemical vapor deposition (CVD) (with or without plasma enhancement), pulsed vapor deposition (PVD), sputtering, or metal evaporation. Other potential encapsulation methods include solution processed or printed organic layers, UV or thermally curable adhesives, lamination using barrier films, etc.

Example 11 Improved AIGS Films with Metal Alkoxides

For application in emerging advanced display technologies such as QD-OLED and QD micro LED, required are films that maintain their optical properties under 24 hours of yellow light and air storage conditions. It was discovered that films containing zirconium isopropoxide maintained a PCE of at least 30% under yellow light and air storage conditions while films without zirconium propoxide manifested a PCE drop to 14% from 35.8% (entry 1 of Table 12.)

"Yellow light and air storage conditions" were established as follows. Films were fabricated by spin-coating AIGS inks on glass substrates, then cured by irradiation with UV light (405 nm) and baking on a 180° C. hotplate for 30 min, all in a $N_2$-filled glovebox. The inks comprised the following components.

TABLE 12

| | |
|---|---|
| AIGS QD capped with mercaptohexanol and Jeffamine M1000 | 18% |
| 1,3-bisaminomethyl cyclohexane | 5% |
| $TiO_2$ scattering particles | 4% |
| Dispersant (Synperonic NP5) | 2% |
| Photoinitiator (TPO) | 1% |
| Metal alkoxide | 0.6%-2.4% |
| Monomer (HDDA) | 67.6%-69.4% |

The films were then moved into air and stored in a "yellow" room, which is illuminated using white LED lights covered with blue-blocking filters. Typical illuminance values and color coordinates for the yellow room, as measured by a Konica-Minolta CL-200A chroma meter are 140 lux, CIE x=0.52, CIE y=0.45. For reference, typical room light conditions without the blue filtering are illuminance=620 lux, CIE x=0.38, CIE y=0.38.

To test the effect of air exposure on PCE, the films were taken at periodic intervals (3 hours, 1 day, 3 days), encapsulated using a second glass slide and UV-curable transparent adhesive, and measured on the PCE platform. To further test the effect of prolonged storage in air, the encapsulated films were baked again at 180° C. for 30 minutes and measured on the PCE platform.

TABLE 13

| Entry | Method | PCE, air free | PCE, after 1 day air yellow light | PCE, post 180° C. bake | PCE, post blue light |
|---|---|---|---|---|---|
| 1 | No zirconium propoxide | 35.8% | 14.2% | 13.5% | 18.3% |
| 2 | 1.2 wt % zirconium propoxide | N/A | 33.8% | 32.3% | 33.4% |
| 3 | 1.2 wt % zirconium propoxide hydrolysis product | N/A | 34.0% | 28.0% | 33.5% |
| 4 | 0.6 wt % zirconium propoxide | N/A | 32.8% | 32.5% | 34.9% |
| 5 | 2.4 wt % zirconium propoxide | N/A | 31.8% | 31.9% | 33.8% |
| 6 | 0.12 wt zirconium propoxide | N/A | 29.4% | 32.1% | 33.8% |
| 7 | 1.2 wt % zirconium isopropoxide | N/A | 34.4% | 34.9% | 36.5% |
| 8 | 1.5 wt % hafnium isopropoxide | N/A | 32.3% | 32.8% | 31.7% |
| 9 | 1.2 wt % zirconium propoxide, and 0.4 wt % GaCl3 | N/A | 32.8% | 35.8% | 38.4% |

As shown in Table 13, the stability of AIGS films was dramatically improved by adding zirconium (IV) propoxide or its hydrolysis products in the AIGS ink. As shown in the Table 13, the film PCE can be maintained at 30.1 to 34.4% after 24 hours yellow light storage, only slightly lower than the 35.8% PCE of the air free film.

Table 14 shows film results using inks that contain alternative metal alkoxides. Addition of gallium or barium isopropoxide leads to similar improvement in air stability of films as zirconium propoxide.

TABLE 14

Comparison of different metal alkoxides for improving film properties upon air exposure. A different batch of quantum dots was used, resulting in lower overall performance

| Sample # | Metal alkoxide used | PCE, after 1 day air yellow light | PCE, post 180° C. bake | PCE, post blue light |
|---|---|---|---|---|
| Sample 1 | 1.2% Zr-propoxide | 22.6% | 26.1% | 27.9% |
| Sample 2 | 1.2% Ga-isopropoxide | 19.0% | 27.0% | 28.8% |
| Sample 3 | 1.2% Ba-isopropoxide | 18.4% | 23.4% | 25.9% |
| Sample 4 | 1.2% Ga- & Ba-isopropoxide 1:1 mix | 22.6% | 26.2% | 28.0% |

Without being bound by any particular theory, it is believed that the metal alkoxide forms a stabilizing shell around the AIGS nanostructures. In the classical sol-gel process, once tetraethyl orthosilicate (TEOS) is exposed to air moisture, natural hydrolysis and condensation reactions happen. This results in a sol-gel three-dimensional network, and under the extreme condition, $SiO_2$ is formed. $Zr(OPr)_4$ is a typical sol-gel precursor. The sol-gel process indeed happened once AIGS/Zr ink formulation was exposed in the air. In-situ FTIR of AIGS/$Zr(OPr)_4$ showed that the intensity of —OH stretch around 3400 $cm^{-1}$ was increased significantly by keeping the AIGS/Zr samples on the FTIR window 5 mins longer, while the AIGS samples without $Zr(OPr)_4$ displayed no such change. It is believed that the in-situ formed three-dimensional network works as oxygen barrier, and the higher conducting band of $ZrO_x(OH)_y$ formation confines excitons, especially electrons. The combination of those two processes effectively prevents reactive oxygen species (ROS) formation under light/air conditions, thus dramatically improving the light/air stability.

Film performance can be further improved by including phenolic additives that function as antioxidants and sterically hindered ligands. Table 15 shows optical data from a set of films containing both zirconium propoxide and a phenolic additive, pentaerythritol Tetrakis [3-(3,5-di-tert-butyl-4-hydroxyphenyl) propionate].

TABLE 15

Film results using inks containing both metal alkoxide and sterically hindered phenolic ligands

| | | | | PCE after 1 day air + yellow light | | |
|---|---|---|---|---|---|---|
| Sample ID | Method | PCE, air free | Air storage, then encap | Add'l 180 C. bake | Blue light treatment |
| 539-074 | 1.2 wt % zirconium | 33.7% | 26.6% | 29.2% | 32.0% |
| 539-070 | propoxide + 1% | 37.2% | 32.7% | 33.0% | 36.6% |
| 496-097A | Pentaerythritol Tetrakis [3-(3,5-di-tert-butyl-4-hydroxyphenyl) propionate] | 37.2% | 25.6% | 32.6% | 37.1% |

While various embodiments have been described above, it should be understood that they have been presented by way of example only, and not limitation. It will be apparent to persons skilled in the relevant art that various changes in form and detail can be made therein without departing from the spirit and scope of the invention. Thus, the breadth and scope should not be limited by any of the above-described exemplary embodiments, but should be defined only in accordance with the following claims and their equivalents.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A film comprising:
   Ag, In, Ga, and S (AIGS) nanostructures;
   one or more metal alkoxides, one or more metal alkoxide hydrolysis products, or combinations thereof; and
   at least one ligand;
   wherein the film exhibits a photon conversion efficiency (PCE) of greater than 32% at a peak emission wavelength of 480-545 nm, when excited using a blue light source with a wavelength of about 450 nm, wherein the PCE of the film is at least 30% after 24 hours under yellow light and air storage conditions, wherein the nanostructures have an emission spectrum with a full width half maximum (FWHM) of less than 40 nm, and
   wherein the nanostructures have a quantum yield (QY) of 80-99.9%.

2. The film of claim 1, wherein the nanostructures have an emission spectrum with a FWHM of 29-38 nm.

3. The film of claim 1, wherein the nanostructures have a QY of about 86-94%.

4. The film of claim 1, wherein the nanostructures have an $OD_{450}$/mass ($mL \cdot mg^{-1} \cdot cm^{-1}$) greater than or equal to 0.8, wherein $OD_{450}$ is the optical density of the nanostructures at a wavelength of about 450 nm.

5. The film of claim 1, wherein the nanostructures have an $OD_{450}$/mass ($mL \cdot mg^{-1} \cdot cm^{-1}$) in the inclusive range 0.87-1.9, wherein $OD_{450}$ is the optical density of the nanostructures at a wavelength of about 450 nm.

6. The film of claim 1, wherein the average diameter of the nanostructures is less than 10 nm by transmission electron microscopy (TEM).

7. The film of claim 6, wherein the average diameter is about 5 nm.

8. The film of claim 1, wherein at least about 80% of the emission is band-edge emission.

9. The film of claim 8, wherein 93-96% of the emission is band-edge emission.

10. The film according to claim 1, wherein the at least one ligand is a polyamino ligand.

11. The film of claim 10, wherein the polyamino-ligand is 1,3-cyclohexanebis(methylamine), 2,2-dimethyl-1,3-propanediamine, or tris(2-aminoethyl)amine.

12. The film of claim 1, further comprising at least one organic resin.

13. The film of claim 12, wherein the at least one organic resin is cured.

14. The film according to claim 1, wherein the film is 5-15 μm thick.

15. The film of claim 1, wherein the one or more metal alkoxides or hydrolysis products thereof is a metal $C_{1-10}$ alkoxide, and the metal is titanium, zirconium, hafnium, gallium, or barium.

16. The film of claim 1, wherein the one or more metal alkoxides or hydrolysis products thereof is zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, or zirconium (IV) tetra-n-isodecyloxide.

17. The film of claim 1, wherein the one or more metal alkoxides or hydrolysis products thereof is zirconium (IV) tetra-n-propoxide.

18. The film of claim 1, wherein the one or more metal alkoxides or hydrolysis products thereof are present in the film in an amount of 0.03 to about 3 wt %.

19. The film of claim 1, further comprising at least one scattering media.

20. The film of claim 19, wherein the scattering media comprises $TiO_2$ particles.

21. The film of claim 1, wherein the film is encapsulated between first and second barrier layers.

22. The film of claim 1, wherein the PCE of the film is greater than 32% to 39%.

23. A device comprising the film of claim 1.

24. A nanostructure molded article comprising:
   (a) a first conductive layer;
   (b) a second conductive layer; and
   (c) the film of claim 1 between the first conductive layer and the second conductive layer.

25. A nanostructure color converter comprising:
   a back plane;
   a display panel disposed on the back plane; and
   the film of claim 1 disposed on the display panel.

26. The nanostructure color converter of claim 25, wherein the film comprises patterned AIGS nanostructures.

27. The nanostructure color converter of claim 25, wherein the back plane comprises an LED, an LCD, an OLED, or a microLED.

* * * * *